United States Patent
Happel

(10) Patent No.: US 6,747,643 B2
(45) Date of Patent: Jun. 8, 2004

(54) METHOD OF DETECTING, INTERPRETING, RECOGNIZING, IDENTIFYING AND COMPARING N-DIMENSIONAL SHAPES, PARTIAL SHAPES, EMBEDDED SHAPES AND SHAPE COLLAGES USING MULTIDIMENSIONAL ATTRACTOR TOKENS

(75) Inventor: Kenneth M. Happel, Encinitas, CA (US)

(73) Assignee: Omnigon Technologies Ltd., Carlsbad, CA (US)

( * ) Notice: Subject to any disclaimer, the term of this patent is extended or adjusted under 35 U.S.C. 154(b) by 61 days.

(21) Appl. No.: 10/260,868

(22) Filed: Sep. 27, 2002

(65) Prior Publication Data

US 2004/0037474 A1 Feb. 26, 2004

Related U.S. Application Data

(63) Continuation-in-part of application No. 10/161,891, filed on Jun. 3, 2002.

(51) Int. Cl.$^7$ ............................................. G06T 15/00
(52) U.S. Cl. ...................................................... 345/419
(58) Field of Search ................................ 345/419, 420, 345/421, 422, 423, 424, 426, 427, 428, 586, 441, 467, 622; 382/159, 160, 165, 181, 187, 190, 191, 197, 199, 201, 203, 205, 206, 209, 216, 218, 219, 220, 221; 703/2

(56) References Cited

U.S. PATENT DOCUMENTS

| | | | | |
|---|---|---|---|---|
| 5,173,947 A | * | 12/1992 | Chande et al. | 382/154 |
| 5,636,297 A | * | 6/1997 | Eller et al. | 382/293 |
| 6,128,003 A | * | 10/2000 | Smith et al. | 345/157 |
| 6,393,143 B1 | * | 5/2002 | Pipitone | 382/154 |
| 6,393,159 B1 | * | 5/2002 | Prasad et al. | 382/259 |
| 6,459,431 B1 | * | 10/2002 | Browne et al. | 345/442 |
| 6,504,541 B1 | * | 1/2003 | Liu et al. | 345/619 |

\* cited by examiner

*Primary Examiner*—El Santiago
*Assistant Examiner*—Enrique L Santiago
(74) *Attorney, Agent, or Firm*—Foley & Lardner LLP

(57) ABSTRACT

A method of detecting, interpreting, recognizing, identifying and comparing N-dimensional shapes, partial shapes, embedded shapes and shape collages is disclosed. One embodiment of the invention allows for the characterization of shapes as sequences of unit vector descriptions, attributes of unit vector descriptions, shape segments, and shape segment collages whereby the detection, interpretation, recognition, identification, comparison and analysis of one- to n-dimensional shapes in one- to n-dimensional spaces can be accomplished using multidimensional attractor tokens. These attractor processes map the sequence from its original sequence representation space (OSRS) into a hierarchical multidimensional attractor space (HMAS). The HMAS can be configured to represent equivalent symbol distributions within two symbol sequences or perform exact symbol sequence matching. The mapping process results in each sequence being drawn to an attractor in the HMAS. Each attractor within the HMAS forms a unique token for a group of sequences with no overlap between the sequence groups represented by different attractors. The size of the sequence groups represented by a given attractor can be reduced from approximately half of all possible sequences to a much smaller subset of possible sequences. The mapping process is repeated for a given sequence so that tokens are created for the whole sequence and a series of subsequences created by repeatedly removing a symbol from the one end of sequence and then repeating the process from the other end. The resulting string of tokens represents the exact identity of the whole sequence and all its subsequences ordered from each end.

52 Claims, 29 Drawing Sheets

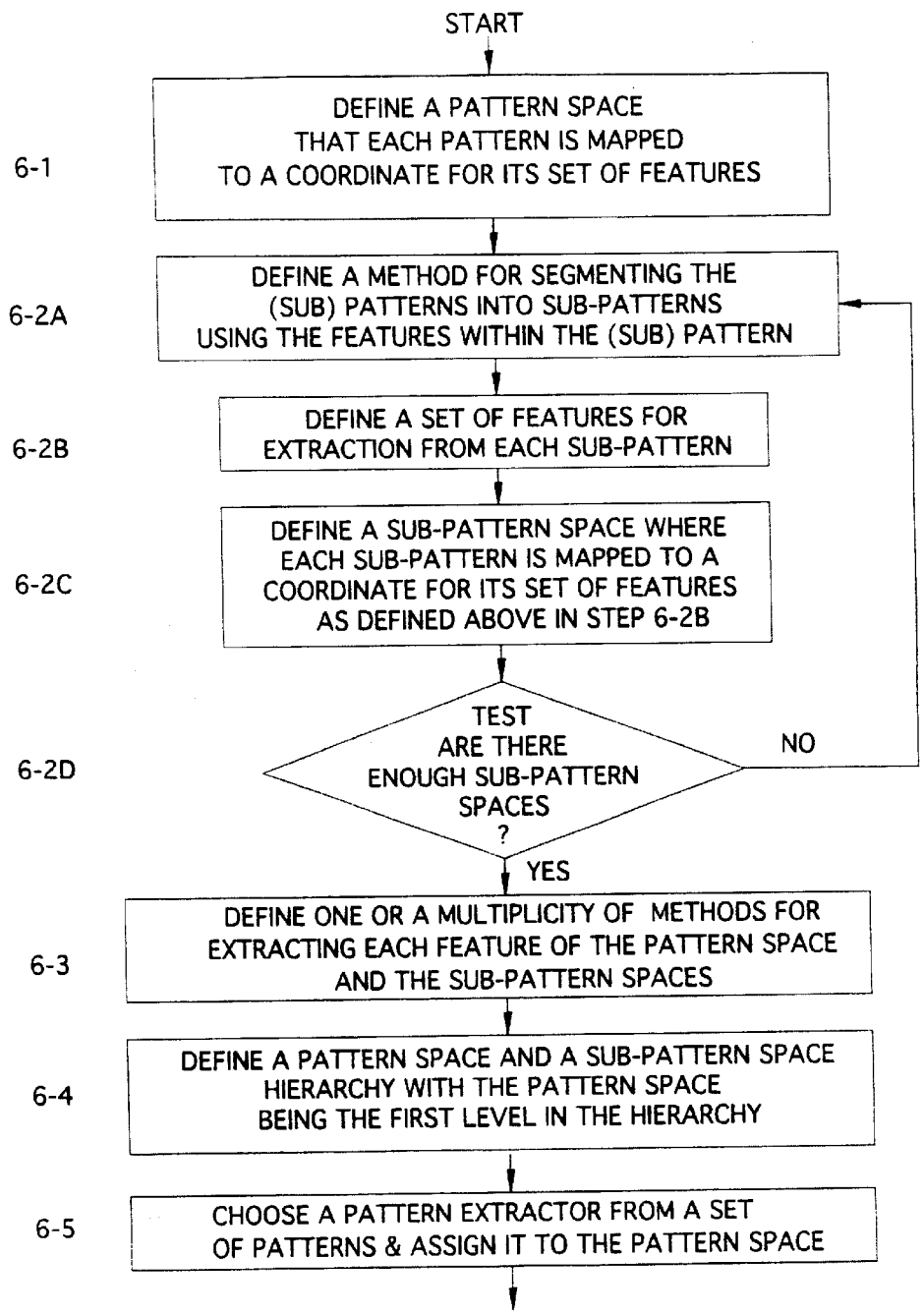
FIG. 6A  TO BLOCK 6-6 ON FIG. 6B

Sequence: 2

Sequence: 2221

Sequence:
2221111111111122222222222222222233333333333333333333333333333
333331111111111111111222

Sequence: (123341)

Sequence: (123341) (1223334141)

Sequence: ( )( )( )(122233233344114141)

Sequence: ( )( )( )( )(12221232233334334441114141)

Sequence: ( )( )( )( )( )
(12221212322333334334444411114141)

Sequence: ( )( )( )( )( )( )
(12221212232332333343344444111114141)

Sequence: ( )( )( )( )( )( )( )
(1222121223233323323333443434444141111114141))

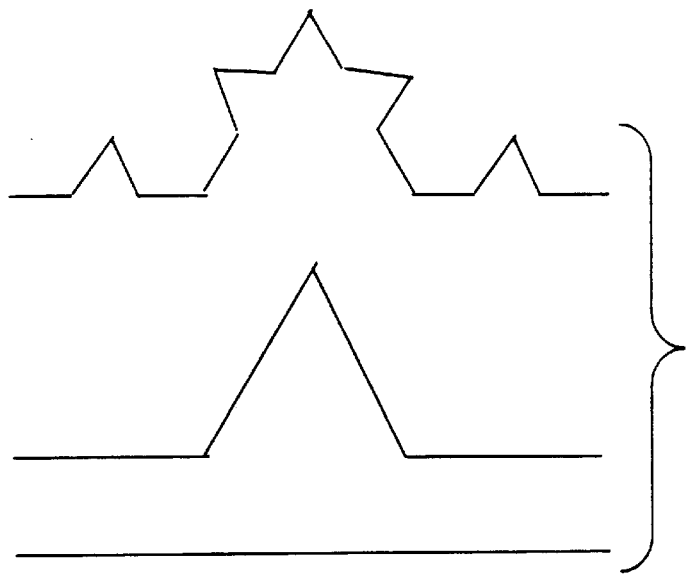
Figure 13C Koch Curve
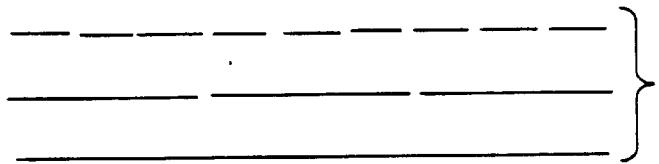
Figure 13B straight line
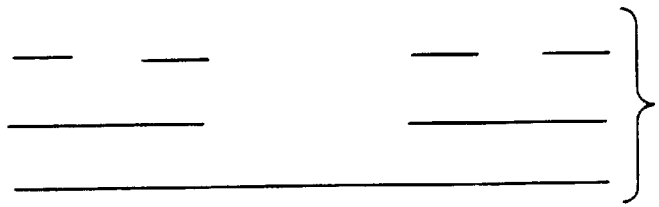
Figure 13A Cantor set

METHOD OF DETECTING, INTERPRETING, RECOGNIZING, IDENTIFYING AND COMPARING N-DIMENSIONAL SHAPES, PARTIAL SHAPES, EMBEDDED SHAPES AND SHAPE COLLAGES USING MULTIDIMENSIONAL ATTRACTOR TOKENS

RELATED APPLICATIONS

The present application is a continuation-in-part of U.S. patent application Ser. No. 10/161,891, titled "METHOD FOR SOLVING FREQUENCY, FREQUENCY DISTRIBUTION AND SEQUENCE-MATCHING PROBLEMS USING MULTIDIMENSIONAL ATTRACTOR TOKENS", filed Jun. 3, 2002, which is hereby incorporated by reference.

BACKGROUND OF THE INVENTION

1. Field of the Invention

The present invention relates to solving frequency, frequency distribution or sequence matching and comparison problems, and more particularly, to solving the comparison mapping and analysis of shapes, convex holes, areas and envelop, functions using two or more dimensional models represented as sequences of symbols and analyzed using a sequence attractor identity scheme.

2. Background Art

The following discussion of the background of the invention is merely provided to aid the reader in understanding the invention and is not admitted to describe or constitute prior art to the present invention.

The recognition of shapes is an important aspect of many fields and industries. For example, fields such as imagery analysis for mapping, identification of objects in images, guidance of vehicles and robots, recognition of parts in manufacturing, and recognition of scenes all require accurate detection and/or recognition of shapes. Further, recognition and detection of shapes is a key element in the digitization and categorization of shapes. For example, for certain artificial intelligence systems, it may be critical for the system to quickly determine whether a detected object is a cube, a circle, a face, or another category of objects. For other applications, it may be desirable to synthetically generate a shape, as may be the case in computer game graphics.

One concern with many existing techniques of shape recognition is that most are not affine independent. In this regard, the detected shape must be oriented and scaled exactly as the reference pattern to which it is compared in order for the system to recognize a match. If the detected shape is skewed, rotated, flipped, mirrored, distorted or translated, the system will most likely fail to detect a match.

One technique which provides some affine independence is a Fourier series representation. Encoding of shapes as sequences of directional vectors has been known and used as the discrete form of Fourier by, for example, Dougherty, Edward R., *Mathematical Methods for Artificial Intelligence and Autonomous Systems*, Englewood Cliffs, N. J.: Prentice Hall, 1988, pp. 370–89, which is hereby incorporated by reference. However, most computer implementations of Fourier require an extraordinarily large number of integration cycles. This limitation of Fourier presents a barrier for most real-time applications, since it limits the frequency at which the implementation may be applied. Attempts to obtain small increases in frequency can result in a large increase in the cost of the application. The problem may be exacerbated if an appropriate integrator is not available, making the matching an extremely difficult task. Further, even at its most successful, a Fourier series representation provides only an approximate match.

It would, therefore, be desirable to provide a method of accurately detecting, interpreting, recognizing, identifying and comparing shapes with greater affine independence without the need for large integration cycles.

SUMMARY OF THE INVENTION

The above background art is intended merely as a generic description of some of the challenges encountered by data processing hardware and software when solving waveform, signal attribute or sequence-matching problems, and not as any admission of prior art.

A method of characterizing an m-dimensional shape in an n-dimensional space according to an embodiment of the present invention includes configuring a device in at least one of hardware, firmware and software to characterize the m-dimensional shape. The configuring includes defining labels for a plurality of facial directions of a polytope in the n-dimensional space, the polytope being of k dimensions. The configuring further includes defining a unit vector for each of the facial directions, and defining a polytope tiling map for the n-dimensional space. The method includes tiling the m-dimensional shape with k-dimensional polytope within the n-dimensional space, and mapping a shape into a sequence of tile addresses. The device is configured to carry out an attractor process for mapping a source multiset to an attractor space, the attractor process being an iterative process which causes elements in the source multiset to converge on one of at least two different behaviors defined within the attractor space as a result of the iterative process, the configuring step including inputting a characterization of the source multiset to input to the device the number of distinct elements of the source multiset. The device is used, and the mapping of the sequence of tile addresses one or more coordinates of the attractor space is executed, each of the coordinates corresponding to a different behavior in the attractor space. In a preferred embodiment, the method may further include mapping the attractor space coordinates into a target space representation, the target space representation including at least the attractor space coordinates.

BRIEF DESCRIPTION OF THE DRAWINGS

FIGS. 6A and 6B are a flowchart showing a method for hierarchical pattern recognition using an attractor based characterization of feature sets;

FIGS. 13A–C show sets of curves illustrating fractal iterations to demonstrate fractal dimensionality;

DETAILED DESCRIPTION OF PREFERRED EMBODIMENTS

Figure 1A:
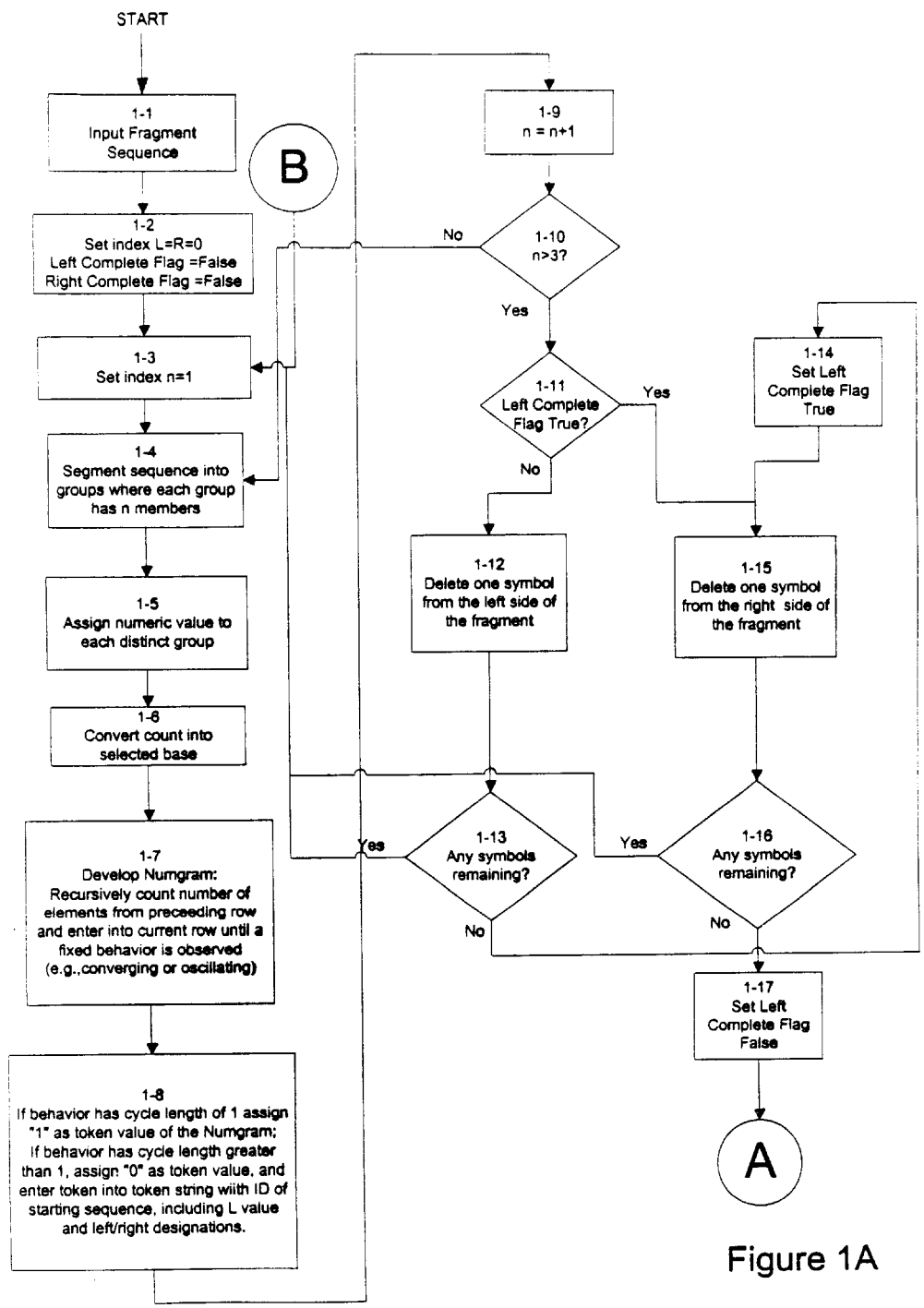
FIGS. 1A and 1B are a flowchart showing the operation of the Numgram process used to form token strings in accordance with one embodiment of an attractor process.

A method according to embodiments of the present invention is provided for creating software and hardware solutions for detection, interpretation, recognition, identification and comparison problems relating to shapes, partial shapes, embedded shapes and shape collages (generally referred to as "shapes" hereafter) where:

(1) the shapes to be matched are exactly identical or may have missing or extra shape elements within one or both shapes, (2) the shapes to be matched may have regions or embedded sections with full or partial shape overlaps or may have missing or extra shape elements within one or both shapes, (3) the symbols in each shape description are all or in-part dissimilar sets, (4) the symbols composing the shapes have no meta-meaning allowing the use of a priori statistical or other pattern knowledge to identify the significance other than the two shapes themselves, (5) unknown shapes are being reconstructed from shape fragments, (6) the combinatorial explosion in shape pattern matching, relational searching or heuristic evaluation processes would otherwise require very fast and expensive computational systems, very large memory capacities, large and complex storage hardware configurations, very slow software response times, or restriction of application of conventional algorithms to problems of limited complexity, or (7) the shapes are random patterns generated by different random processes and the goal is to segment, match and organize the shapes by the random processes which generated them.

The method according to embodiments of the present invention uses attractor-based processes to extract identity tokens indicating the content and order of shape elements. These attractor processes map the shape elements from its original representation space (ORS), also termed a "source space" into a hierarchical multidimensional attractor space (HMAS). The HMAS can be configured to represent (1) embedded patterns (2) equivalent shape elements within two or more shapes or (3) exact shape matching.

Various types of shape analysis operations can be performed by computational devices utilizing attractor tokens. Examples of such types of shape analysis operations include:

(1) detection and recognition of shape patterns;

(2) comparison of whole shapes or embedded or partial shapes in symbol sequences;

(3) relationship of shape structures between groups of shape patterns represented by symbols; and (4) detection and recognition of structurally similar shape patterns or pattern relationship structures composed of completely or partially disjoint symbol sets.

The symbol sequences and/or patterns can be representations of:

(1) sequences and/or patterns of events in a process;

(2) sequences and/or patterns of events in time;

(3) sequences and/or patterns of statements, operations, data types or sets of any combination thereof in computer languages forming a program or a meta-language;

(4) sequences and/or patterns of characters and Boolean operations or sets of any combination thereof, forming an executable or object code;

(5) sequences and/or patterns of nodes forming a network of linked notes forming astrophysical, geographic or geometric constructions or abstract structures such as graphs, and any representations of such constructions or structures;

(6) sequences and/or patterns of nodes forming a pathway in the network of linked nodes forming astrophysical, geographic or geometric constructions or abstract structures such as graphs, and any representations of such constructions or structures;

(7) sequences and/or patterns of physical states in materials, machines, or any physical system in general;

(8) sequences and/or patterns of graphics entities and the logical operators forming a graphics pattern;

(9) sequences and/or patterns of coefficients of binary polynomials and other types of mathematical or algebraic expressions;

(10) sequences and/or patterns of geometric building blocks and logical operators forming a geometric construction or abstract structure;

(11) sequences and/or patterns of words and word relationships forming a dictionary, a thesaurus, or a concept graph;

(12) sequences and/or patterns of diffeomorphic regions forming an atlas, chart, model or simulation of behavioral state expressions;

(13) sequences and/or patterns of terms in mathematical expansion series such as Taylor series or hierarchical embedding sequences such as catastrophe-theory seed functions;

(14) sequences and/or patterns of transactions, transaction types or transaction evaluations;

(15) sequences and/or patterns of computational or signal processing devices or device states or sequences and/or patterns of sets of device states representing a circuit, or arrangement of devices and circuits;

(16) sequences and/or patterns of entities, entity states, locations, activities and times or sets of any combinations thereof forming operational commands, schedules, agendas, plans, strategies, tactics or games;

(17) sequences and/or patterns of symbols expressing the identity of any numerical distribution series such as Fibonacci series;

(18) sequences and/or patterns of pixel patterns in images, sequences of pixel pattern relationships, sequences and/or patterns of Boolean or other logical operators or any combinations thereof or any sets thereof;

(19) sequences and/or patterns of waveforms, random or pseudo-random patterns, waveform features, attractors, repellers or types of relationships or sets of any combinations thereof; or

(20) anything else which can be described by mapping to symbols, sets of symbols, sequences, sets of sequences and/or patterns, embeddings of sequences and/or patterns, hierarchical or otherwise, relationships between symbols, relationships between sets of symbols, relationships between sequences and/or patterns, relationships between sets of sequences and/or patterns, relationships between sequence and/or pattern embeddings, whether hierarchical or otherwise, relationships between sets of sequence and/or pattern embeddings, whether hierarchical or otherwise, or any combinations thereof in any order, context or structure.

Such problems typically involve the discovery of symbols, sets of symbols, symbol-order patterns, or sets of symbol-order patterns or any combinations thereof, or relationships between symbols, symbol-order patterns, sequences or subsequences in any combination, or involve the detection, recognition or identification of symbols within sequences.

Discovering, detecting, recognizing or identifying these symbols, patterns or sequences or relationships between them allows the analysis of:

(1) similarities or anomalies in the identity of two or more sequences;

(2) similarities or anomalies in the patterns created by symbol-order within a sequence or a group of two or more sequences;

(3) similarities or anomalies in the structure or order of the symbol-order patterns within a sequence of symbol-order patterns or a sequence with a subset of its symbol-order being composed of symbol-order patterns;

(4) similarities or anomalies in the symbol content of symbol-order patterns including the sequence position of symbols within symbol-order patterns or sequences which represent insertions or deletions of symbols in sequences or in symbol-order patterns being compared;

(5) similarities or anomalies in symbol-order pattern types;

(6) similarities or anomalies in the occurrence or re-occurrence of symbol-order patterns within a sequence or a group of sequences;

(7) similarities or anomalies in the occurrence or re-occurrence of symbol-order pattern within a sequence or a group of sequences in a hierarchy of embedded sequences, embedded symbol-order patterns or a combination thereof;

(8) assembly of a whole sequence using symbol-order patterns made of or found within fragments of the whole sequence;

(9) similarities or anomalies in distances:
   a. between occurrences or re-occurrences of a symbol;
   b. between occurrences or re-occurrences of sets of symbols;
   c. between occurrences or re-occurrences of sets of different symbols;
   d. between occurrences or re-occurrences of sets of different symbol sets;
   e. between occurrences or re-occurrences of a symbol-order pattern;
   f. between occurrences or re-occurrences of sets of symbol-order patterns;
   g. between occurrences or re-occurrences of sets of different symbol-order patterns;
   h. between occurrences or re-occurrences of sets of different symbol-order pattern sets;
   i. between occurrences or re-occurrences of sequences having different symbol mappings; or
   between occurrences or re-occurrences of hierarchical embeddings of symbols, sets of symbols, symbol-order patterns, sets of symbol-order patterns, sequences or embeddings of the previous within hierarchical sequences or within a hierarchical sequence space;

(10) similarities or anomalies in any form of distance distribution, hierarchical embedding, embedding of embedding, distribution of distributions, or embeddings of the distances;

(11) indexing, classification or ranking schemes for symbols, sets of symbols, symbol-order patterns, sequence fragments or whole sequences by symbol content, symbol-order pattern, patterns of symbol-order patterns, distance distributions of symbols, symbol-order patterns or groups of symbol-order patterns or sequences by the similarity or difference of their features; or

(12) prediction of the occurrence or reoccurrence of:
   a. a symbol, a set of symbols;
   b. sets of symbol sets;
   c. a symbol-order pattern;
   d. sets of symbol-order patterns;
   e. a sequence;
   f. sets of sequences;
   g. a distance distribution;
   h. sets of distance distributions;
   i. a hierarchical embedding;
   j. sets of hierarchical embeddings; or
   k. any combinations of items a–j.

The mapping process results in each sequence or set element of the representation space being drawn to an attractor in the HMAS. Each attractor within the HMAS forms a unique token for a group of sequences with no overlap between the sequence groups represented by different attractors. The size of the sequence groups represented by a given attractor can be reduced, from approximately half of all possible sequences to a much smaller subset of possible sequences.

The mapping process is repeated for a given sequence so that tokens are created for the whole sequence and a series of subsequences created by repeatedly removing a symbol from the one end of sequence and then repeating the process from the other end. The resulting string of tokens represents the exact identity of the whole sequence and all its subsequences ordered from each end. A token to spatial-coordinate mapping scheme is used to create a series of coordinates in a hierarchy of embedded pattern spaces or sub-spaces. Each pattern sub-space is a pattern space similar to a Hausdorf space.

When the attractor tokens are mapped into a Hausdorf or other similar pattern space, the tokens cause sequence and/or pattern-similarity characteristics to be compared by evaluating the spatial vectors. These similarity characteristics may also be between pattern, sub-pattern or sequence of sub-patterns. For brevity whenever the term pattern is used, it is intended to include not only a pattern or sequence, but also sub-pattern or sequence of sub-patterns. When the attractor tokens are mapped into a numerical space, pattern-similarity (i.e., similarity in the pattern, sub-pattern or sequence of sub-patterns) characteristics are compared by evaluating the numerical distance of the coordinate values.

When two patterns are mapped into a hierarchical set-theoretic space whose coordinates in each layer of the hierarchy are mapped to combinations of attractor tokens of a given pattern-length, the pattern-similarity characteristics of the two patterns are compared by evaluating the arithmetic distance between tokens of each layer coordinate representing the two patterns. For this type of set-theoretical space, a method for ordering the token coordinates is provided such that the distance between the tokens indicates pattern similarity and reveals the exact structure of whole pattern or subpattern matches between patterns or groups of patterns.

Attractors have the possibility of being used as 'spatial identities of repeating mathematical processes which cause random walks or pathways through a modeling space or iterative process steps applied to random values to converge on a fixed and unique end point or fixed and unique set of endpoints (the attractor) as the result of each process iteration. Because of the convergence, attractor processes are typically characterized as entropic and efficient. They are inherently insensitive to combinatorial explosion.

In an embodiment, the method uses attractor processes to map an unknown symbol pattern to an attractor whose identity forms a unique token describing a unique partition of all possible patterns in a pattern space. These attractor processes map the pattern from its original sequence representation space (OSRS) into a hierarchical multidimensional attractor space (HMAS). The HMAS can be configured to represent equivalent symbol distributions within two symbol patterns or perform exact symbol pattern matching.

The mapping process results in each pattern being drawn to an attractor in the HMAS. Each attractor within the HMAS forms a unique token for a group of patterns with no overlap between the pattern groups represented by different attractors. The size of the pattern groups represented by a given attractor can be reduced from approximately half of all possible patterns to a much smaller subset of possible patterns.

The mapping process is repeated for a given pattern so that tokens are created for the whole pattern and each subpattern created by removing a symbol from one end of the pattern. The resulting string of tokens represents the exact identity of the whole pattern and all its subpatterns. A token to spatial-coordinate mapping scheme methodology is provided for creating token coordinates providing solutions to one or more of the pattern-matching problems above.

Attractors are also considered repetitive mathematical processes which cause random patterns of movements or pathways through a modeling space or repeating process steps applied to random values to converge on a fixed and unique end point or fixed and unique set of endpoints as the result of each movement or process repetition. Because of the convergence, attractor processes are characterized as efficient and are inherently insensitive to combinatorial explosion problems.

Computational devices use symbols to represent things, processes and relationships. All computational models are composed of patterns of statements, descriptions, instructions and punctuation characters. To operate in a computer, these statements, descriptions, instructions and punctuation characters are translated into unique patterns of binary bit patterns or symbols that are interpreted and operated on by the processing unit of the computational device. A set of all symbols defined for interpretation is called the Symbol Set. A symbol-pattern is an ordered set of symbols in which each symbol is a member of the Symbol Set.

In an embodiment, the method uses an attractor process applied to a symbol-pattern, causing it to converge to a single coordinate or single repeating pattern of coordinates in a coordinate space. Each coordinate or pattern of coordinates is the unique end-point of an attractor process for a unique group of symbol-patterns. The collection of the all the group members of all the attractor end-points is exactly the collection of all possible symbol-patterns of that pattern length with no repeats or exclusions.

The attractor end-point coordinates or coordinate patterns are given unique labels that are the group identity for all symbol-patterns whose attractor processes cause them to arrive at that end-point coordinate or pattern of coordinates. As a result, all the possible symbol-patterns of a given length are divided into groups by their end-point coordinates or coordinate patterns.

By repeating this process for each symbol-subpattern created by deleting one symbol from the end of the symbol-pattern, each symbol-subpattern is given a group identity until the last symbol of the symbol-pattern is reached which is given its own symbol as its label.

The set of all these attractor end-point coordinates or coordinate set labels is called the Label Set. The labels within the Label Set are expressed in pattern from the label for the end symbol to the label for the group containing the whole symbol-pattern. The Label Set forms a unique identifier for the symbol-pattern and its set of subset symbol-patterns ordered from the end symbol. The target space is a representation space whose coordinates are the labels of the label set. The coordinates of the attractor space are mapped to the coordinates of the target space such that an attractor result to a coordinate in the attractor space causes a return from the target space of the representation for that attractor result. The target space can be configured to return a single label or a series o labels including punctuation for a series of attractor results. Whenever a label set is used, a target space will be created for the mapping of the representation from the attractor space.

In a set-theoretic space, the coordinate axes are composed of labels. The space between labels is empty and has no meaning. Coordinates in the space are composed of a set of labels with one label for each dimension.

If a set-theoretic space:

(1) has as many axes as the number of symbols in a symbol-pattern, and (2) the axes of that space are ordered from the whole symbol-pattern to the last symbol, and (3) the labels of each symbol-pattern and symbol-subpattern axis are the labels of the attractor end-point coordinates or coordinate patterns in that space, and (4) the end symbol axis has as its labels the Symbol Set, and (5) the coordinates of that space are the Label Sets of all the symbol-patterns of the same length composed of symbols from the Symbol Set, then the space is called the Label Space or the attractor space representation.

A set-theoretic space composed of a hierarchy of Label Spaces arranged so they form a classification tree with branches and leaves representing symbol-pattern groups of similar composition and order is called the Classification Space or the analytic space.

The Classification Space allows the sorting of Label Sets into groups of predetermined content and content order. By sorting the Label Sets of symbol-patterns through the branch structure to leaves, each leaf collects a set of symbol-patterns of the same symbol content and symbol order structure. All symbol-patterns sharing the same branch structure have the same symbol content and order to the point where they diverge into different branches or leaves.

The Symbol Set, the Label Set, the Label Space, and the Classification Space are the building blocks of solution applications. Their combination and configuration allows the development of software and hardware solutions for problems represented by symbol-patterns which were heretofore intractable because of combinatorial explosion. Subsequently, the solution configuration can be run on small platforms at high speed and can be easily transported to programmable logic devices and application specific integrated circuits (ASICs). Furthermore, such pattern-matching methods using attractor tokens according to embodiments of the present invention are applicable to various fields including, for example, matching of deoxyribonucleic acid (DNA) patterns or other biotechnology applications.

The basic idea behind the attractor process is that some initial random behavior is mapped to a predictable outcome behavior. An analogy may be made to a rubber sheet onto which one placed a steel ball which caused the sheet to deform downward. The placement of the steel ball on the rubber sheet deforms the rubber sheet and sets up the attractor process. A marble that is subsequently tossed onto the rubber sheet will move around and around until it reaches the ball. The attractor is the process interaction between the marble and the deformed rubber sheet.

The primary characteristics of attractors are as follows:
(1) they cause random inputs to be mapped to predictable (i.e., fixed) outputs;
(2) variation of the specific parameters for a given attractor may be used to modify the number and/or type of predictable outputs; and
(3) the output behaviors of attractors may be configured so they represent a map to specific groups of input patterns and/or behaviors, i.e.,. mapped to the type and quality of the inputs.

By "predictable" used above, it is not intended that one knows in advance the type of behavior but rather that the behavior, once observed, will be repeatable and thus continue to be observed for the chosen set of specific parameters.

The input behavior is merely as set of attributes which is variable and which defines the current state of the object under consideration. In the marble example, the input behavior would specify the initial position and velocity of the marble when it is released onto the deformed rubber sheet.

In the first characteristic where random inputs to be mapped to predictable outputs, these mappings are done by an iterative process and this process converges to a fixed behavior.

In the third characteristic, the parameters of the attractor may be adjusted, to tune the mapping of the random inputs and the outputs such that, while the inputs are still random, the input behaviors within a specified range will all map to output one behavior and the input behavior within a second range will all map to another, different output behavior, and the input behavior within a third range will all map to yet another, still different output behavior. Thus, the output behavior then becomes an identity or membership qualifier for a group of input behaviors. When this happens, the attractor turns into a classifier.

The primary characteristics of a good classifier are as follows:
(1) every input is handled uniquely and predictably;
(2) there must be at least one other input which is also handled according to a) but is mapped to a different behavior; and
(3) for efficient classifiers, classifiers must do at least as well as least squares on random maps.

The concept of least squares is related to random walk problems. One may illustrate the procedure by assuming one want to find a randomly placed point in a square 1 meter on each side. First divide the square into half by drawing a horizontal line through the middle and ask if the point is on above or below the line. One it is established that the point is say above the line, one then divides the upper half into half by drawing a vertical line through the upper half and ask if the point is to the right or left. The process continues until one confines the point within an area of arbitrarily small size, thus solving the problem of finding the point within a certain degree of accuracy. When the prior knowledge about the existence of the input point is null, then the most efficient classifier is one that operates on this least squares principle.

The principles of embodiments of the invention may be understood in relation to an example of DNA pattern matching used to determine overlaps in nucleotide patterns. The DNA fragment patterns are only used as an example and are not meant to be limiting. The principles of the invention as elucidated by the DNA examples below are generally applicable to any random or non-random pattern. The overall objective is to classify different inputs into different groups using different behaviors as these inputs are mapped via an attractor process. The essence of the procedure is to classify patterns by studying the frequency of occurrences within the patterns.

As an example of the attractor process, the following two fragments will be examined.

Fragment 1: GGATACGTCGTATAACGTA (SEQ ID NO: 1)

Fragment 2 TATAACGTATTAGACACGG (SEQ ID NO: 2)

The procedure for implementing embodiment of the invention extracts patterns from the input fragments so that the input fragments can be uniquely mapped to certain types of behavior.

The procedure is first illustrated with Fragment 1.

Fragment 1: GGATACGTCGTATAACGTA (SEQ ID NO: 1)

One first takes the entire fragment considering each nucleotide separately and counts the number of distinct nucleotide symbols. To facilitate and standardize the counting process for implementation on a data processor, one may assigns a digit value to each nucleotide using, for example, the mapping shown in Table 1.

TABLE 1

| Symbol | Mapped symbol |
|--------|---------------|
| A | 0 |
| C | 1 |
| G | 2 |
| T | 3 |

Using the above mapping one can map the input sequence or pattern into the following string 1:

[2,2,0,3,0,1,2,3,1,2,3,0,3,0,0,1,2,3,0]    String 1

One now chooses a base in which to perform the succeeding steps of the procedure. While any base (greater than 5) may be used, the below example proceeds with base 7 as a representative example.

One first converts the string 1 into a base 7 representation which can be labeled String 2. Since none of the entries of string 1 are greater than 6, the base 7 representation is the same sequence as string 1, so that string 1=string 2 or

[2,2,0,3,0,1,2,3,1,2,3,0,3,0,0,1,2,3,0]    String 2

Table 2 below, called a Numgram, is used to implement another part of the process. The first row of the Numgram list the integers specifying the base. For base, 7, integers 0, 1, . . . 6 are used to label the separate columns.

For row 2, one counts the number of 0's, 1's, 2's and 3's in string 2 and enters these count values in the corresponding column of row 2 of the Numgram.

For row 3, one counts the number of 0's, 1's, . . . 6's in row 2 and list these numbers in the corresponding column of row 3.

One repeats the counting and listing process as shown in Table 2. The counting and listing process is iterative and is seen to converge at row 4. Thus, continuing the counting and listing produces the same sequence as first appearing in row 4. Note that rows 5, 6 and all additional rows (not shown) are the same as row 4.

TABLE 2

| 0 | 1 | 2 | 3 | 4 | 5 | 6 | Row Number |
|---|---|---|---|---|---|---|------------|
| 5 | 6 | 5 | 3 | 0 | 0 | 0 | 1 |
| 3 | 0 | 0 | 1 | 0 | 2 | 1 | 2 |
| 3 | 2 | 1 | 1 | 0 | 0 | 0 | 3 |
| 3 | 2 | 1 | 1 | 0 | 0 | 0 | 4 |
| 3 | 2 | 1 | 1 | 0 | 0 | 0 | 5 |
| 3 | 2 | 1 | 1 | 0 | 0 | 0 | 6 |

The sequence is seen to converge to [3,2,1,1,0,0,0].

The Numgram (attractor process) converges to a fixed point "behavior" in an attractor space. This fixed point has a repeating cycle of one (a single step). One may represent this behavior in the attractor space by assigning a value, which is really a label, of 1 to this single step cycle. The label is expressed in an attractor space representation (also referred to above as the Label Space). In other cases, as seen below, the Numgram behavior is observed to repeat in a cycle of more than one step and in such case, one represents such behavior by assigning a value or label of 0 in the attractor space representation to distinguish such behavior from the one cycle behavior. The multiple cycle behavior is still termed a fixed point behavior meaning that the Numgram attractor process "converges" to a fixed type (number of cycles) of behavior in the attractor space. One may of course interchange the zero and one assignments as long as one is consistent. One may term the one cycle behavior as a converging behavior and the multiple cycle behavior as oscillating. The important point, however, is that there are two distinct types of behavior and that any given sequence will always (i.e., repeatedly) exhibit the same behavior and thus be mapped from a source space (the Fragment input pattern) to the attractor space (the fixed point behaviors) in a repeatable (i.e., predictable) manner.

Now one groups the nucleotides in pairs beginning at the left hand side of the fragment and counts the number of distinct pairs. Again, this counting may be facilitated by assigning a number 0, 1, 2, . . . 15 to each distinct pair and then counting the number of 0's, 1's, 2's, . . . 15's. The following Table 3 is useful for the conversion:

TABLE 3

| symbol | Mapped symbol | symbol | Mapped symbol |
|--------|---------------|--------|---------------|
| AA | 0 | GA | 8 |
| AC | 1 | GC | 9 |
| AG | 2 | GG | 10 |
| AT | 3 | GT | 11 |
| CA | 4 | TA | 12 |
| CC | 5 | TC | 13 |
| CG | 6 | TG | 14 |
| CT | 7 | TT | 15 |

For example, Fragment 1 is grouped into pairs as follows:

GG AT AC GT CG TA TA AC GT A(SEQ ID NO: 1) where the last nucleotide has no matching pair, it is simply dropped.

From Table 3, one may assign a number to each of the pairs as follows:

GG AT AC GT CG TA TA AC GT (residues 1–18 of SEQ ID NO: 1)

10 3 1 11 6 12 12 1 11 String 3

The string 3 sequence [10, 3, 1, 1, 6, 12, 12, 1, 11]now converted into base 7 to yield string 4:

[13, 3, 1, 14, 6, 15, 15, 1, 14]    String 4

A new Numgram is produced as in Table 4 with the first row labeling the columns according to the base 7 selected.

One now simply counts the number of 0's, 1's. . . . 6's and enters this count as the second row of the Numgram . In counting string 4, it is noted, for example, that the number of one's is 7 since one counts the ones regardless of whether they are part of other digits. For example, the string [13, 3, 3, 1] contains 2 ones. Using this approach, row 2 of the Numgram is seen to contain the string [0,7,0,2,2,2,1]. In the general case, every time a count value is larger than or equal to the base, it is converted modulo the base. Thus, the 7 in row 2 is converted into 10 (base 7) and again, the number of 0's, 1's . . . 6's are counted and listed in row 3 of the Numgram. (The intermediate step of mapping 7 into 10 is not shown). The counting step results in string [3,2,3,0,0,0,0] in row 3.

TABLE 4

| 0 | 1 | 2 | 3 | 4 | 5 | 6 | Row Number |
|---|---|---|---|---|---|---|------------|
| 0 | 7 | 0 | 2 | 2 | 2 | 1 | 2 |
| 3 | 2 | 3 | 0 | 0 | 0 | 0 | 3 |
| 4 | 0 | 1 | 2 | 0 | 0 | 0 | 4 |

TABLE 4-continued

| | | | | | | | Row Number |
|---|---|---|---|---|---|---|---|
| 4 | 1 | 1 | 0 | 1 | 0 | 0 | 5 |
| 3 | 3 | 0 | 0 | 1 | 0 | 0 | 6 |
| 4 | 1 | 0 | 2 | 0 | 0 | 0 | 7 |
| 4 | 1 | 1 | 0 | 1 | 0 | 0 | 8 |
| 3 | 3 | 0 | 0 | 1 | 0 | 0 | 6 |
| 4 | 1 | 0 | 2 | 0 | 0 | 0 | 7 |
| 4 | 1 | 1 | 0 | 1 | 0 | 0 | 8 |

This sequence has a 3-cycle behavior, repeating values beginning at row 5 with the string [4,1,1,0,1,0,0,]. As such, the Numgram is assigned a value of 0 in the attractor space representation.

TRIPLETS

One now groups the nucleotides into triplets (or codons) and again counts the number of distinct triplets. Fragment 1 separated into triplets is as follows:

GGA TAC GTC GTA TAA CGT A (SEQ ID NO: 1)

For ease of computation, one assigns a numerical value to each distinct triplet to assist in counting the sixty-four possible permutations. Any incomplete triplet groupings are ignored. The following Table 5 may be utilized.

TABLE 5

| symbol | Mapped symbol | symbol | Mapped symbol | Symbol | Mapped Symbol | Symbol | Mapped symbol |
|---|---|---|---|---|---|---|---|
| AAA | 0 | CAA | 16 | GAA | 32 | TAA | 48 |
| AAC | 1 | CAC | 17 | GAC | 33 | TAC | 49 |
| AAG | 2 | CAG | 18 | GAG | 34 | TAG | 50 |
| AAT | 3 | CAT | 19 | GAT | 35 | TAT | 51 |
| ACA | 4 | CCA | 20 | GCA | 36 | TCA | 52 |
| ACC | 5 | CCC | 21 | GCC | 37 | TCC | 53 |
| ACG | 6 | CCG | 22 | GCG | 38 | TCG | 54 |
| ACT | 7 | CCT | 23 | GCT | 39 | TCT | 55 |
| AGA | 8 | CGA | 24 | GGA | 40 | TGA | 56 |
| AGC | 9 | CGC | 25 | GGC | 41 | TGC | 57 |
| AGG | 10 | CGG | 26 | GGG | 42 | TGG | 58 |
| AGT | 11 | CGT | 27 | GGT | 43 | TGT | 59 |
| ATA | 12 | CTA | 28 | GTA | 44 | TTA | 60 |
| ATC | 13 | CTC | 29 | GTC | 45 | TCC | 61 |
| ATG | 14 | CTG | 30 | GTG | 46 | TTG | 62 |
| ATT | 15 | CTT | 31 | GTT | 47 | TTT | 63 |

Using Table 5, Fragment 1 is seen to be represented as String 5 below:

[40, 49, 45, 44, 48, 27]                                String 5.

Converting this string into base 7 yields:

[55, 100, 63, 62, 66, 36]                               String 6.

The Numgram may now be developed as seen in Table 6 below.

TABLE 6

| | | | | | | | Row Number |
|---|---|---|---|---|---|---|---|
| 0 | 1 | 2 | 3 | 4 | 5 | 6 | 1 |
| 2 | 1 | 1 | 2 | 0 | 2 | 5 | 2 |
| 1 | 2 | 3 | 0 | 0 | 1 | 0 | 3 |
| 3 | 2 | 1 | 1 | 0 | 0 | 0 | 4 |
| 3 | 2 | 1 | 1 | 0 | 0 | 0 | 5 |

The above sequence, as seen to exhibit type "1" behavior.

Collecting the tokens for strings 2 (single symbol), 4 (pair symbols) and 6 (triplet symbols) gives the sequence: [101]. Fragment 1 is further mapped using the Numgram tables for each of the three symbol combinations (single, pairs and triplets) for each of a plurality of sub-fragments obtained by deleting, one symbol at a time from the left of Fragment 1. A further mapping is preformed by deleting one symbol a time from the right of Fragment 1. Table 7 below illustrates a pyramid structure illustrating this further mapping and shows the main fragment (line 0) and the resulting 18 sub-fragments (lines 1–18).

TABLE 7

Sequence 1: GGATACGTCGTATAACGTA

| Left copy | Right copy | Line # |
|---|---|---|
| SEQ ID NO: 1<br>GGATACGTCGTATAACGTA | SEQ ID NO: 1<br>GGATACGTCGTATAACGTA | 0 |
| residues 2–19 of SEQ ID NO: 1<br>GATACGTCGTATAACGTA | residues 1–18 of SEQ ID NO: 1<br>GGATACGTCGTATAACGT | 1 |
| residues 3–19 of SEQ ID NO: 1<br>ATACGTCGTATAACGTA | residues 1–17 of SEQ ID NO: 1<br>GGATACGTCGTATAACG | 2 |
| residues 4–19 of SEQ ID NO: 1<br>TACGTCGTATAACGTA | residues 1–16 of SEQ ID NO: 1<br>GGATACGTCGTATAAC | 3 |
| residues 5–19 of SEQ ID NO: 1<br>ACGTCGTATAACGTA | residues 1–15 of SEQ ID NO: 1<br>GGATACGTCGTATAA | 4 |
| residues 6–19 of SEQ ID NO: 1<br>CGTCGTATAACGTA | residues 1–14 of SEQ ID NO: 1<br>GGATACGTCGTATA | 5 |
| residues 7–19 of SEQ ID NO: 1<br>GTCGTATAACGTA | residues 1–13 of SEQ ID NO: 1<br>GGATACGTCGTAT | 6 |
| residues 8–19 of SEQ ID NO: 1<br>TCGTATAACGTA | residues 1–12 of SEQ ID NO: 1<br>GGATACGTCGTA | 7 |
| residues 9–19 of SEQ ID NO: 1<br>CGTATAACGTA | residues 1–11 of SEQ ID NO: 1<br>GGATACGTCGT | 8 |

TABLE 7-continued

Sequence 1: GGATACGTCGTATAACGTA

| Left copy | Right copy | Line # |
|---|---|---|
| residues 10–19 of SEQ ID NO: 1 | residues 1–10 of SEQ ID NO: 1 | 9 |
| GTATAACGTA | GGATACGTCG | |
| TATAACGTA | GGATACGTC | 10 |
| ATAACGTA | GGATACGT | 11 |
| TAACGTA | GGATACG | 12 |
| AACGTA | GGATAC | 13 |
| ACGTA | GGATA | 14 |
| CGTA | GGAT | 15 |
| GTA | GGA | 16 |
| TA | GG | 17 |
| A | G | 18 |

To illustrate the further mapping, one examines the first, left sub-fragment shown in line 1 which is the sub-fragment:
  GATACGTCGTATAACGTA (residues 2–19 of SEQ ID NO: 1)
Performing the Numgram procedure for this first sub-fragment using one symbol at a time, two symbols at a time and three symbols at a time (in a similar fashion as illustrated above for the main fragment in line 0) gives the further mapping [000].

Taking the second sub-fragment on the left hand side of the pyramid shown in line 2 and performing the Numgram procedure for each symbol separately, pairs of symbols and triplets give the mapping [100]. Continuing with this process one may build a table of behavior values for each of the sub-fragments as shown in Table 8 below.

TABLE 8

Fragment 1; main and sub-fragment token strings for Left hand Side

| Line | Token String | Line | Token String |
|---|---|---|---|
| 0 | 101 | 10 | 100 |
| 1 | 000 | 11 | 100 |
| 2 | 100 | 12 | 100 |
| 3 | 000 | 13 | 000 |
| 4 | 111 | 14 | 000 |
| 5 | 001 | 15 | 000 |
| 6 | 110 | 16 | 000 |
| 7 | 000 | 17 | 000 |
| 8 | 110 | 18 | 000 |
| 9 | 000 | | |

The complete token string for the 19 symbols (labeled 0–18) of Fragment 1 obtained from the left hand side of the pyramid is thus written as:
G101000100000111001110000110000100100100000000000000000000 (0 . . . 18L) SEQ#1
SEQ#1 refers to Fragment 1, and (0 . . . 18L) refers to the initial source set which had 19 elements (nucleotides) and whose token string was formed, inter ala, by chopping one symbol at a time from the left of the original pattern. The label (0 . . . 18L) SEQ#1 thus uniquely identifies the source set. It will be recalled that the token string is simply a representation of the behavior of the source set interacting with the attractor process. Appending the identifying label (e. g., (0 . . . 18L) SEQ#1) to the token string maps the source set representation to an analytic space (also referred to above as the Classification Space). The analytic space is a space containing the union of the source set identification and the attractor set representation.

It will be appreciated that the subsequences as set forth in the inverted pyramids of Table 7 are assigned tokens according to the behavior resulting from the interaction of that subsequence with the attractor process. When elements are grouped one-at-a-time, the collective elements form an analytic sequence with each element of the analytic sequence being a single element from the initial fragment, namely, A,C, T or G. When the initial fragment elements (i.e., A, C, T, and G) are taken two-at-a-time, they form analytic sequence elements defined by Table 3 of which there are 16 unique elements. Thus, the original 4 distinct elements under this grouping are set forth as 16 distinct element pairs, and, under this grouping, string 1 becomes string 3. String 3 is collectively an analytic sequence where the sequence elements are given by Table 3. In a similar fashion, string 5 is collectively an analytic sequence where the sequence elements are given by Table 5 for the triplet grouping.

It is possible to perform further grouping of the original sequence elements to take them four-at-a-time, five-at-a-time, six-at-a-time and higher. Each further level of grouping may, in some applications prove useful in defining the fragment and uniquely characterizing it within an analytic space. These further groupings are especially appropriate were they have ontological meaning within the problem domain of interest. The methodology for forming these higher levels of grouping follows exactly the same procedure as set forth above for the single, pair and triplet groupings.

One may now repeat the same process by deleting one symbol from the right, essentially treating the sub-fragments of the right hand side of the pyramid. The resulting token string for the right side of the pyramid is given as:
G101001101101101000110110110010000100100000000000000000000000 (0 . . . 18R) SEQ#1
The initial "G": is used as a prefix to indicated the first letter symbol in the fragment as a further means of identifying the sequence. Similarly T, A and C may be used as a prefix where appropriate.

The resulting string of tokens represents the exact identity of the whole sequence and all its subsequences ordered from each end.

The two token strings corresponding to source sets (0 . . . 18L) SEQ#1 and (0 . . . 18R) SEQ#1 characterize Fragment 1, characterizing the behavior of single/pair/triplet groups of the nineteen symbols and their possible sub-fragments taken from the left and right.

One now needs to similarly map each of the sub-fragments. First one may chop off a symbol from the left hand side of fragment 1. Referring again to the pyramid of Table 7, the sequence to be mapped is:
  GATACGTCGTATAACGTA (residues 2–19 of SEQ ID NO: 1)

Treating this sub-fragment as before, one may develop the complete token strings for symbols (1 . . . 18L) using the Numgram tables as illustrated above. The nomenclature for symbols (1 . . . 18L) indicates that the starting sequence is composed of symbols 1 through 18 and that the token string is derived by chopping off one symbol from the left after each single/pair/triplet token is produced. A simplification may be used upon realizing that the sub-sequences are already present in (0 . . . 18L) and may be obtained by dropping the first three digits [101] resulting from the main Fragment single/pair/triplet mapping. Thus using (0 . . . 18L) SEQ# 1 and dropping the first three digits gives:
G00010000011100111000001100001001001000000000 000000000000 (1 . . . 18L) SEQ#1

The token strings for the right hand side of the pyramid may not be simply obtained from the prior higher level fragment and thus need to be generated using the Numgram tables as taught above.

The resulting token strings obtained by continuing to chop off a symbol from the left hand side of the pyramid (together with their token strings resulting by chopping off from the right for the same starting sequence) are as follows:

Chopping GGATACGTCGTATAACGTA (SEQ ID NO: 1) from the left . . .

Initially GGATACGTCGTATAACGTA (SEQ ID NO: 1) gives
G10100010000011100111000011000010010010000000 0000000000000 (0 . . . 18L) (SEQ#1)
G10100110110110100011011011001000010010000000 0000000000000 (0 . . . 18R) (SEQ#1)

GATACGTCGTATAACGTA (residues 2–19 of SEQ ID NO: 1)
G00010000011100111000011000010010010000000000 000000000 (1 . . . 18L) (SEQ#1)
G00010010010000011011001001000000000000000000 000000000 (1 . . . 18R) (SEQ#1)

where again, the second line ((1 . . . 18R) (SEQ#1)) uses the starting sequence of symbols (1 . . . 18) and chops successively from the right in building the token strings. One may continue to delete addition symbols from the left had side as seen below.

ATACGTCGTATAACGTA (residues 3–19 of SEQ ID NO: 1)
A10000011100111000011000010010010000000000000 00000 (2 . . . 18L) (SEQ#1)
A10000011001011001010000000000000000000000000 000000 (2 . . . 18R) (SEQ#1)

TACGTCGTATAACGTA (residues 4–19 of SEQ ID NO: 1)
T00011100111000011000010010010000000000000000 000 (3 . . . 18L) (SEQ#1)
T00010000110100111001001011000000000000000000 000 (3 . . . 18R) (SEQ#1)

ACGTCGTATAACGTA (residues 5–19 of SEQ ID NO: 1)
A11100111000011000010010010000000000000000000 (4 . . . 18L) (SEQ#1)
A11101101111111001000000000000000000000000000 000 (4 . . . 18R) (SEQ#1)

CGTCGTATAACGTA (residues 6–19 of SEQ ID NO: 1)
C00110000110001001001000000000000000000000 (5 . . . 18L) (SEQ#1)
C00101101100000000010000000000000000000000 (5 . . . 18R) (SEQ#1)

GTCGTATAACGTA (residues 7–19 of SEQ ID NO: 1)
G11000011000010010010000000000000000000 (6 . . . 18L) (SEQ#1)
G11011001001011011010000000000000000000000 (6 . . . 18R) (SEQ#1)

TCGTATAACGTA (residues 8–19 of SEQ ID NO: 1)
T00011000010010010000000000000000000 (7 . . . 18L) (SEQ#1)
T00010100110100010000000000000000000 (7 . . . 18R) (SEQ#1)

CGTATAACGTA (residues 9–19 of SEQ ID NO: 1)
C11000010010010000000000000000000 (8 . . . 18L) (SEQ#1)
C11001000010010000000000000000000 (8 . . . 18R) (SEQ#1)

GTATAACGTA (residues 10–19 of SEQ ID NO: 1)
G00010010010000000000000000000 (9 . . . 18L) (SEQ#1)
G00010010010000000000000000000 (9 . . . 18R) (SEQ#1)

TATAACGTA
T10010010000000000000000000 (10 . . . 18L) (SEQ#1)
T10000010000000000000000000 (10 . . . 18R) (SEQ#1)

ATAACGTA
A10010000000000000000000 (11 . . . 18L) (SEQ#1)
A10010000000000000000000 (11 . . . 18R) (SEQ#1)

TAACGTA
T10000000000000000000 (12 . . . 18L) (SEQ# 1)
T10000000000000000000 (12 . . . 18R) (SEQ# 1)

Further chopping of the symbols will only produce zeros so that the Numgram process may be stopped at symbols sequence (12 . . . 18), i.e., the $13^{th}$ through $19^{th}$ symbol.

One may now go back to the main Fragment 1 and form "right" side sub-fragments taken from the right hand side of the pyramid. Successive left and right symbol chopping using the right hand side of the pyramid gives token strings of the symbol sequences, (0 . . . 17L); (0 . . . 17R); (0 . . . 16L); (0 . . . 16R) . . . etc. It is noted that some simplification may again take place in that (0 . . . 17R) may be obtained from the already computed value of (0 . . . 18R) by dropping the initial 3 digits. Further, (0 . . . 16R) may be obtained from (0 . . . 17R) by dropping the initial 3 digits from (0 . . . 17R) etc.

The resulting token strings obtained by continuing to chop off a symbol from the right hand side of the pyramid (together with their token strings for the same level left hand side) are as follows:

Chopping GGATACGTCGTATAACGTA (SEQ ID NO: 1) from the right . . .

GGATACGTCGTATAACGT (residues 1–18 of SEQ ID NO: 1)
G00110000010001101111010101010000010000000000 000000000 (0 . . . 17L) (SEQ#1)
G00110110110100011011011001000010010000000000 000000000 (0 . . . 17R) (SEQ#1)

GGATACGTCGTATAACG (residues 1–17 of SEQ OF NO: 1)
G10110011000101101101000100010010000000000000 0000000 (0 . . . 16L) (SEQ#1)
G10110110100011011011001000010010000000000000 0000000 (0 . . . 16R) (SEQ#1)

GGATACGTCGTATAAC (residues 1–16 of SEQ ID NO: 1)
G10110001010111100001010110010000000000000000 00000 (0 . . . 15L) (SEQ#1)
G10110100011011011001000010010000000000000000 0000 (0 . . . 15R) (SEQ#1)

GGATACGTCGTATAA (residues 1–15 of SEQ ID NO: 1)

G10100011000111000011000010000000000000000000 (0 . . . 14L) (SEQ#1)
G10100011011011001000010010000000000000000000 (0 . . . 14R) (SEQ#1)
    GGATACGTCGTATA (residues 1–14 of SEQ ID NO: 1)
G00011001011001000011010000000000000000000 (0 . . . 13L) (SEQ#1)
G00011011011001000010010000000000000000000 (0 . . . 13R) (SEQ#1)
    GGATACGTCGTAT (residues 1–13 of SEQ ID NO: 1)
G11011010001000010010000000000000000000 (0 . . . 12L) (SEQ#1)
G11011011001000010010000000000000000000 (0 . . . 12R) (SEQ#1)
    GGATACGTCGTA (residues 1–12 of SEQ ID NO: 1)
G110010000010000000000000000000000 (0 . . . 11L) (SEQ#1)

GGATACGTC
G000000000000000000000000000 (0 . . . 8L) (SEQ#1)
G000100100000000000000000000 (0 . . . 8R) (SEQ#1)
    GGATACGT
G10000000000000000000000 (0 . . . 7L) (SEQ#1)
G10010000000000000000000 (0 . . . 7R) (SEQ#1)
    GGATACG
G10000000000000000000 (0 . . . 6L) (SEQ#1)
G10000000000000000000 (0 . . . 6R) (SEQ#1)

A similar procedure may be used to obtain the token strings for Fragment 2 (sequence 2). The pyramid for use in computing the right and left sub-fragments is as follows:

Sequence 2: TATAACGTATTAGACACGG

| Left Copy | Right Copy | Line # |
|---|---|---|
| SEQ ID NO: 2 | SEQ ID NO: 2 | 0 |
| TATAACGTATTAGACACGG | TATAACGTATTAGACACGG | |
| Residues 2–19 of SEQ ID NO: 2 | residues 1–18 of SEQ ID NO: 2 | 1 |
| ATAACGTATTAGACACGG | TATAACGTATTAGACAC | |
| Residues 3–19 of SEQ ID NO: 2 | residues 1–17 of SEQ ID NO: 2 | 2 |
| TAACGTATTAGACACGG | TATAACGTATTAGACAC | |
| Residues 4–19 of SEQ ID NO: 2 | residues 1–16 of SEQ ID NO: 2 | 3 |
| AACGTATTAGACACGG | TATAACGTATTAGACA | |
| Residues 5–19 of SEQ ID NO: 2 | residues 1–15 of SEQ ID NO: 2 | 4 |
| ACGTATTAGACACGG | TATAACGTATTAGAC | |
| Residues 6–19 of SEQ ID NO: 2 | residues 1–14 of SEQ ID NO: 2 | 5 |
| CGTATTAGACACGG | TATAACGTATTAGA | |
| Residues 7–19 of SEQ ID NO: 2 | residues 1–13 of SEQ ID NO: 2 | 6 |
| GTATTAGACACGG | TATAACGTATTAG | |
| Residues 8–19 of SEQ ID NO: 2 | residues 1–12 of SEQ ID NO: 2 | 7 |
| TATTAGACACGG | TATAACGTATTA | |
| Residues 9–19 of SEQ ID NO: 2 | residues 1–11 of SEQ ID NO: 2 | 8 |
| ATTAGACACGG | TATAACGTATT | |
| Residues 10–19 of SEQ ID NO: 2 | residues 1–10 of SEQ ID NO: 2 | 9 |
| TTAGACACGG | TATAACGTAT | |
| TAGACACGG | TATAACGTA | 10 |
| AGACACGG | TATAACGT | 11 |
| GACACGG | TATAACG | 12 |
| ACACGG | TATAAC | 13 |
| CACGG | TATAA | 14 |
| ACGG | TATA | 15 |
| CGG | TAT | 16 |
| GG | TA | 17 |
| G | T | 18 |

G11011001000010010000000000000000000 (0 . . . 11R) (SEQ#1)
    GGATACGTCGT (residues 1–11 of SEQ ID NO: 1)
G110010000110000000000000000000 (0 . . . 10L) (SEQ#1)
G110010000100100000000000000000 (0 . . . 10R) (SEQ#1)
    GGATACGTCG (residues 1—10 of SEQ ID NO: 1)
G01000000000000000000000000 (0 . . . 9L) (SEQ#1)
G01000010010000000000000000 (0 . . . 9R) (SEQ#1)

The results for Fragment 2 are as follows:
Chopping TATAACGTATTAGACACGG (SEQ ID NO: 2) from the left . . .
TATAACGTATTAGACACGG (SEQ ID NO: 2)
T001110100100110011110110100001000000000000000000000 (0 . . . 18L) (SEQ#2)
T001101011111010011110111100101000001000000000000000000 (0 . . . 18R) (SEQ#2)
    ATAACGTATTAGACACGG (residues 2–19 of SEQ ID NO: 2)
A1101001001100111101101000001000000000000000000000000 (1 . . . 18L) (SEQ#2)

A1101000001001010010011000001001001000000000000000000000 (1 ... 18R) (SEQ#2)

TAACGTATTAGACACGG (residues 3–19 of SEQ ID NO: 2)

T1001001100111101101000001000000000000000000000000 (2 ... 18L) (SEQ#2)

T1001000101101100101100101000001000000000000000000000 (2 ... 18R) (SEQ#2)

AACGTATTAGACACGG (residues 4–19 of SEQ ID NO: 2)

A10011001111011010000010000000000000000000000000 (3 ... 18L) (SEQ#2)

A100010111111111000000100000100000000000000000000 (3 ... 18R) (SEQ#2)

ACGTATTAGACACGG (residues 5–19 of SEQ ID NO: 2)

A11001111011010000010000000000000000000000000 (4 ... 18L) (SEQ#2)

A1100111111111010011010001000000000000000000000 (4 ... 18R) (SEQ#2)

CGTATTAGACACGG (residues 6–19 of SEQ ID NO: 2)

C01111011010000010000000000000000000000000 (5 ... 18L) (SEQ#2)

C01101111111001010010010000000000000000000000 (5 ... 18R) (SEQ#2)

GTATTAGACACGG (residues 7–19 of SEQ ID NO: 2)

G11011010000010000000000000000000000000 (6 ... 18L) (SEQ#2)

G11011011001010000000000000000000000000 (6 ... 18R) (SEQ#2)

TATTAGACACGG (residues 8–19 of SEQ ID NO: 2)

T110100000100000000000000000000000 (7 ... 18L) (SEQ#2)

T110101001101000000000000000000000000 (7 ... 18R) (SEQ#2)

ATTAGACACGG (residues 9–19 of SEQ ID NO: 2)

A1000001000000000000000000000000 (8 ... 18L) (SEQ#2)

A100000100100100000000000000000000 (8 ... 18R) (SEQ#2)

TTAGACACGG (residues 10–19 of SEQ ID NO: 2)

T000100000000000000000000000000 (9 ... 18L) (SEQ#2)

T000000100100000000000000000000000 (9 ... 18R) (SEQ#2)

TAGACACGG

T100000000000000000000000000 (10 ... 18L) (SEQ#2)

T1001001000000000000000000000 (10 ... 18R) (SEQ#2)

AGACACGG

A000000000000000000000000 (11 ... 18L) (SEQ#2)

A000000000000000000000000 (11 ... 18R) (SEQ#2)

GACACGG

G0000000000000000000000 (12 ... 18L) (SEQ#2)

G0000000000000000000000 (12 ... 18R) (SEQ#2)

Chopping TATAACGTATTAGACACGG (SEQ ID NO: 2) from the right ...

TATAACGTATTAGACACG (residues 1–18 of SEQ ID NO: 2)

T101100100010011011110101000001000000000000000000000000 (0 ... 17L) (SEQ#2)

T10101111110100111101111001010000010000000000000000000 (0 ... 17R) (SEQ#2)

TATAACGTATTAGACAC (residues 1–17 of SEQ ID NO: 2)

T0110000101111111111100011001001000000000000000000 (0 ... 16L) (SEQ#2)

T0111111010011110111100101000001000000000000000000000 (0 ... 16R) (SEQ#2)

TATAACGTATTAGACA (residues 1–16 of SEQ ID NO: 2)

T111100110111111100101011001000000000000000000000 (0 ... 15L) (SEQ#2)

T11110100111101111001010000010000000000000000000000 (0 ... 15R) (SEQ#2)

TATAACGTATTAGAC (residues 1–15 of SEQ ID NO: 2)

T1011011101111010101000001000000000000000000000 (0 ... 14L) (SEQ#2)

T101001111011110010100000100000000000000000000000 (0 ... 14R) (SEQ#2)

TATAACGTATTAGA (residues 1–14 of SEQ ID NO: 2)

T001001010000001100000000000000000000000000 (0 ... 13L) (SEQ#2)

T00111101111001010000010000000000000000000 (0 ... 13R) (SEQ#2)

TATAACGTATTAG (residues 1–13 of SEQ ID NO: 2)

T111001110000101100000000000000000000000 (0 ... 12L) (SEQ#2)

T111011110010100001000000000000000000000 (0 ... 12R) (SEQ#2)

TATAACGTATTA (residues 1–12 of SEQ ID NO: 2)

T01110001010000010000000000000000000000 (0 ... 11L) (SEQ#2)

T0111100101000001000000000000000000000 (0 ... 11R) (SEQ#2)

TATAACGTATT (residues 1–11 of SEQ ID NO: 2)

T110000100001000000000000000000000 (0 ... 10L) (SEQ#2)

T110010100001000000000000000000000 (0 ... 10R) (SEQ#2)

TATAACGTAT (residues 1—10 of SEQ ID NO: 2)

T01010000010000000000000000000000 (0 ... 9L) (SEQ#2)

T01010000010000000000000000000000 (0 ... 9R) (SEQ#2)

TATAACGT

T10010010000000000000000000000 (0 ... 8L) (SEQ#2)

T10000010000000000000000000000 (0 ... 8R) (SEQ#2)

TATAACGT

T1001001000000000000000000000 (0 ... 7L) (SEQ#2)

T100000100000000000000000000 (0 ... 7R) (SEQ#2)

TATAACG

T10000000000000000000000 (0 ... 6L) (SEQ#2)

T10000000000000000000000 (0 ... 6R) (SEQ#2)

Since the fragments (and their sub-fragments) are uniquely mapped to the token strings, fragment matching is simply obtained by sorting the token strings in ascending order for like pre-fixed letters. Matching fragment and/or sub-fragments will sort next to each other as they will have identical values for their token strings.

Sorting gives the following results:

Sorted bit strings:

A000000000000000000000000 (11 ... 18R) (SEQ#2)

A1000000000000000000000000 (11 ... 18L) (SEQ#2)

A1000001000000000000000000000000 (8 ... 18L) (SEQ#2)

A100000100100100000000000000000000 (8 ... 18R) (SEQ#2)

A1000001100101100101000000000000000000000000000 (2 ... 18R) (SEQ#1)

A10000011100111000011000010010010000000000000000 (2 ... 18L) (SEQ#1)

A100010111111111000000100000100000000000000000000 (3 ... 18R) (SEQ#2)

A100100000000000000000000 (11 . . . 18R) (SEQ#1)
A100100000000000000000000 (11 . . . 18L) (SEQ#1)
A1001100111101101000010000000000000000000 (3 . . . 18L) (SEQ#2)
A1100111101101000010000000000000000000000 (4 . . . 18L) (SEQ#2)
A11001111111110100110100010000000000000000 (4 . . . 18R) (SEQ#2)
A1101000010010100100110000100100100000000000000000 (1 . . . 18R) (SEQ#2)
A1101001001100111101101000010000000000000000000000 (1 . . . 18L) (SEQ#2)
A1110011100001100001001001000000000000000000 (4 . . . 18L) (SEQ#1)
A11101101111111001000000000000000000000000 (4 . . . 18R) (SEQ#1)
C00101101100000000100000000000000000000000 (5 . . . 18R) (SEQ#1)
C001110000110000100100100000000000000000000 (5 . . . 18L) (SEQ#1)
C0110111111100101001001000000000000000000000 (5 . . . 18R) (SEQ#2)
C011110110100001000000000000000000000000 (5 . . . 18L) (SEQ#2)
C11000010010010000000000000000000000 (8 . . . 18L) (SEQ#1)
C110010000100100000000000000000000000 (8 . . . 18R) (SEQ#1)
G000000000000000000000 (12 . . . 18L) (SEQ#2)
G000000000000000000000 (12 . . . 18R) (SEQ#2)
G0000000000000000000000000 (0 . . . 8L) (SEQ#1)
G000100000111001110000110000100100100000000000000000 (1 . . . 18L) (SEQ#1)
G000100100000000000000000000 (0 . . . 8R) (SEQ#1)
G00010010010000000000000000000 (9 . . . 18R) (SEQ#1)
G00010010010000100000000000000000 (9 . . . 18L) (SEQ#1)
G001001010001011001001000000000000000000000 (1 . . . 18R) (SEQ#1)
G0001100101100100001101000000000000000000 (0 . . . 13L) (SEQ#1)
G0001101101100100001001000000000000000000 (0 . . . 13R) (SEQ#1)
G00110000010001101111010101010001001000000000000000000000 (0 . . . 17L) (SEQ#1)
G0011011011010001101101100100001001000000000000000000000 (0 . . . 17R) (SEQ#1)
G01000000000000000000000000000 (0 . . . 9L) (SEQ#1)
G01000100100000000000000000000 (0 . . . 9R) (SEQ#1)
G100000000000000000000 (0 . . . 6R) (SEQ#1)
G100000000000000000000 (0 . . . 6L) (SEQ#1)
G1000000000000000000000 (0 . . . 7L) (SEQ#1)
G1001000000000000000000 (0 . . . 7R) (SEQ#1)
G1010001000001110011100001100001001001000000000000000000000 (0 . . . 18L) (SEQ#1)
G1010011000111000011000010000000000000000000 (0 . . . 14L) (SEQ#1)
G10100011011011001000010010000000000000000000 (0 . . . 14R) (SEQ#1)
G101001101101101000110110110010000100100000000000000000000 (0 . . . 18R) (SEQ#1)
G10100110110110100011011011001000010010000000000000000000 (0 . . . 15L) (SEQ#1)
G10110000101011100001010110010000000000000000000 (0 . . . 16L) (SEQ#1)
G1011001100010110110110100010001001000000000000000000000 (0 . . . 15R) (SEQ#1)
G1011011010001101101100100001001000000000000000000000 (0 . . . 16R) (SEQ#1)
G110000110000100100100000000000000000000000 (6 . . . 18L) (SEQ#1)
G1100100000100000000000000000000000 (0 . . . 11L) (SEQ#1)
G11001000010010000000000000000000000 (0 . . . 10R) (SEQ#1)
G110010000110000000000000000000000 (0 . . . 10L) (SEQ#1)
G110110010000100000000000000000000 (0 . . . 11R) (SEQ#1)
G110110010010110110100000000000000000000 (6 . . . 18R) (SEQ#1)
G11011010001000000000000000000000000 (6 . . . 18L) (SEQ#2)
G110110100010001001000000000000000000 (0 . . . 12L) (SEQ#1)
G1101101100100001001000000000000000000 (0 . . . 12R) (SEQ#1)
G110110110010100000000000000000000000 (6 . . . 18R) (SEQ#2)
T00000010010000000000000000000 (9 . . . 18R) (SEQ#2)
T000100000000000000000000 (0 . . . 7R) (SEQ#2)
T000100000000000000000000 (0 . . . 7L) (SEQ#2)
T000100000000000000000000000 (9 . . . 18L) (SEQ#2)
T00010000110100111001001011000000000000000000 (3 . . . 18R) (SEQ#1)
T0001010011010001000000000000000000000 (7 . . . 18R) (SEQ#1)
T0001100001001001000000000000000000000 (7 . . . 18L) (SEQ#1)
T000111001110000110000100100100000000000000000000 (3 . . . 18L) (SEQ#1)
T00100101000000110000000000000000000000000 (0 . . . 13L) (SEQ#2)
T001101011111101001111011110010100000100000000000000000000 (0 . . . 18R) (SEQ#2)
T11101001001100111101101000010000000000000000000000 (0 . . . 18L) (SEQ#2)
T001110111001010000100000000000000000000 (0 . . . 13R) (SEQ#2)
T0101000001000000000000000000000 (0 . . . 9L) (SEQ#2)
T0101000001000000000000000000000 (0 . . . 9R) (SEQ#2)
T011000010111111111100011001001000000000000000000000 (0 . . . 16L) (SEQ#2)
T01110001010000100000000000000000000 (0 . . . 11L) (SEQ#2)
T01111001010000100000000000000000000 (0 . . . 11R) (SEQ#2)
T0111111010011101110010100001000000000000000000000 (0 . . . 16R) (SEQ#2)
T10000000000000000000 (12 . . . 18R) (SEQ#1)
T10000000000000000000 (12 . . . 18L) (SEQ#1)
T1000000000000000000000 (0 . . . 6R) (SEQ#2)
T1000000000000000000000 (0 . . . 6L) (SEQ#2)
T100000000000000000000000 (10 . . . 18L) (SEQ#2)
T10000010000000000000000 (10 . . . 18R) (SEQ#1) . . .
T100000000000000000000000 (0 . . . 8R) (SEQ#2) . . .
T100010010110110010110010100000100000000000000 (2 . . . 18R) (SEQ#2)
T100100000000000000000000 (0 . . . 8L) (SEQ#2) . . .
T100100100000000000000000 (10 . . . 18R) (SEQ#2)
T10010010000000000000000 (10 . . . 18L) (SEQ#1) . . .
T100100110011110110100000100000000000000000000 (2 . . . 18L) (SEQ#2)

T101001110111100101000001000000000000000000 (0 ... 14R) (SEQ#2)
T10101111101001111011110010100001000000000000000000 (0 ... 17R) (SEQ#2)
T101100100010011011110101000000100000000000000000000 (0 ... 17L) (SEQ#2)
T10110111011110101010000010000000000000000000 (0 ... 14L) (SEQ#2)
T110000100001000000000000000000000 (0 ... 10L) (SEQ#2)
T110010100001000000000000000000000 (0 ... 10R) (SEQ#2)
T1101000001000000000000000000000000000 (7 ... 18L) (SEQ#2)
T1101010011010000000000000000000000 (7 ... 18R) (SEQ#2)
T11100111000010110000000000000000000000 (0 ... 12L) (SEQ#2)
T11101111001010000010000000000000000000 (0 ... 12R) (SEQ#2)
T1111100110111111100101011001000000000000000000 (0 ... 15L) (SEQ#2)
T111101001111011110010100000100000000000000000 (0 ... 15R) (SEQ#2)

From the above example, it may be seen that a match appears at (10 ... 18R)SEQ#1 with (0 ... 8R)SEQ#2 both of which correspond to the sub-fragment TATAACGTA.

As may be seen by the above example, when the attractor tokens are mapped into a numerical space, sequence-similarity characteristics are compared by evaluating the numerical distance of the coordinate values. When the attractor tokens are mapped into a Hausdorf or other similar pattern space, the tokens cause sequence-similarity characteristics to be compared by evaluating the spatial vectors.

While the example above has been given for base 7, any other base may be chosen. While choosing a different base may result in different token strings, the token strings will still be ordered next to each other with identical values for identical fragments or sub-fragments from the two (or more) fragments to be compared. For example, one could spell out "one" "two" etc. in English (e.g., for Tables 1–7). With an appropriate change in the Numgram base, such as 26 for the English language, the attractor behavior will still result in unique mappings for input source sets. For example, using Fragment 1 (GGATACGTCGTATAACGTA) (SEQ ID NO: 1), the number of A's, C's, G's and T's is shown below in Table 9 designated by Arabic symbols in row 1 and by spelling out the quantity using a twenty six base English alphabet symbol scheme in row 2.

TABLE 9

| A | C | G | T | Row |
|---|---|---|---|---|
| 5 | 6 | 5 | 3 | 1 |
| Five | six | Five | Three | 2 |

The Numgram table may be constructed as before, but the count base is now 26 and each entry is spelled out using the 26 English alphabet count base. Thus, the first few rows of the thus constructed Numgram table are shown below as Table 10 with columns deleted that contain no entries to conserve space in the table presentation.

TABLE 10

|   | A | C | E | F | G | H | I | L | M | N | O | R | S | T | U | V | W | X |
|---|---|---|---|---|---|---|---|---|---|---|---|---|---|---|---|---|---|---|
| 1 | Five | six |   |   | five |   |   |   |   |   |   |   |   | three |   |   |   |   |
| 2 |   |   | four | two |   |   | one | Three |   |   |   | One | one | one |   | two |   | one |
| 3 |   |   | seven | one |   |   | one |   |   | five | eight | Two |   | three | one |   | two |   |
| 4 |   |   | nine | one | one | two | Two |   |   | four | five | One | one | four |   | two | two |   |
| 5 |   |   | six | three |   |   | Two |   |   | six | ten | Two |   | four | two | one | four |   |
| 6 |   |   | four | two |   | one | Two |   |   | two | six | Three | two | five | two |   | three | two |

The fixed point behavior (convergence) of the sequence does not occur until line 574 (at the $573^{rd}$ iteration) and the cycle repeats again at iteration line 601 for a cycle length of 27 as shown in the partial Table 11 below.

TABLE 11

| Row | E | F | G | H | I | L | N | O | R | S | T | U | V | W | X |
|---|---|---|---|---|---|---|---|---|---|---|---|---|---|---|---|
| 574 | twelve | two |   | two | two | one | six | nine | four | two | four | two | one | two | two |
| 575 | five | two |   |   | two | one | four | eleven | two | one | eight | two | one | eight | one |
| 576 | ten | two | two | two | three | one | five | nine | one |   | six | one | two | four |   |
| 577 | eight | two |   | one | three |   | six | eight | two | one | six | one | one | four | one |
| 578 | nine | one | two | three | four |   | five | eight | two | two | five | one |   | two | two |
| 579 | eight | three | one | two | four |   | four | eight | two |   | seven | one | two | five |   |
| 580 | nine | three | two | Three | three |   | three | seven | three | one | six | two | two | three |   |
| 581 | sixteen |   |   | Six | two |   | four | four | six | two | nine |   | one | three | one |
| 582 | seven | two |   | One | four |   | five | six | three | three | four | two |   | two | three |
| 583 | ten | three |   | Three | two |   | two | six | five | two | six | two | two | three | one |
| 584 | nine | one |   | Three | three |   | two | six | three | two | nine |   | one | five | two |
| 585 | eleven | one |   | Three | four |   | six | five | three | one | six |   | one | three | one |
| 586 | fourteen | two |   | Three | three | one | five | five | four | two | three | one |   |   | two |
| 587 | twelve | four |   | Three | two |   | three | eight | five |   | eight | two | two | four |   |
| 588 | nine | three | two | Four | three | one |   | five | four |   | eight | two | two | four |   |

TABLE 11-continued

| Row | E | F | G | H | I | L | N | O | R | S | T | U | V | W | X |
|---|---|---|---|---|---|---|---|---|---|---|---|---|---|---|---|
| 589 | eight | four | one | Three | three | | three | seven | five | | six | three | one | three | |
| 590 | sixteen | two | one | Six | three | | three | three | six | two | six | one | two | | one |
| 591 | eleven | | | Three | four | | four | six | three | four | seven | | | three | four |
| 592 | eleven | four | | Three | one | one | two | Four | seven | two | three | four | two | | one |
| 593 | twelve | three | | Two | | one | five | Nine | five | one | five | three | two | three | |
| 594 | fourteen | three | | Three | four | one | four | Four | three | | six | | four | three | |
| 595 | eleven | five | | Four | one | | two | Six | nine | one | five | five | | | one |
| 596 | ten | four | | | five | one | six | Five | one | one | one | one | four | one | one |
| 597 | ten | four | | | three | | eight | Nine | two | one | one | two | two | | one |
| 598 | eight | one | one | Two | two | | six | Seven | two | | six | one | | three | |
| 599 | eight | | one | Two | three | | four | Six | one | three | five | | one | three | two |
| 600 | eleven | two | one | Four | three | | three | Six | four | one | six | one | one | two | one |
| 601 | twelve | two | | Two | two | one | six | Nine | four | two | four | two | one | two | two |
| 602 | five | two | | | two | one | four | Eleven | two | one | eight | two | one | eight | one |
| 603 | ten | two | two | Two | three | one | five | Nine | one | | six | one | two | four | |

In the above Table 11, only the first three lines, lines 601–603 of the second repeat cycle are shown. Other sequences result in other convergence cycles and internal structures. For simplicity in presentation of the table only non-zero columns are set forth.

A second fixed point behavior having a second distinct cycle length is illustrated by the starting sequence 10, 1, 16, 8. Here, the input to the 26 base Numgram is "ten, one, sixteen and eight", which could correspond to occurrences of the base pairs in the DNA model.

This sequence converges in only 29 cycles and has a cycle length of 3 as shown by the partial pattern results in the Table 12 below.

TABLE 12

| | E | F | H | I | L | N | O | R | S | T | U | V | W | X |
|---|---|---|---|---|---|---|---|---|---|---|---|---|---|---|
| 29 | Nine | three | two | one | | five | Nine | five | one | five | three | | two | one |
| 30 | Twelve | three | two | five | | seven | Five | two | | four | | three | two | |
| 31 | Ten | three | two | two | one | one | Four | three | one | six | one | four | four | |
| 32 | nine | three | two | one | | five | Nine | five | one | five | three | | two | one |
| 33 | twelve | three | two | five | | seven | Five | two | | four | | three | two | |
| 34 | ten | three | two | two | one | one | Four | three | one | six | one | four | four | |

Yet a further fixed point behavior is observed with the input pattern 4, 6, 4, 3 which is input into the 26 base Numgram as "four, six, four three" for the base pairs C, T, G and A. The results are shown in Table 13 below.

TABLE 13

| | E | F | H | I | L | N | O | R | S | T | U | V | W | X |
|---|---|---|---|---|---|---|---|---|---|---|---|---|---|---|
| 9 | nine | two | one | two | one | three | six | two | two | five | one | three | Four | one |
| 10 | ten | two | two | three | | six | nine | three | one | six | one | one | Four | one |
| 11 | ten | one | two | three | | seven | seven | three | two | five | one | | Two | two |
| 12 | twelve | one | two | one | | five | six | two | two | seven | | three | Four | |
| 13 | nine | two | one | two | one | three | six | two | two | five | one | three | Four | one |
| 14 | ten | two | two | three | | six | nine | three | one | six | one | one | Four | one |

The above Table 13 shows a fixed point behavior of 4 cycles. The examples of Tables 11, 12, and 13 demonstrate that at least three fixed point behaviors (each having different cycle lengths) are obtained with the 26 base Numgram using the English letters as the symbol scheme.

Moreover, one may generalize the notion of bases as one is not restricted to numeric bases or even alpha-numeric bases. The Numgram process is much more generally applicable to any symbol set and any abstract base to represent the symbols. For example consider the following sequence:

Sequence A: ♠ ¤ ♪ ¤ ☺ ♠ ♠ ♪ ☺ ♂

Base A: @ # $ % &

One can code sequence A with base A using the Numgram procedure as follows:

Associate each unique sequence of sequence A with a base. If there are not enough terms in the chosen base, represent the number modulo the number of terms in the base. For example, there are 5 unique members of the base set representing numerals 0, 1, 2, 3, and 4. To represent the next higher number, i.e., 5, one can write # @. Alternatively, one may simply, add more elements to the base, say new element ─( until there are enough members to map each symbol of Sequence A to one member of the base or unique combinations of base members.

Sequence ♠ ¤ ♪ ¤ ☺ ♠ ♠ ♪ ☺ ♂

Base A: @ # $ # % @ @ $ % &

Now count the number of each base element and insert into the Numgram:

| @ | # | $ | % | & |
| @ | $ | $ | $ | # |
| @ | # | % | # | @ |
| $ | $ | @ | # | @ |
| $ | # | $ | @ | @ |
| $ | # | $ | @ | @ |

The sequence is seen to converge to the behavior $ # $ @ @. In the example used earlier, one would assign a token value of 1.

The above example using non-conventional symbols and base members is meant to illustrate the generality of the Numgram approach in producing iterative and contractive results. By "contractive" it is understood that the process eventually converges to a fixed point behavior (repetitive over one or more cycles).

Figure 1B:
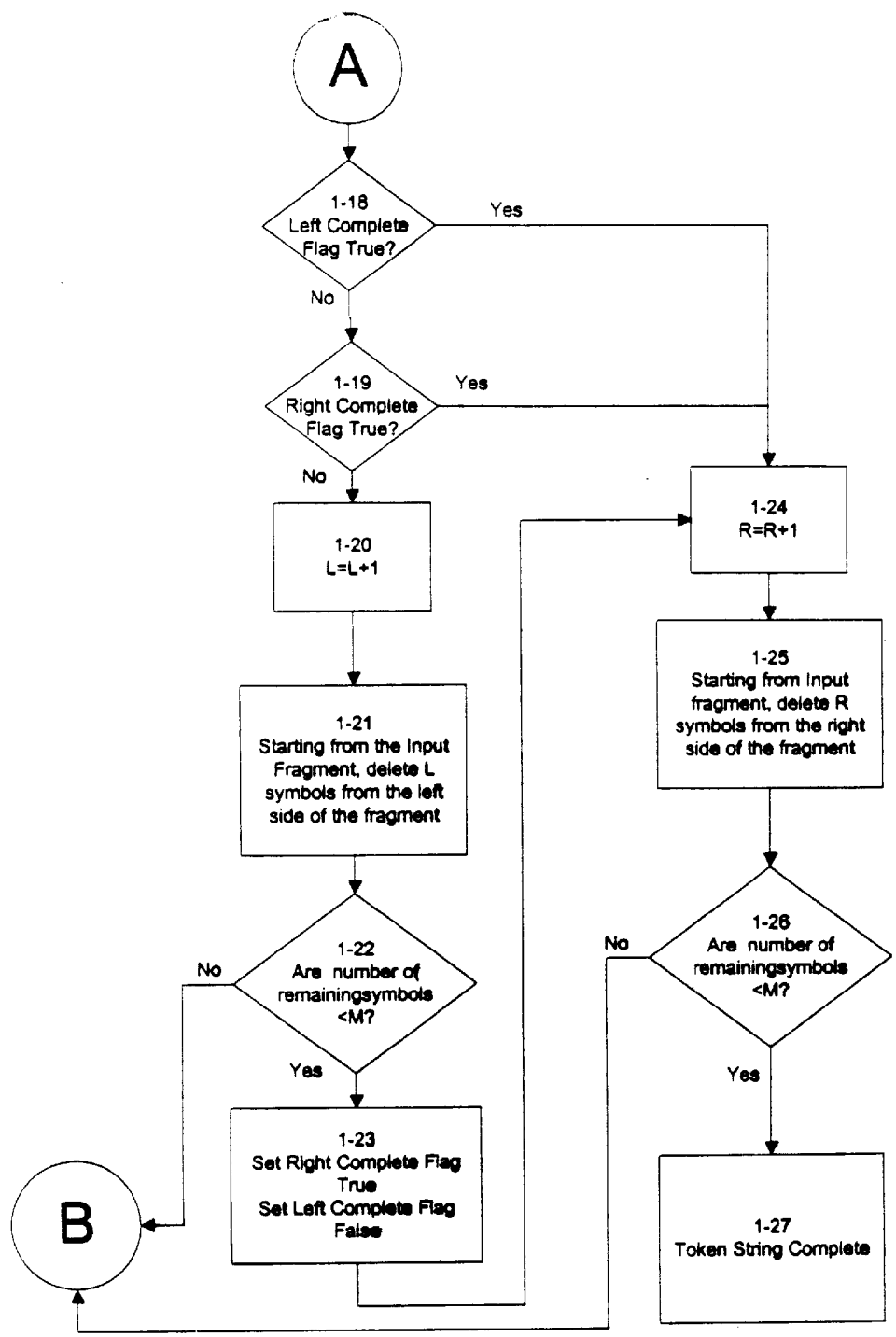

The iterative and contractive process characteristic of hierarchical multidimensional attractor space is generally described in relation to FIGS. 1A and 1B, collectively referred to as FIG. 1. In step 1-1 of FIG. 1 an input fragment is read into the system which may comprise, for example a digital computer or signal processor. More generally, the system or device may comprise any one or more of hardware, firmware and software configured to carry out the described Numgram process. Hardware elements configured as programmable logic arrays may be used. In step 1-2, index values L and R are both set to zero; the Left Complete Flag is set false; and the Right Complete Flag is set false. In step 1-3, index value n is initialized to 1. In step 1-4 the input sequence is broken up into groups, with n (in this case, initially, n=1) member in each group. This step corresponds to taking each nucleotide singly as in the examples discussed above. In step 1-5, a numeric value is assigned to each member of each group using a base 10 for example. The count value for each number is then converted into the selected base in step 1-6. In step 1-7 the Numgram procedure is performed for the fragment or sub-fragment under consideration. One recursively counts the number of elements from the preceding row and enters this counted value into the current row until a fixed behavior is observed (e.g., converging or oscillating, or alternatively oscillating with cycle 1 or oscillating with cycle greater that 1). If the observed behavior has a cycle length of 1, the behavior is assigned a token value of "1" as performed in step 1-8. If the observed behavior has cycle length greater than 1, one assigns a "0" as the token value. The token values are entered into a token string with the ID of the starting sequence, including all prefixes and suffixes.

In step 1-9, the index value is increased by one so that n=2. In step 1-10 the current value of n is compared to some fixed value, as for example, 3. If n is not greater than 3, the procedure goes again to step 1-4 where the input sequence or fragment is broken into groups with each group having 2 members. Thus, n=2 corresponds to taking the nucleotides in pairs. Steps 1-5 to 1-9 are again repeated to obtain the second token.

In step 1-9, the index value is again increased by one so that n=3. In step 1-10 the current value of n is compared to the same fixed value, as for example, 3. If n is not greater than 3, the procedure goes again to step 1-4 where the input sequence or fragment is broken into groups with each group having 3 members (codon). Thus, n=3 corresponds to taking the nucleotides in triplets. Steps 1-5 to 1-9 are again repeated to obtain the third token.

In the example of the first fragment GGATACGTCG-TATAACGTA (SEQ ID NO: 1), the token value for n=1 is 1; for n=2 is 0; and for n=3 is 1 as seen by the first three digits of (0 . . . 18L)(SEQ#1), Once step 1-10 is reached after the third time around, n>3 and the program proceeds to step 1-11 where the Left Complete Flag is checked. Since this flag was set false in step 1-2, the program proceeds to step 1-12 where one symbol is deleted from the left side of the fragment. Such deletion produces the first sub-fragment in the pyramid of Table 7 (line 1, left side), namely the sequence: GATACGTCGTATAACGTA (residues 2–19 of SEQ ID NO: 1). In step 1-13 one examines the resulting sequence to determine if there are any symbols left, and if there is a symbol left, the program proceeds to steps 1-3 where n is set to 1. By repeating steps 1-4 through 1-10 three times for n=1, 2, and 3, a Numgram token string for the current sub-fragment (line 1, left side of Table 7) may be developed corresponding to single/double/triplet member groups. This token string is seen to be "000" as shown by the $4^{th}$ through $6^{th}$ digits of (0 . . . 18L)(SEQ#1). The process repeats steps 1-12 to delete yet another symbol off of the left side of the sequence resulting in the second sub-fragment shown in line 2 of Table 7, left side. Again, since there is still at least one symbol present as determined in step 1-13, steps 1-4 through 1-10 are again repeated to build the additional three digits of the token string, namely, "100" as seen from the $7^{th}$ through $9^{th}$ digits of (0 . . . 18L)(SEQ#1). In this manner the entire token string of (0 . . . 18L)(SEQ#1) may be developed.

After all of the symbols have been used as indicated in step 1-13, the program goes to Step 1-14 where the Left Complete Flag is set true. In step 1-15, the input sequence is chopped off by one symbol from the right hand side of the fragment and the resulting sub-fragment is examined in step 1-16 to see if any symbols remain. If at least one symbol remains, the program proceeds through steps 1-3 through 1-11 where the Left Complete Flag is checked. Since this flag was set true in step 1-14, the program goes to step 1-15 where another symbol is deleted from the right hand side of the preceding sub-fragment. The sub-fragments so formed are those illustrated for example by the right hand side of the pyramid of Table 7. Each loop through 1-15 and 1-16 skips down one line in Table 7. With each line, the token string is again developed using the Numgram tables according to steps 1-3 through 1-10. As a result the token string (0 . . . 18R)(SEQ#1) is obtained.

After there are no remaining symbols as determined in step 1-16, the Left Complete Flag is set false in step 1-17, and the program goes to branch A (circle A in FIG. 1A) and to step 1-18 of FIG. 1B. In this step, the Left Complete Flag is examined and is determined to be set false (step 1-17). In step 1-19, the Right Complete Flag is examined and found to be false, as it is still set to its initial value from step 1—2. As a result, the index L is incremented in step 1-20. Since L was originally initialized to 0 in step 1-2, L is now set to 1 and, according to step 1-21, one symbol is deleted from the left side of the initial input fragment. In step 1-22 the number of sequences remaining after the symbol deletion from step 1-21 is examined. If the number of remaining symbols is not less than M, a predefined number, then the program goes to branch B (circle B) and accordingly to step 1-3 (FIG. 1A). The Numgram tables and token sequences are computed as before for both left and right pyramids starting from the fragment defined by step 1-21 (i.e., line 1 of Table 7, left hand side). Thus the token strings (1 . . . 18L)(SEQ#1) and (1 . . . 18R)(SEQ#1) are defined. After completion of these token strings, the program again loops to step 1-21 where L is incremented to L=2. Now the token strings (2 . . . 18L)(SEQ#1) and (2 . . . 18R)(SEQ#!) are tabulated and the cycle continues until the remaining symbols are less than M as determined in step 1-22. In the detail examples given for the first and second main input fragments, M is set to 7 so that sequences of 6 or less are ignored. In practice, these short sequences exhibit a constant behavior so they are not very interesting as fragment discriminates. However, in general M may be any integer set by the user to terminate the computation of the token strings.

After step 1-22 the procedure continues at step 1-23 where the Right Complete Flag is set true and the Left Complete Flag is set false. In step 1-24, the index R is incremented so that in this cycle R=1. At step 1-25 a single symbol (R=1) is deleted from the right of the input starting fragment. In step 1-26 the number of symbols is examined, and if they are not less than M, the program branches to B (circle B) and thus to step 1-3 of FIG. 1A. As before, the token strings are computed, but this time since the starting sequence was obtained by deleting one symbol from the right, the resulting token strings are (0 . . . 17L)(SEQ#!) and (0 . . . 17R)(SEQ#1). The next iteration proceeds, inter ala by steps 1-18, 1-19 and 1-24 to generate the next token string with L=2 so that token strings (0 . . . 16L)(SEQ#!) and (0 . . . 16R)(SEQ#1) are produced. This process continues until step 1-26 determines that the remaining symbols are too few to continue and then all of the token strings have been generated as in step 1-27.

While the detail example given above use the base 7 for the Numgram tables, other bases could also be used. The selection of different bases produces a different Numgram table but still produces at least two types of behavior. These two types of behaviors could in general by any two distinct number of cycles of repeat sequences and in general could also be parameterized by the number of cycles needed to reach the beginning of a repeat sequence. For the Numgram examples using different Arabic base symbols, there appears to be at least one behavior with cycle one, and one with a cycle greater than one. For example, base 9 produces the following oscillating type of behavior:

Oscillating Type Behavior for Base 9

| 0 | 1 | 2 | 3 | 4 | 5 | 6 | 7 | 8 |
|---|---|---|---|---|---|---|---|---|
| 5 | 3 | 0 | 0 | 0 | 0 | 1 | 0 | 0 |
| 6 | 1 | 0 | 1 | 0 | 1 | 0 | 0 | 0 |
| 5 | 3 | 0 | 0 | 0 | 0 | 1 | 0 | 0 |

Base 9 also produces a converging type behavior to the value: [5,2,1,0,0,1,0,0,0,]. Similar behavior occurs for different bases where the generalized statement for base n is as follows:

For single cycle behavior:

| Number | 0 | 1 | 2 | 3 | ... | n-4 | n-3 | n-2 | n-1 |
|---|---|---|---|---|---|---|---|---|---|
| count | n-4 | 2 | 1 | 0 | 0 | 1 | 0 | 0 | 0 | and for multiple cycle behavior:

| Number | 0 | 1 | 2 | 3 | ... | n-4 | n-3 | n-2 | n-1 |
|---|---|---|---|---|---|---|---|---|---|
| count | n-4 | 3 | 0 | 0 | 0 | 0 | 1 | 0 | 0 |
| count | n-3 | 1 | 0 | 1 | 0 | 1 | 0 | 0 | 0 |

While the token strings would be different for different selected bases, the groupings of the token strings still produces a match in that when these token strings are placed in ascending order, adjacent, identical token strings appears if there is a match between the corresponding fragments. This indeed must be so, since according to property one of an attractor, there must be a consistent, fixed mapping of the same input behavior to output behavior. Thus, matching tokens strings appear adjacent one another and identify the identical sub-fragment. It is assumed of course that for any sets of comparisons used, the same base and consistent attractor behavior label assignments for the behaviors has been used.

The following Table shows the behavior of selected bases chosen for the Numgrams to which 10000 random inputs have been applied.

Number of each type of behavior for 10,000 random inputs

| Base | Number for behavior 0 (>cycles) | Number for behavior 1 (1 cycle) |
|---|---|---|
| 7 | 7033 | 2967 |
| 9 | 3632 | 6268 |
| 10 | 5504 | 4496 |
| 11 | 4608 | 5392 |
| 14 | 2516 | 7484 |
| 19 | 1322 | 8678 |

As seen from the above table, if one knows nothing about the input sequence, one would simply choose a base, such as base 10 or 11 so that a roughly 50/50 split will be produced for any given sequence of inputs. However, if one has some additional knowledge about the mapping of the inputs and outputs, then one may use this additional knowledge to build a more selective classifier. For example, if past experience has shown that a base 19 is appropriate of the source multiset of interest or if the symbol base can be expressed to take advantage of base 19, then a relatively high selectively will occur since 87% of the random inputs will exhibit type 1 behavior and 13% exhibit type 0 behavior. If one is looking for sequences which exhibits type 0 behavior, one can eliminate a large percentage of the input source set resulting in a highly efficient classifier. Classifying the input sequence in this manner throws out 87% of the inputs which are not of interest and greatly simplifies the segregation of the inputs to isolate the remaining 13% of interest Fragment assembly may be achieved by using the Numgram process described above to identify multiple overlapping fragments. The following table illustrates a matrix that may be constructed to identify overlaps.

|  | Column 0 | Column 1 | Column 2 | Column 3 |
|---|---|---|---|---|
| Row 0 | 0 | 12 | 0 | 0 |
| Row 1 | 15 | 0 | 10 | 0 |
| Row 2 | 0 | 0 | 0 | 20 |
| Row 3 | 0 | 18 | 0 | 0 |

In the above table, the numbers represent the number of overlapping sequences between the fragments identified by their row and column. By convention, the overlap is taken with the "row" fragment on the left side of the overlap. Thus, fragments 2 and 3 overlap as follow with a symbol (nucleotide) length of 20 as indicated by the overlap below.

<<<<<<Fragment 2>>>>>>>>>>
   <<<<<<<Fragment 3>>>>>>>>>>>

A zero in any given cell means that there is no left-to-right overlap from the given row's fragment to the given column's fragment. The diagonal, representing fragments mapping onto themselves is always zero.

To assemble the fragments one starts with the fragment that has the fewest overlaps on its left. The fragments are chained with the longest overlap on that fragments right, the longest on the next fragment's right and so on. If the resulting chain includes all fragments, then the assembly is terminated. If not, one back's up one fragment and tries again starting with the fragment with the next-most overlaps on its right. The procedure is recursively applied to explore all possible paths. The first chain that includes all the fragments is the desired assembly. If this procedure fails to yield assembly of fragments, the longest chain found is the assembly.

While a particular implementation of an attractor process used as a classifier has been set forth above, there are many types of attractors what may be used. Attractors of interest will have the property of being one-to-one and onto so that they exhibit the primary characteristics of attractors discussed above. Note in addition that one ultimately needs an invertable process so that for any output of the attractor, one is able to get back to the original input source multiset. This invertableness is achieved by mapping the identification of the source multiset with the attractor space representation so that this latter mapping is one-to-one, onto and invertable. These characteristics will become clear from the discussion below in connection with FIGS. 2–5 below.

Figure 2A:
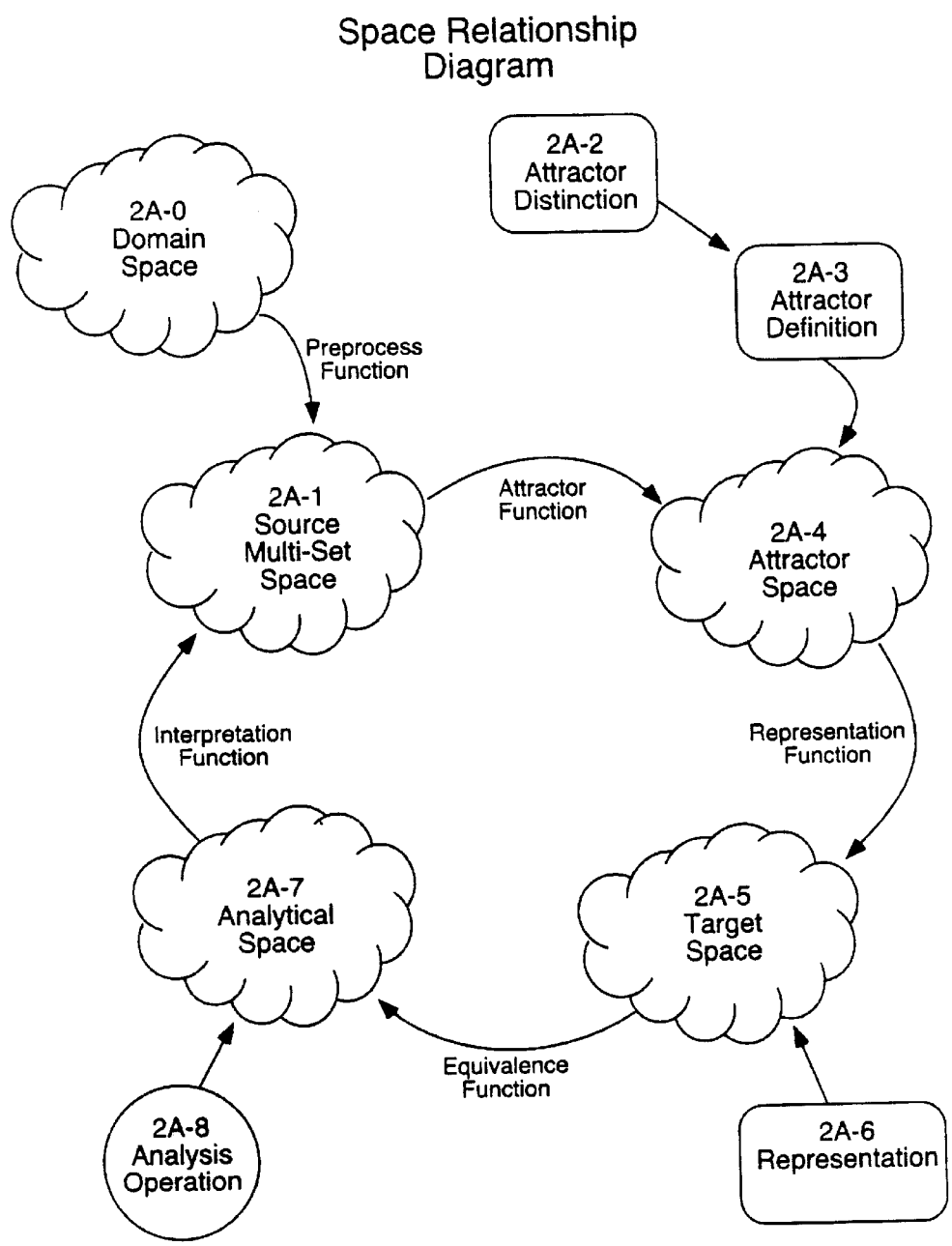
FIG. 2A is a block diagram showing the relationship of the various spaces in the attractor process.
Figure 2B:
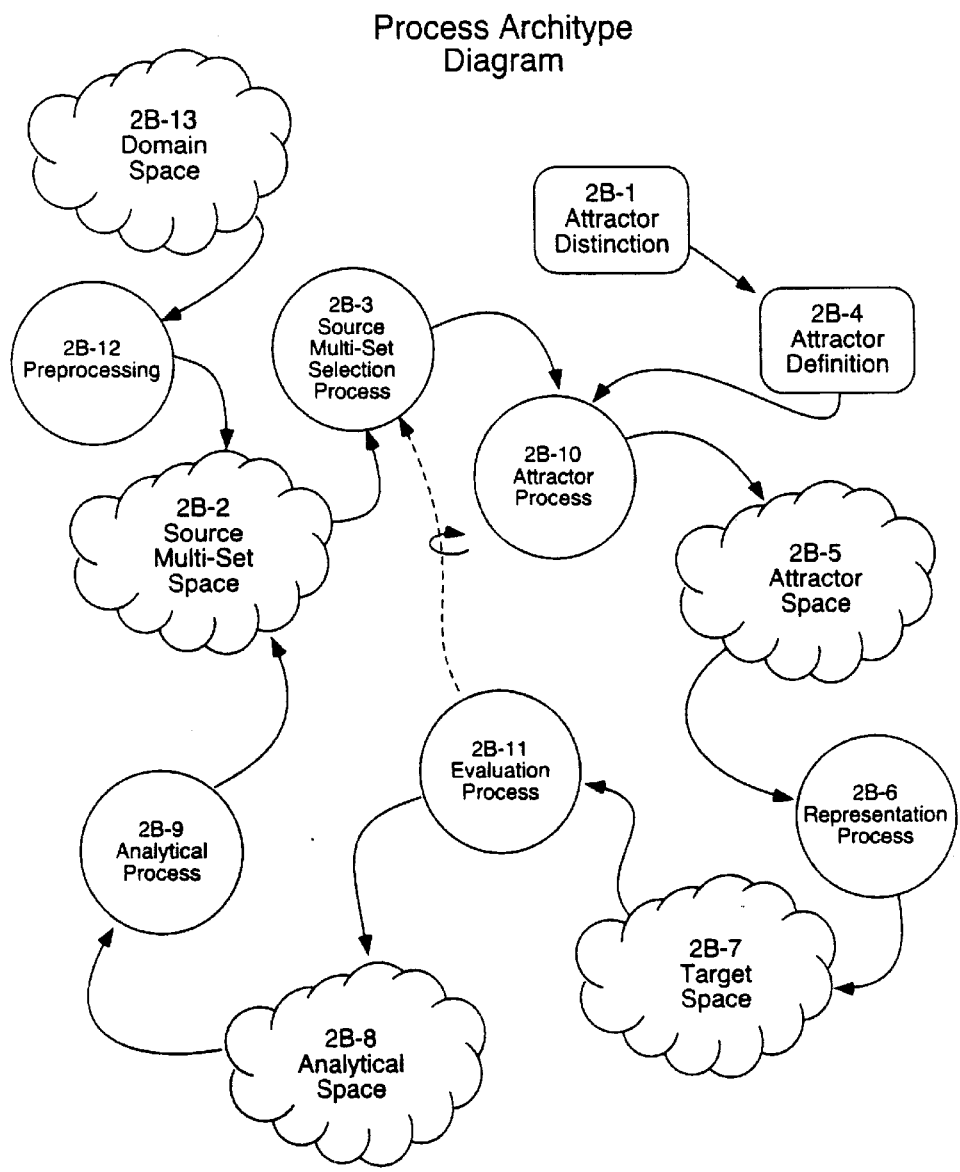
FIG. 2B is a block diagram illustrating an attractor process archetype though the various spaces and processes illustrated in FIG. 2A.

FIGS. 2A and 2B illustrate the relationships among various spaces in the attractor process. In particular, FIG. 2A is a space relationship diagram illustrating the various spaces and the various functions and processes through which they interact.

A space is a set of elements which all adhere to a group of postulates. Typically, the elements may be a point set. The postulates are typically a mathematical structure which produces an order or a structure for the space.

A domain space block 2A-0 is provided from which a source multiset space is selected through a pre-process function. The domain space 2A-0 may be a series of pointless files that may be normalized, for example, between 0 and 1. The source multiset space is mapped to the attractor space 2A-4 via an attractor function.

An attractor process 2B-10 (shown in FIG. 2B) may be an expression of form exhibiting an iterative process that takes as input a random behavior and produces a predictable behavior. In other words, an attractor causes random inputs to be mapped to predictable output behaviors. In the above example, the predictable output behaviors may be the converging or oscillating behaviors of the Numgram process.

The attractor process 2b-10 may be determined by an attractor distinction 2A-2 and an attractor definition 2A-3. In the above example, the attractor distinction 2A-2 may be the selection of the Numgram, as opposed to other attractors, while the attractor definition 2A-3 may the selection of the base number, the symbol base, the symbols, etc.

The behaviors in the attractor space 2A-4 may be mapped to a target space 2A-5 through a representation function. The function of the target space is to structure the outputs from the attractor space for proper formatting for mapping into the analytical space. In the above example, the oscillating or converging outputs in the attractor space may be mapped to a 0 or a 1 (via representation 2A-6). in the target space. Further, the target space may concatenate the representation of the attractor space output for mapping to the analytical space 2A-7. The concatenation is done by grouping together the outputs of the representations (2A-6) of the attractor space output to form the token strings as shown, for example, in Table 8 and (0 . . . 18L)SEQ#1. The analytical space 2A-7 may be a space with a set of operators defined for their utility in comparing or evaluating the properties of multisets. The operators may be simple operators such as compliment, XOR, AND, OR etc so one can sort, rank and compare token strings. Thus, evaluation of the analytical space mappings of the multisets allows such comparisons as ranking of the multisets. The target space and the analytic space could be collapsed into one space having the properties of both, but it is more useful to view these two spaces as separate.

In the analytical space, an analysis, operation 2A-8 or an analytical process 2B-9 (FIG. 2B) may be used to evaluate the matching (or commonality) properties of the multisets. For example, the multisets were obtained by deleting one element at a time from the right and left sides of the original fragment to obtain the inverted pyramids of Table 7. The analytic space with its defined operators for comparing, was able to order the token strings. These ordered token strings were then used to detect overlaps in different fragments, that is fragments that had some portion of the sequence the same as revealed by the multiset selection. The construction of the multisets by chopping off one element from the left and right or the subsequent one-at-a-time, two-at-a-time and three-at-a-time groupings may or may not be appropriate depending on the particular problem domain one is interested in. Thus there is a feedback path shown in step 2B-11 and 2B-3 of FIG. 2B to evaluate the results of the target space representation and to select or modify the selection of the source multiset to be used in the attractor process. If one is interested in a closed loop controller then there is also a feedback path from the analytic space 2A-7 (FIG. 2A) or the analytic process 2B-7 (FIG. 2B) to the source multiset space 2A-1 (of FIG. 2A) or 2B-2 (of FIG. 2B).

Figure 3:
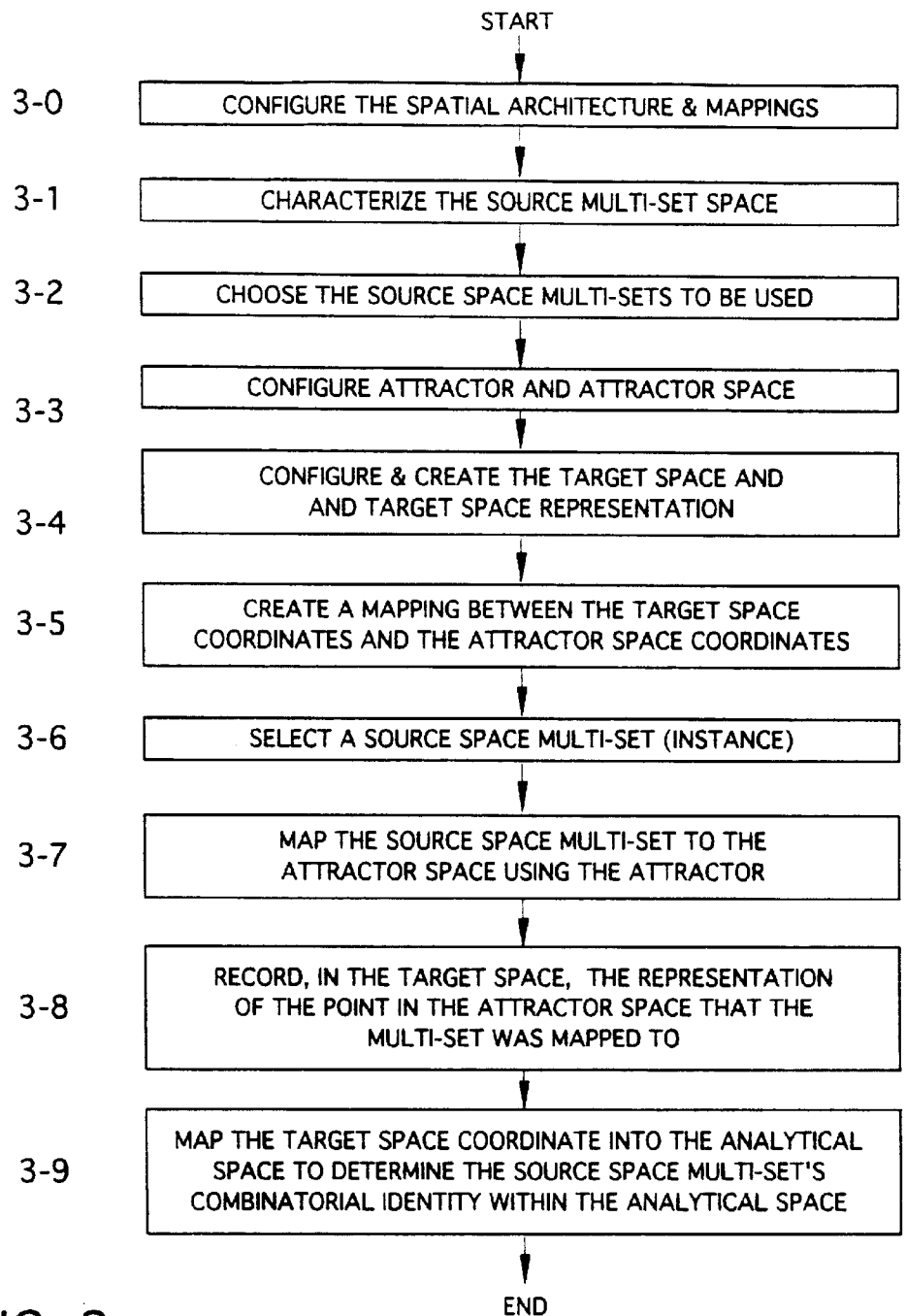
FIG. 3 is a flowchart of an embodiment of the invention for the characterization of set identities using an attractor.

An embodiment of the invention is shown in FIG. 3. The flowchart of FIG. 3 starts with step 3-0, which configures the spatial architecture and mappings according to, for example, the illustration of FIG. 2A. The spatial architecture contain the entities (e.g., A's, C's, T's. and G's) and relationships (entities form a sequence), and the mappings which are configured consist of selecting a methodology to expose solutions (e.g., expose DNA sequence matching). With the spatial architecture and mappings configured, the method according to the embodiment proceeds to the step 3-1 which is the step of characterizing the source multiset space. In this step, one looks at the size of the source multiset one desires to run through the attractor process. One also recognizes that there are only for distinct entities in the source domain space and that one will ignore any attributes of the measurement instrument used to obtain the A's, C's, T's. and G's.

It is noted here that, with reference to FIGS. 3–6B, sets are generally idempotent, i.e., do not have multiple occurrences of the same element, while multisets are generally not. Elements in multisets are, however, ordinally unique.

Turning to the DNA example by way of illustration and not by way of limitation, one may be interested in an entire set of say 10,000 fragments or only a smaller subset such as half of them, namely 5,000. The 5,000 fragments may be selected based on some criteria or some random sampling. The DNA fragments may be characterized such that one uses the fragments that are unambiguous in their symbol determination, that is in which every nucleotide is clearly determined to be one of C, T, A or G, thus avoiding the use of wild card symbols. In an image processing example, one may be interested in a full set say 11,000 images or some subset of them. The subset may be chosen, for example, based on some statistical.

In step 3-2 of FIG. 3, one chooses or defines the source multiset or multisets to be used to define the domain scope.

In this step, the number of unique elements or the number of unique element groups are determined for each set of interest within a source multiset space. For example, if the sources multiset space comprises the nucleotides within any DNA fragment, then the number of unique elements needed when taking each nucleotide one at a time is 4 corresponding to C, T, A and G. However, if the nucleotides were taken as a group two elements at a time or three elements at a time, then the number of unique element groups needed to characterize the source space multiset would be 16 and 64, respectively, as shown earlier in Tables 3 and 5. In other case, the four base nucleotides may have been represented as a pairing of binary numbers using the four "symbols" for the elements such as 00, 01, 10, and 11. In both the case of C, T, A, and G and in the case of 00, 01, 10, and 11 both source multiset spaces have four distinct symbols. One may also introduce additional symbols to the source multiset space representative of a wild card "X" to represent an unrecognized nucleotide where X may stand for any one of C, T, A and G. In such case, there would be five distinct elements, and one may choose these 5 elements to be interacted with the attractor process.

More generally, the characterizing of the source multiset space and choosing the source set elements includes stating or recording what is known or discernable about the unique elements, symbols and/or unique patterns contained within, or representative of, the source multiset space. In cases where knowledge of the source space is unknown, an artificial symbol pattern or template structure can be imposed on the source space. This artificial template structure would be used for lots of different types of data such as text (different languages), graphics, waveforms, etc. and like types of data will behave similarly under the influence of the attractor process.

For definition purposes, in the DNA example, one may consider the source multiset to be a particular DNA fragment and the resulting inverted pyramid structures of subsets of the original fragment. Fragment 1 used in the detailed example above is composed of 19 elements. In general, elements are represented by at least one symbol and typically there are a plurality of symbols which represent the elements. In the DNA example of Fragment 1, there are 4 distinct symbols when the members are considered one at a time, 16 distinct symbols when the members are considered two at a time, and 64 distinct symbols when the members are considered three at a time.

Step 3-3 entails configuring the attractor the attractor space. As discussed above with reference to FIGS. 2A and 2B, configuring the attractor involves choosing parameters to change (i.e., increase or decrease) the number of behaviors exhibited by the attractor. Some of these parameters in the case of the Numgram attractor include changing the count base, changing the symbol base or the representation of the symbol sets (going from "1", "2", to "one", "two" etc). Another parameter, as it relates to the Numgram process and the DNA example is. inputting the number of distinct symbols which was determined from the choosing step 3-2. In the Numgram process, one uses the number of distinct symbols to build the Tables 1, 3. and 5.

The attractor space contains sets of qualitative descriptions of the possibilities of the attractor results. The term "qualitative" is used to mean a unique description of the behavior of a attractor process as opposed to the quantitative number actually produced as a result of the attractor process. For example, Table 2 shows that the attractor process converges to 3211000 at row 4 of the table. In contrast, Table 4 shows a qualitatively different behavior in that the attractor process exhibits an oscillatory behavior which starts at row 5 of Table 4. Thus, the attractor space represents the set of these unique descriptors of the attractor behavior. Other qualitative descriptors may include the number of iterations exhibited in reaching a certain type of behavior (such as convergence or oscillatory behavior); the iteration length of an oscillatory behavior (i.e., the number of cycles in the oscillation); the trajectory exhibited in the attractor process prior to exhibiting the fixed point behavior etc. By fixed point behavior, one means a typological fixed point behavior and thus, an oscillatory and converging behaviors in the detailed examples given above are both "fixed point" behaviors. The same parameterizations that are used to configure the attractor (e.g., changes to symbol base, count base etc.) also change the attractor space and generally, it may be desirable to examine how the combined attractor and attractor space changes are optimally performed in response to the parameterizations. For example, it may be desired to pick a count base with two fixed point behaviors and also a small number of cycles in an oscillatory behavior to optimum performance and speed.

There are many ways to configure the attractor. For example, one could spell out "one" "two" etc. in English or French (or any representation) instead of using the numeric labels 1, 2 etc. in all of the tables (such as tables 1–7). With an appropriate change in the Numgram base, such as 26 for the English language, the attractor behavior will still result in similar mappings for similar input source sets.

Step 3-4 is the step of creating a target space representation and configuring the target space. For example, in the Numgram attractor process, one may assign token values 0 or 1 for the two fixed points corresponding to oscillatory and converging behaviors. Further one could take into account the number of iterations in the attractor process to reach the convergence or oscillatory fixed points and assign labels to the combinations of the number of iterations and the number of different fixed points. For example, if there are a maximum of 4 iterations to reach the fixed point behaviors, then there are a combination of 8 unique "behaviors" associated with the attractor process. Here, the concept of "behavior" instead of being limited to only the two fixed points, oscillatory and converging, is generalized to be understood to include the number of iterations needed to reach the fixed point. Thus, unique labels may be 1, 2, . . . 8 may be assigned to the eight types of behavior exhibited by the attractor process. Of course, a different representation may be used such as a base 2 in which case the labels 0, 1, 2, 4, 8, 16, 32 and 64 would be used as labels to represent the unique attractor behaviors. It may be appreciated that other attributes of the attractor process may be further combined to define unique behaviors such as a description of the trajectory path (string of numerical values of the Numgram process) taken in the iterations to the fixed point behaviors. The number of behaviors would then be increased to account for all the combinations of not only the oscillatory/fixed characteristics and number of iterations, but also to include the trajectory path.

Step 3-5 is the step of creating a mapping between the target space coordinates (i.e., the symbols such as "1" and "0" assigned to the behavior as well as other assignments, if made, such as trajectory path, number of cycles etc.) and the attractor space coordinates (i.e., the "oscillatory" or "converging" behavior of the attractor). The mapping may be done by making a list and storing the results. The list is simply a paired association between an identification of the target space and the attractor space using the target space representation as assigned in step 3-4. Thus, to return to the DNA example, for each DNA fragment in the sources space multiset, the mapping would consist of the listing of the identification of each fragment with the attractor space representation. Such an identification is seen by appending the labels (0 . . . 18R)SEQ#1 or (12 . . . 18L) SEQ#1 etc. to the token string as done above.

Steps 3-1 through 3-5 represent the initialization of the system. Steps 3-6 through steps 3-9 represent actually passing the source multiset through the attractor process.

In step 3-6 an instance of the source-space multiset is selected from the source multiset space (2B-2 of FIG. 2B). The broadest definition of multiset, includes any set that contains one or more occurrences of an entity or element. For example, AAATCG is a multiset because it contains multiple occurrences of the entity "A". Further, the inverted pyramids of Table 7 are also termed multisets. One then extracts the number of like elements such as the number of C's, T's, A's and G's as shown in detail above.

In step 3-7 one maps the source space multiset to the attractor space using the attractor which was configured in step 3-3. This mapping simply passes the selected source multiset from step 3-6 through the attractor process. In other words, the source multiset is interacted with the attractor process.

In step 3-8, one records, in the target space, the representation of each point in the attractor space that resulted from the mapping in step 3-7.

In step 3-9, one maps the coordinate recorded in step 3-8 into an analytic space to determine the source multiset's combinatorial identity within the analytic space. This record is a pairing or an association of a unique identification of the source multiset with the associated attractor space representation for that source multiset. The analytic space basically just contains a mapping between the original source multiset and the attractor representation.

The various spaces are delineated for purposes of clarity. It will be appreciated by those skilled in the art that, in certain implementations, two or more of the spaces may be collapsed in a single space, or that all spaces may be collapsed in a multiplicity of combinations to a minimum of two spaces, the domain space and the attractor space. For example, hierarchical spaces may be collapsed into a single space via an addressing scheme that addresses the hierarchical attributes.

By combinatorial identity, one simply means those source multisets that have the same frequency of occurrence of their elements. For example, if one is considering elements of a fragment one at a time, then the fragments ATATG and AATTG will map to the same point in the attractor space. Both of these groupings have two A's, two T's and one G, and thus when sent through the attractor process will exhibit the same behavior and be mapped to the same point in the attractor space.

Figure 4:
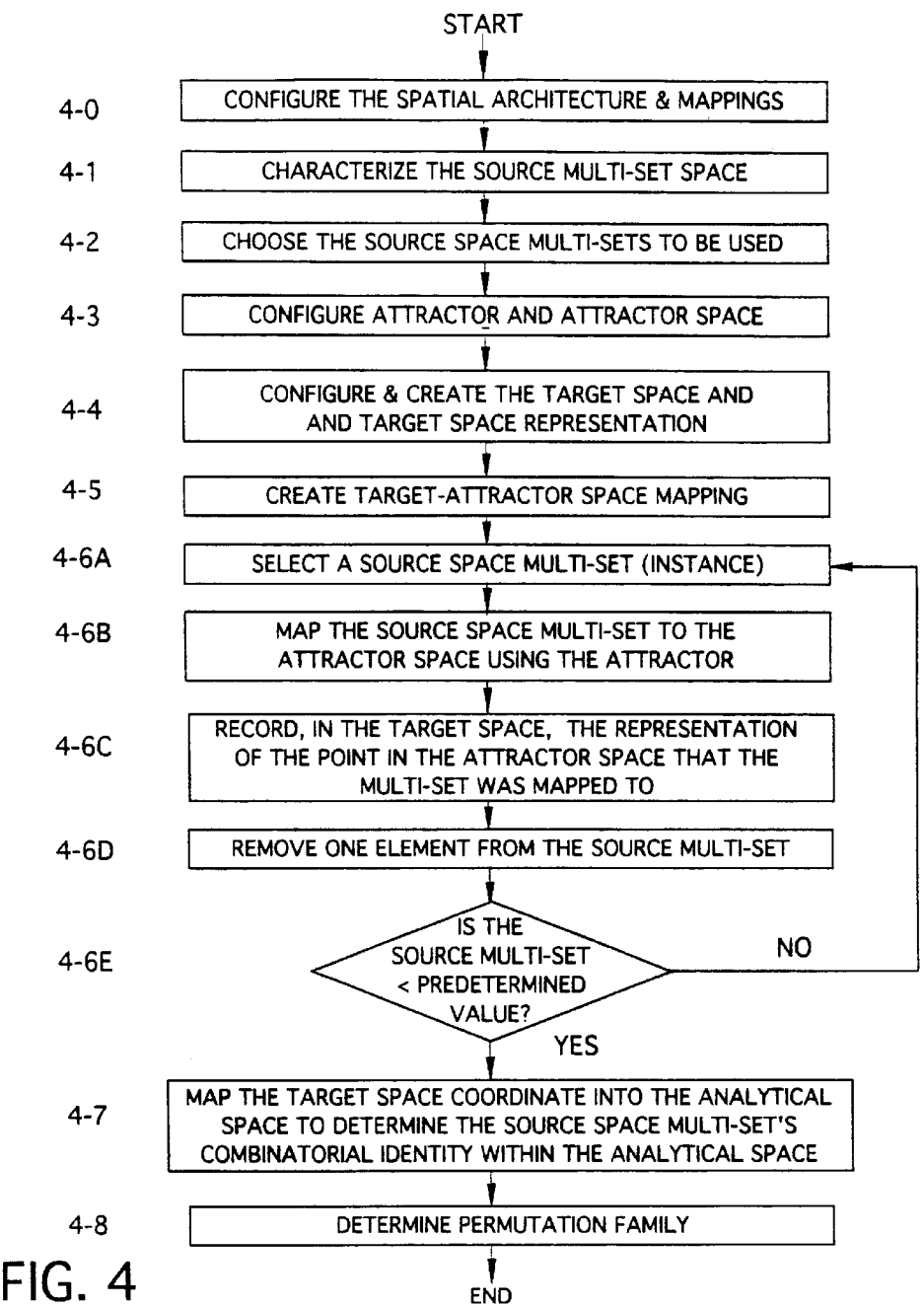
FIG. 4 is a flowchart of an embodiment of the invention for recognizing the identity of a family of permutations of a set in a space of sets containing combinations of set elements and permutations of those combinations of set element.

FIG. 4 is a flowchart representing another embodiment of the invention. This embodiment is characterized as a method for recognizing the identity of a family of permutations of a set in a space of sets containing combinations of set elements and permutations of those combinations of set elements. Step 4-1 through 4-5 are the same as steps 3-1 through 3-5. Step 4-6A through 4-6C are the same as steps 3-6 through 3-8 of FIG. 3.

Step 4-6D removes one element from the source multiset. Thus, if the source multiset is Fragment 1 in the above example, then one element is removed as explained above in detail. In general, it is not necessary to remove an element from the left or right and the elements can be removed anywhere within the source multiset. In other embodiments, one or more elements may be removed as a group. These groups may be removed within the sequence and may include wildcards provided the removal methodology is consistently applied.

In step 4-6E, one determines if the source multiset is empty, that is, one determines if there are any elements left in the source multiset. If the source multiset is not empty, the process goes to step 4-6A and repeats through step 4-6E, with additional elements being deleted. Once the source multiset is empty in step 4-6E, the process goes to step 4-7 which maps the representation coordinate list to the analytic space. The analytic space again contains the identification of the source element and its' mapped attractor space representation (i.e.,. a coordinated list). Since members are repeatedly removed from the source multiset, the attractor space representation will be a combined set of tokens representing the behavior of the initial source multiset and each successive sub-group formed by removing an element until there are no elements remaining.

While step 4-6E has been described as repeating until the source multiset is empty, one could alternatively repeat the iteration until the source multiset reaches some predetermined size. In the detailed example of the DNA fragments set forth above, once the sub-fragment length is under 7, the tokens are identical and thus it is not necessary to continue the iterations.

Step 4-8 determines the permutation family of the mapped source multiset. It is noted that the permutations here are those source multisets that interacted in some common way with the attractor process as performed in steps 4-1 through 4-7. As a result of this common interaction, the token strings would be identical at least to some number of iterations as defined by step 4-6.

Figure 5:
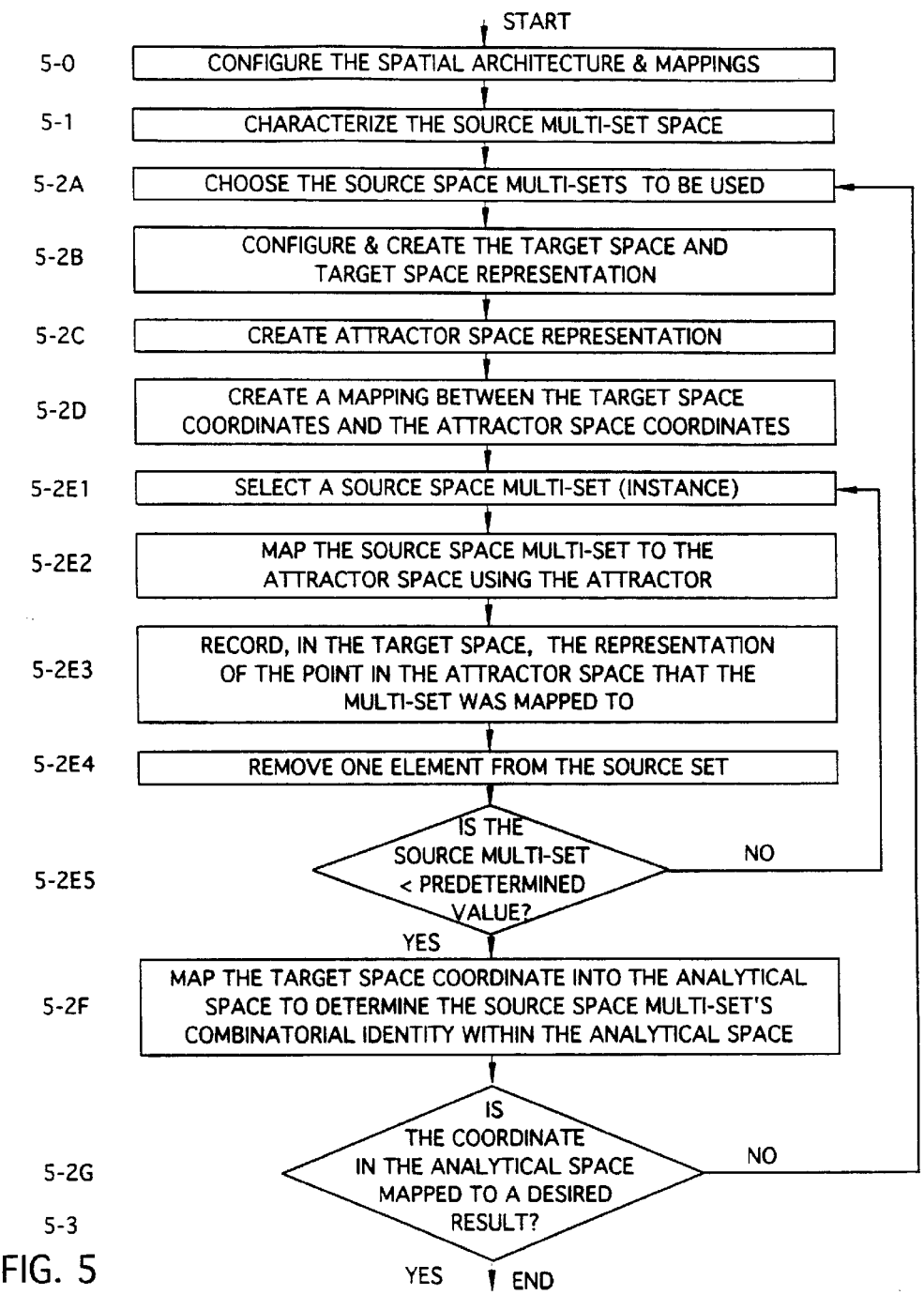
FIG. 5 is a flowchart of an embodiment of the invention for recognizing a unique set in a space of sets containing combinations of set elements or permutations of set elements.
Figure 6B:
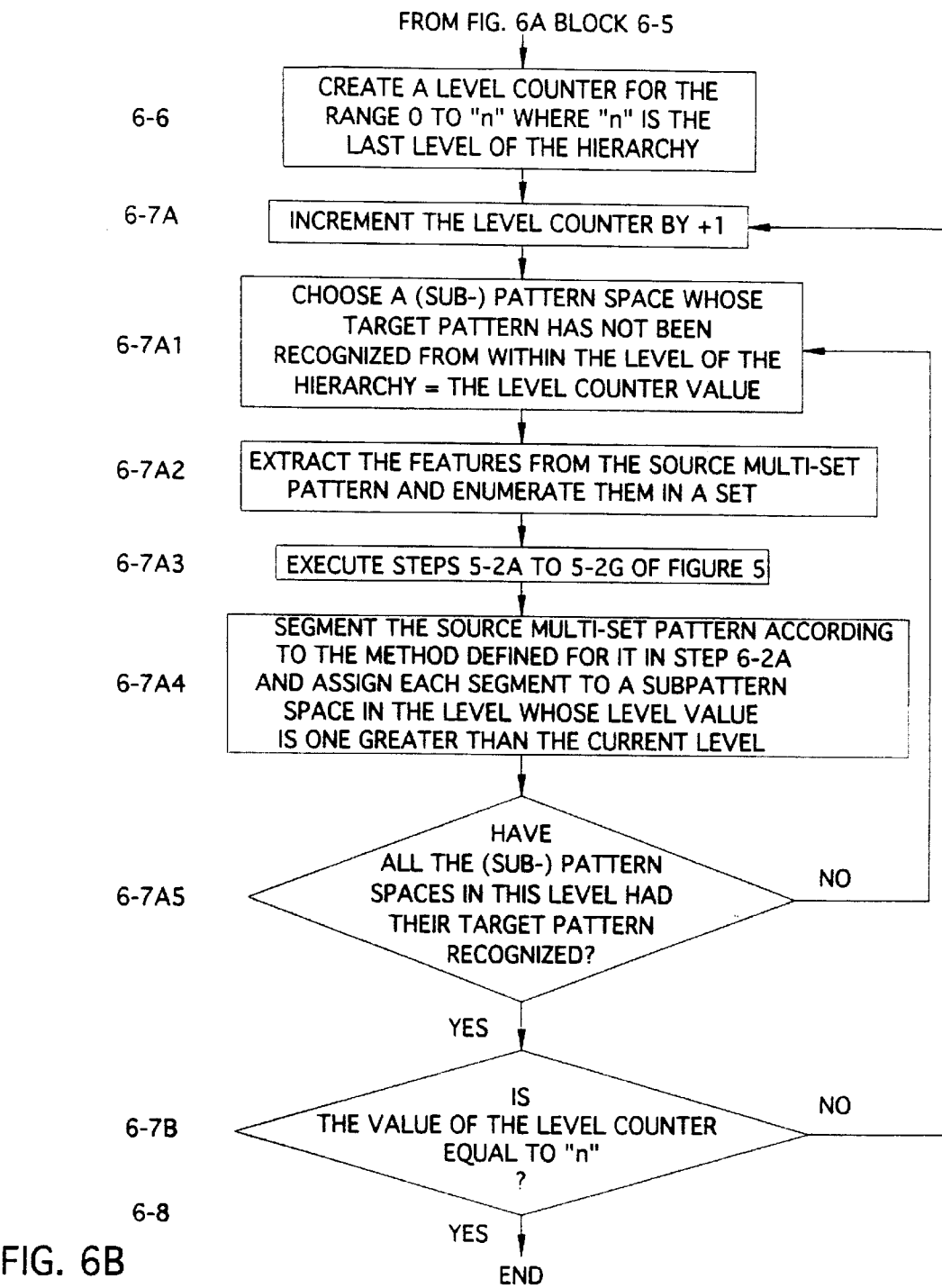

FIG. 5 illustrates yet another embodiment of the invention. In FIG. 5, steps 5-1 through 5-2F are the same as steps 4-1 through 4-7 in FIG. 4 respectively. A further step 5-2G has been added to FIG. 5 as compared to FIG. 4. In step 5-2G, one ask if the coordinate set in the source space is mapped to a unique set in the analytic space. If it is, the process ends. If there is no unique mapping, the process loops back to step 5-2A in which one chooses different source multiset elements to be used in the attractor process. For example, in the DNA example, if the attractor process of FIG. 4 did not produce a unique analytic space mapping, one may choose the elements of the source multiset two at a time and iterate steps 5-2A through 5-2G to see if a unique mapping results. In this process, it is noted that step 5-2E4 now is interpreted to mean remove one two-at-a-time element (a group of two elements taken together now forms one "element") from the source multiset. If step 5-2G still does not produce a unique mapping one again goes to step 5-2A and chooses source multiset element to be used in a different way, as for example by choosing them three at a time. Again, in step 5-2E4, one removes one "three-at-a-time" element from the source multiset on each iteration. Eventually, with the proper choice of the source multiset elements in step 5-2A and sufficient loopings from step 5-2G to 5-2A, the mapping will be unique.

FIG. 6 is a flowchart representing another embodiment of the invention. This embodiment is characterized as a method for hierarchical pattern recognition using attractor-based characterization of feature sets. This embodiment addresses a broader process than that described with reference to FIG. 5. The embodiment of FIG. 6 addresses a hierarchical pattern recognition method using, for example, the embodiment of FIG. 5 at one or more pattern spaces at each level of the hierarchy.

Steps 6-1 to 6-4 set up the problem. Steps 6-5 to 6-7B "process" source patterns into the spatial hierarchy created in Steps 6-1 to 6-4.

At the outset of the set-up portion, a hierarchy of pattern spaces is configured. In step 6-1, a top level pattern space whose coordinates are feature sets is defined. The feature set may include features or sets of features and feature relationships to be used for describing patterns, embedded patterns or fractional patterns within the pattern space hierarchy and for pattern recognition. Each feature or feature set is given a label and the Target Space is configured so that its coordinates and their labels or punctuation accurately represent the feature set descriptions of the patterns, embedded patterns and pattern fragments of the pattern space coordinates.

In step 6-2A, a method of segmenting the top-level pattern is defined. This segmenting may be pursuant to a systematic change. In the example of the DNA fragments, two-symbols-at-a-time and three-symbols-at-a-time or symbols separated by "wild card symbols" may be sub-patterns of the pattern having a series of symbols.

At step 6-2B, a set of features in the sub-patterns is defined for extraction. In the DNA fragment example, the features to be extracted may be the frequency of occurrence of each symbol or series of symbols. In other examples, such as waveforms, the features to be extracted may be maxima, minima, etc. It is noted that, at this step, the features to be extracted are only being defined. Thus, one is not concerned with the values of the features of any particular source pattern.

At step 6-2C, one or more hierarchical sub-pattern spaces may be defined into which the patterns, sub-patterns or pattern fragments described above will be mapped. This subdivision of the pattern spaces may be continued until a sufficient number of sub-pattern spaces has been created. The sufficiency is generally determined on a problem-specific basis. Generally, the number of sub-pattern spaces should be sufficiently large such that each sub-pattern space has a relatively small number of "occupants". A hierarchy of Target Subspaces is configured with a one to one relationship to the hierarchy of pattern space and subspaces.

Once it is determined that sufficient number of sub-pattern spaces exist (step 6-2D), a method of extracting each feature of the pattern space and the sub-pattern spaces is defined at step 6-3. This method serves as a set of "sensors" for "detecting" the features of a particular source pattern.

At step 6-4, the configuration of the problem is completed by defining a pattern space and a sub-pattern space hierarchy. In the hierarchy, the original pattern space is assigned the first level. Thus, a pattern space "tree" is created for organizing the sub-pattern spaces. Generally, each subsequent level in the hierarchy should contain at least as many sub-pattern spaces as the previous level. The same is true for the Target Spaces.

Once the configuration is completed, a source pattern may be selected from a set of patterns (step 6-5). The source pattern may be similar to those described above with reference to FIGS. 3–5.

At step 6-6, a counter is created for "processing" of the source pattern through each level of the hierarchy. In the embodiment illustrated in FIG. 6, the counter is initially set to zero and is incremented by one at step 6-7A to begin the loop.

At step 6-7A1, a pattern space or, once the pattern space has been segmented, a sub-pattern space is chosen for processing. At the first level, this selection is simply the pattern space defined in step 6-1B. At subsequent hierarchical levels, the selection is made from sub-pattern spaces to which the segmented source pattern is assigned, as described below with reference to step 6-7A4.

At step 6-7A2, the features from the source pattern at the selected sub-pattern space are extracted. The extraction may be performed according to the method defined in step 6-3. The features may then be enumerated according to any of several methods.

At step 6-7A3, steps 5-2A to 5-2G of FIG. 5, as described above, are executed. This execution results in a unique mapping of the source pattern to a unique set in the target set space.

At step 6-7A4, the source pattern in the selected sub-pattern space is then segmented according to the method defined in step 6-2A. Each segment of the source pattern is assigned to a sub-pattern space in the next hierarchical level.

Steps 6-7A1 to 6-7A4 are repeated until, at step 6-7A5, it is determined pattern space in the current hierarchical level has had its target pattern recognized. Thus, one or more sub-pattern spaces are assigned under each pattern space in the current hierarchical level.

This process described in steps 6-7A to 6-7A5 is repeated for the source pattern until the final level in the hierarchy has been reached (step 6-7B).

It is noted that, although the nested looping described between steps 6-7A and 6-7B may imply "processing" of the source pattern in a serial manner through each sub-pattern space at each level, the "processing" of the sub-pattern spaces may be independent of one another at each level and may be performed in parallel. Further, the "processing" of the sub-pattern spaces at different levels under different "parent" pattern spaces may also be performed independently and in parallel.

In another aspect of the present invention, attractors may be used for detection, interpretation, recognition, identification and comparison of shapes. In this aspect, embodiments of the invention allow for the characterization of shapes as sequences of unit vector descriptions, attributes of unit vector descriptions, shape segments and shape segment collages whereby the detection, interpretation, recognition, identification, comparison and analysis of one- to m-dimensional shapes in one- to n-dimensional spaces can be accomplished using multi-dimensional attractor tokens.

In this aspect, any m-dimensional shape may be represented as a sequence of addresses using a selected addressing scheme. The sequence of addresses may then be mapped to one or more coordinates in an attractor space to facilitate, for example, comparison of the shape to other shapes. It is noted that the discussion above relating to FIGS. $2 \geq 6$ is generally true for this aspect of the invention as well since that discussion applies generally to any sequence of symbols.

An example of the representation of a shape as a sequence of addresses is illustrated by FIGS. 7A–D. For illustrative purposes, a one-dimensional shape 702, or contour, (m=1) in a two-dimensional space (n=2) in the form of an irregular, closed hull is provided. In other embodiments, the shape may be an open hull. For open-hull shapes, a return segment may be added to form a closed hull. In practice, the shape may represent, for example, the outline of a region or an object such as a ship.

According to an aspect of the invention, a one-dimensional shape in any n-dimensional space may be characterized as the concatenation of unit direction vectors as addresses and then detected, interpreted, recognized, identified or compared with other shapes, partial shapes and embedded shapes using multidimensional attractor tokens. A one-dimensional shape may exist in an infinite number of different n-dimensional domain spaces. It is important to note that the dimensionality of the space is distinct from the dimensionality of its contents. As an example, a three-dimensional space may include contents of one to n dimensions. For example, the three-dimensional space may include projections of four-dimensional object.

A one-dimensional shape in such an n-dimensional space may be approximated by a series of unit vectors or unit hypotenuse vectors. This unit vector geometry may be defined by creating a polytope with enough faces so that all the unit vectors or unit vector hypotenuses can be mapped to a face. The mapping of the faces of the polytope to unit vectors is accomplished by labeling the faces of the polytope with the address label of a corresponding unit vector, as described below with reference to FIGS. 7A–D. All of the faces may be considered unit vectors without regard to combinatorial identity.

While not necessary, this mapping of unit vectors and unit hypotenuses to the faces may be done so that the relationships between the unit vectors and their corresponding unit hypotenuses are preserved. For example, in one embodiment, the mapping of the unit hypotenuses may be the sum of mappings of two unit vectors whose vector sum is equal to the unit hypotenuse. For example, if a triangle is used as a polytope, the unit vectors may be labeled as 1, 2, and 4. The unit hypotenuses between each pair of unit vectors may be labeled as the sum of two unit vectors. The unit hypotenuse between the 1 and 2 unit vectors may be labeled as 3 (1+2), between 1 and 4 may be labeled as 5 (1+4), and between 2 and 4 as 6 (2+4).

One particularly useful mapping is a polytope with $2^n-2$ faces where the combinatorial hypotenuse vectors are equidistant from all their respective unit vectors and subset vectors and where n is the number of descriptive terms, in this case, the number of primary directions.

Figure 10:
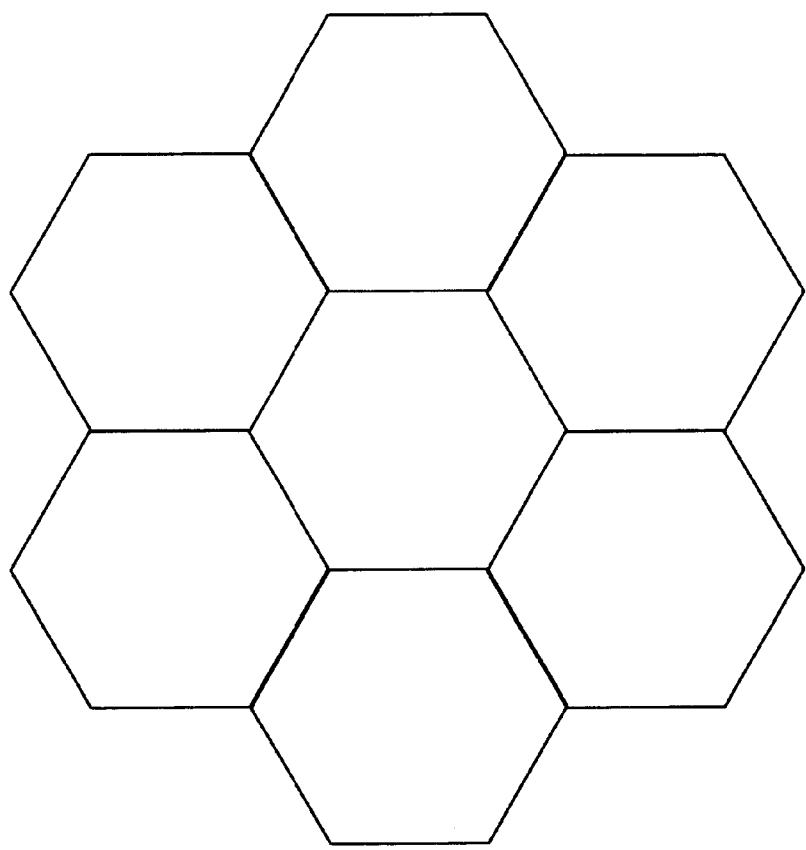
FIG. 10 illustrates one example of a tiling scheme for use with an embodiment of the present invention.

The polytope may be metricized by giving it a unit radius and then tiling the n-dimensional space. Tiling an n-dimensional space can be accomplished in a variety of ways, each of which may have a special utility for a given intent. In each case, the end result is that the space is divided into discrete subdivisions with each subdivision having a unique label or address. These labels may be assigned so that differences in the labels reveal the unit vector or unit vector combinations which define the faces of the polytope. One example of such a tiling is illustrated in FIG. 10 using a hexagonal polytope.

The shape may now be expressed using the tile addresses in place of coordinates.

Each pair of tile addresses may be evaluated to determine which direction the second is from the first and the result is expressed using the facial direction address labels of the polytope. After doing this pair-wise for the entire shape, the shape may now be expressed as a sequence of discrete direction labels, or the shape sequence.

A specific attractor parametrization may be chosen and given a target space representation. The shape sequence may be mapped to the attractor space and then into the target space representation, in a manner similar to that described above with reference to the DNA example. When the target space representation is complete, it may be mapped into an analytical space, where the shape may be compared to other shapes, sub-shapes, embedded shapes or partial shapes. The analytic space may include various manipulations of the target space representation, as described below with reference to the various examples.

In one embodiment, an addressing scheme is selected to represent the shape as a sequence of tile addresses. The addressing scheme is generally based upon a k-dimensional polytope having a plurality of faces, where k is the number of unique directional unit vectors of the polytope.

Figure 8A:
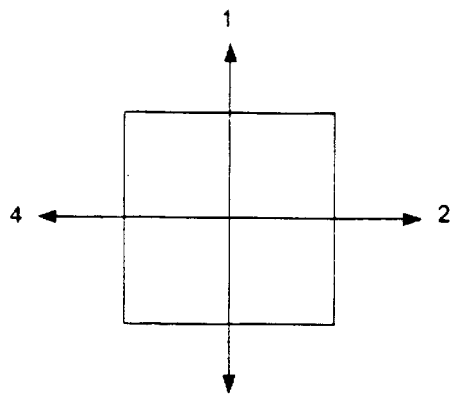
FIGS. 8A–F illustrate examples of various addressing schemes for use with a shape recognition method and system according to the present invention.
Figure 8B:
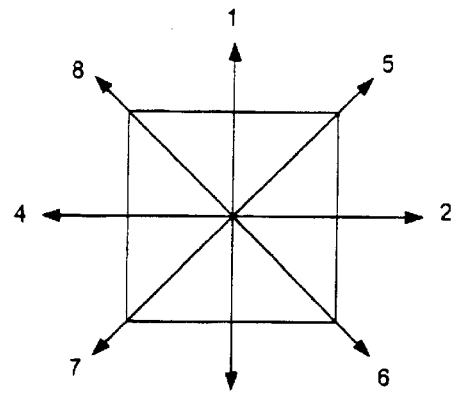
Figure 8C:
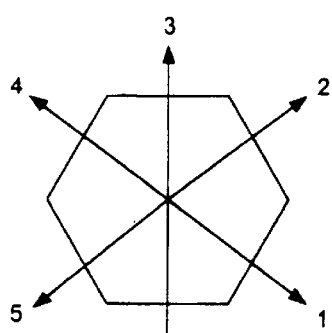
Figure 8D:
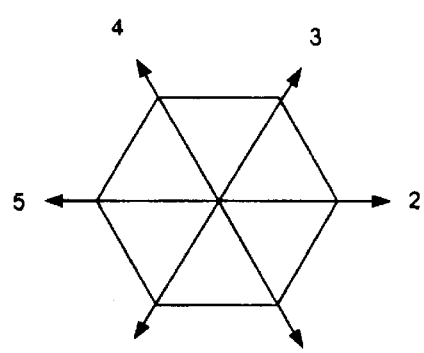
Figure 8E:
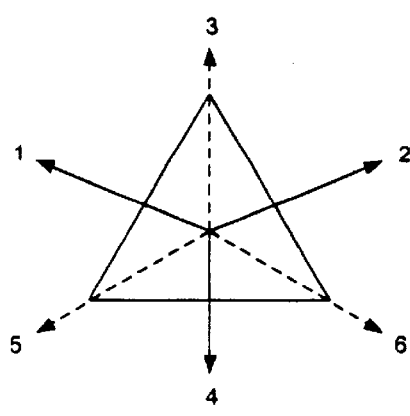

Some examples of addressing schemes are illustrated in FIGS. 8A–E. FIG. 8B illustrates a square with unit vectors directed through each face, labeled 1, 2, 3 and 4, and unit hypotenuses directed through each corner, labeled 5, 6, 7 and 8. As noted above, in other embodiments, a labeling scheme may be selected to preserve vector relationships between the unit vectors and the corresponding unit hypotenuses. For example, the addressing scheme illustrated in FIG. 8E includes three unit vectors corresponding to the three faces of an equilateral triangle. The unit vectors are provided with address labels of "1", "2" and "4". The addressing scheme also includes three unit hypotenuses corresponding to the vertices of the triangle. The unit hypotenuses correspond to the vector sum of the two adjacent unit vectors. Accordingly, the addressing scheme preserves this vector relationship by providing address labels for the unit hypotenuses such that the unit hypotenuse address labels are the algebraic sum of the address labels of the adjacent unit vectors: "3", "5" and "6".

Figure 7A:
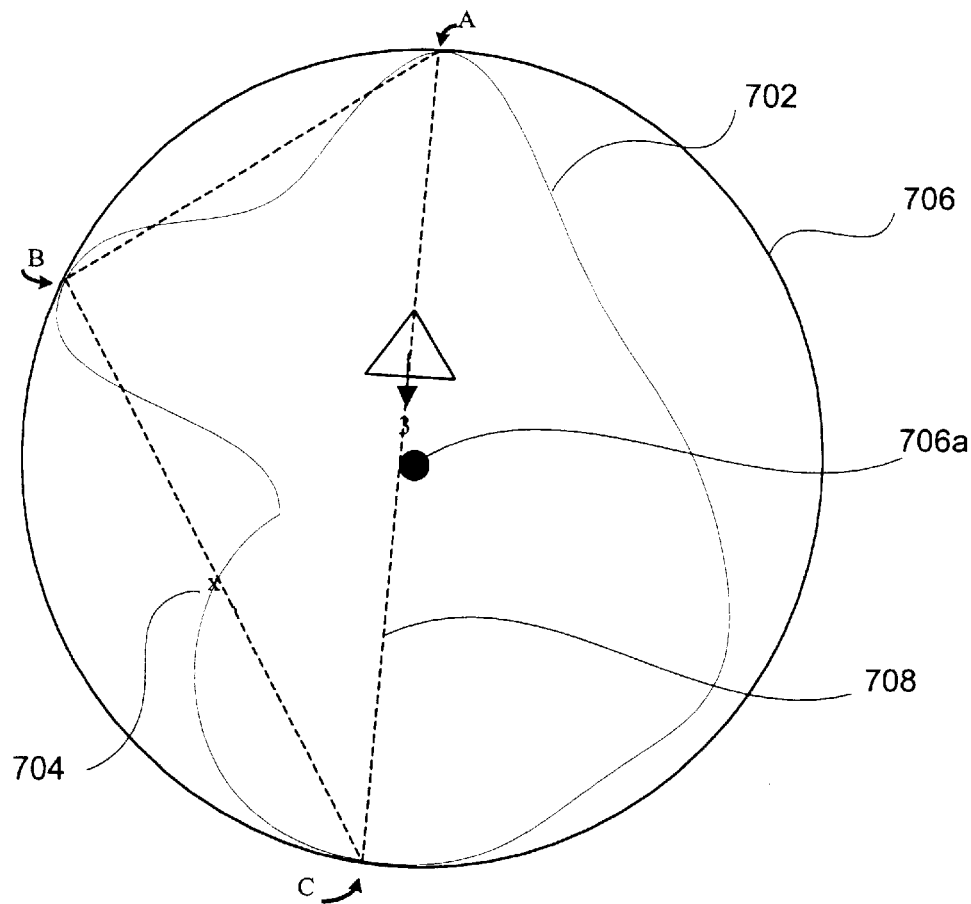
FIG. 7A illustrates an example of a shape that may be detected by a method according to the present invention.
Figure 7B:
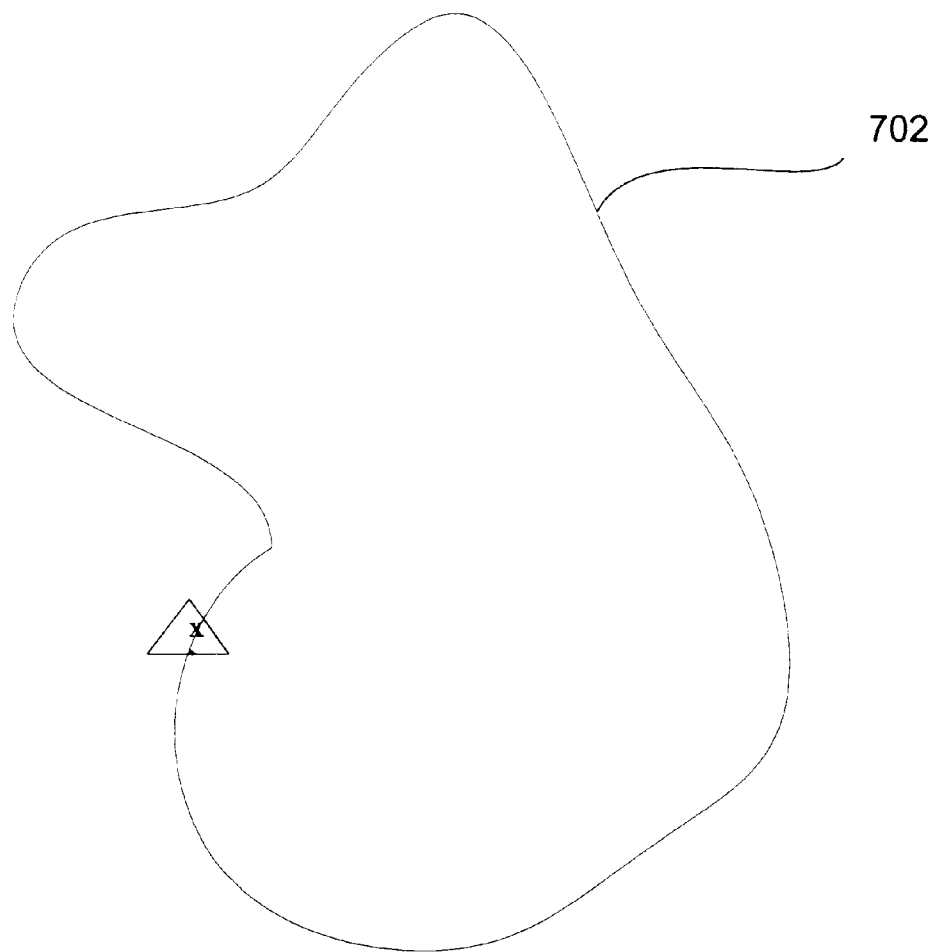
FIGS. 7B–D illustrates an example of a shape recognition method according to an embodiment of the present invention.
Figure 7C:
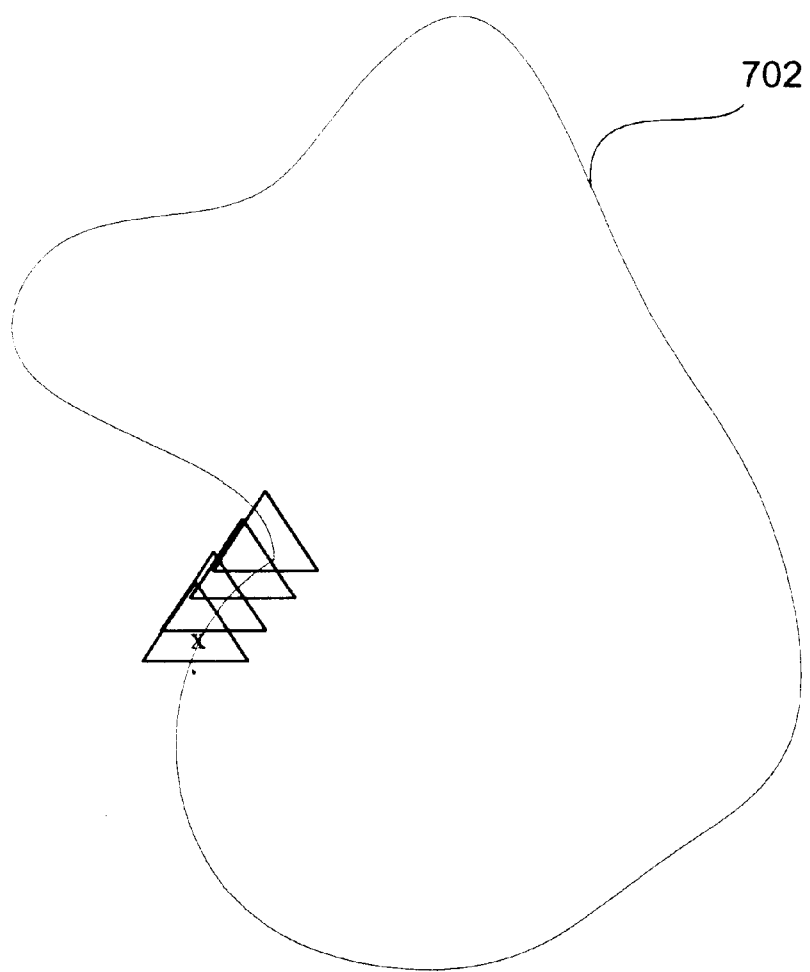
Figure 7D:
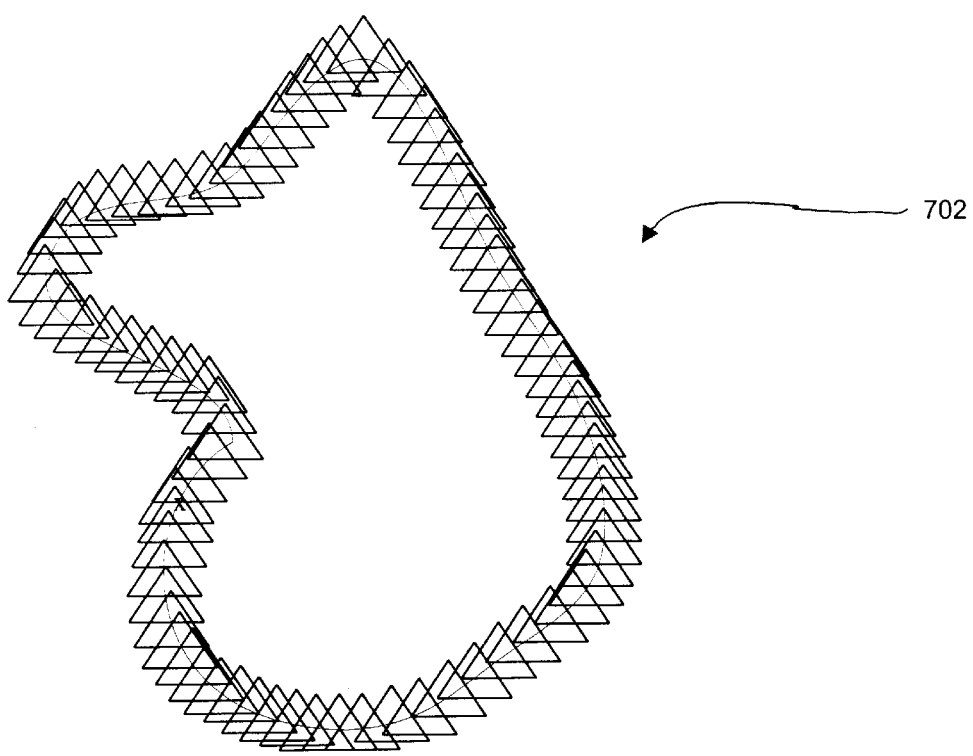
Figure 8F:
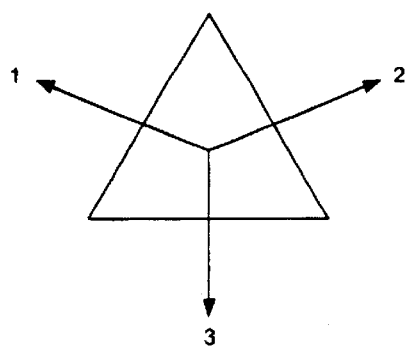

In the example illustrated in FIGS. 7A–D, the addressing scheme shown in FIG. 8F, an equilateral triangle with three unit direction vectors (k=3), is used. The sides of the triangle are provided with labels for labeling the tiling addresses. In the illustrated embodiment, the labels are the numbers 1, 2 and 3. However, other labels such as letters or other symbols may also be used.

Referring again to the example illustrated in FIGS. 7A–D, in a preferred embodiment, the size of the equilateral triangle or other selected addressing scheme is first scaled according to a predetermined method. For example, in one embodiment, the side of the equilateral triangle may be sized as a certain fraction of the radius of the smallest circle which would encompass the entire shape to be represented as a sequence. FIG. 7A illustrates a circle 706 which completely encompasses the shape. The length of the sides of the triangle polytope may then be determined to be a predetermined fraction of the radius of the circle 706. In this manner, size is normalized for all shapes to be compared.

In a further embodiment, the orientation of the shape may be normalized as well. For example, the smallest circle encompassing the entire shape and tangent to the shape at a minimum of two points may be determined. FIG. 7A, for example, illustrates such a circle 706 that is tangent to the shape at three points, labeled as A, B and C. Chords of the circle between tangent points may be drawn, and the longest of these chords 708 may be used to normalize the orientation of the shape. In certain cases, two or more chords may be equally long and may be the longest chords. In such a case, the next longest chord may be selected for orientation. As illustrated in FIG. 7A, the direction parallel to the chord 708, for example, may be designated as the "3" direction (i.e., parallel to the unit vector through the face having the label "3"). In an alternative embodiment, a normal may be drawn from the longest chord 708 to the center 706a of the circle 706, and this normal may be used to orient the tiling polytope. The orientation may thus be normalized for all shapes.

The size of the equilateral triangle may also be adjusted for a desired resolution of the representation of the shape. For example, a small triangle size will result in the capturing of even small shape features. In one embodiment, several triangle sizes may be used for each shape to obtain a series of address sequences. These series of sequences may be used in an hierarchical manner for comparison of the shape to other shapes.

Another addressing scheme with a larger number of faces, such as a regular hexagon, may also provide finer granularity (directionality) of the shape. In this regard, the direction of the shape contour may be more precisely characterized. For example, while a triangle provides three directions, a hexagon provides six directions, in effect doubling the resolution of the shape description by providing more distinct direction address labels for the same scalar distance. In a similar way, altering the scalar distance or cross section of the triangle or the hexagon would increase the resolution or number of direction vectors (but not increasing the number of distinct direction descriptions) describing the pathway around the shape.

Referring again to FIG. 7A, a starting point is selected on the shape for representing the shape as a sequence of tile addresses. In FIG. 7A, the starting point is marked by an "x". The starting point may be selected at random, and its selection does not affect the attractor behavior for any closed shape whose orientation has been normalized. However, in a preferred embodiment, the starting point may be normalized by selecting, for example, one of the points on the longest of the above-described chords. For example, point A in FIG. 7A may be selected as the starting point in a preferred embodiment. A uniquely selected starting point facilitates rotational independence of the characterization of the shape.

Now referring to FIG. 7B, an equilateral triangle according to the addressing scheme is centered about the selected starting point. From here, we may proceed in either of the two directions of the shape contour. Whether one proceeds in the clockwise or counter-clockwise directions should be predetermined. In the illustrated example, we proceed in a clockwise direction. In this direction, the shape contour intersects the face of the tiling triangle with an address label of "2" (see FIG. 8F). Thus, the first character in the sequence is "2".

Now referring to FIG. 7C, a second triangle is centered about the intersection of the shape contour with the face of the previous triangle, and the intersection of the contour with a face of the second triangle is noted. The orientation of the triangles is maintained as a constant relative to the background and is aligned relative to the orienting scheme described above. In this case, the shape contour again intersects the face of the second triangle with an address label of "2". Thus, the sequence of address labels is now "22". FIG. 7B illustrates this process repeated two more times. For the fourth triangle, the shape contour intersects the face of the triangle with an address label of "1". Accordingly, the sequence after the fourth triangle is "2221". FIG. 7D illustrates the continuation of the representation of the shape as a sequence of tile addresses. It is noted that once the entire shape has been thus represented, the resulting sequence is actually a loop. Thus, as noted above, the starting point of the representation is irrelevant.

Upon complete representation of the shape 702 in FIGS. 7A≧D as a sequence of tile addresses, the following sequence is obtained:

2221111111111122222222222222222333333333333333 33333333 333333333311111111111111222 (SEQ. A-1)

The above-described tiling scheme is similar to that described by Dougherty, *Mathematical Methods for Artificial Intelligence and Autonomous Systems*, cited above and incorporated herein by reference. The fundamental difference between Dougherty's chain-coding scheme and the embodiment of the present invention is that instead of using chain-coding to build Fourier coefficients, embodiments of the present invention teach using the sequence of unit vectors (the chain code) to directly compare shapes using the attractor process.

Once the entire closed hull has been represented as a sequence of tile addresses, the resulting sequence represents the entire shape in the form of symbols, similar to those described above with reference to the DNA sequence example. Similarly, an attractor may be used to detect, interpret, recognize, identify and compare the shape represented by the sequences.

The attractor may also be applied to the above sequence by taking two or more symbols at a time, as described above with reference to the DNA example. This step essentially increases the size of the alphabet from three to nine (for two at a time), from three to twenty-seven (for three at a time), or more. The number of symbols taken at a time may be increased to sufficiently reduce the permutation family to a desired level by increasing the alphabet size. Increasing the alphabet size effectively reduces the frequency of occurrence of each member of the alphabet. Thus, the maximum size of the alphabet may be dictated by the attractor's effectiveness at low frequencies.

In addition to 1, 2 and 3, other characters may be introduced into the alphabet of the sequence representation of the shape to facilitate in the identification of meaningful features of the shape. For example, a long segment in one direction may be represented as another symbol. In the above example, a string of five 1's, for example, may be represented by a new label of "4". Similarly, five 2's may be represented by "5", and five 3's may be represented by "6". Using these additions to the alphabet, the sequence representation of (SEQ. A-1) above may be represented as:

22244155522666663344422 (SEQ. A-2)

Further, since the sequence represents a ring, the new members of the alphabet may be applied to a segment formed by the end and the beginning of the sequence. Thus, the three 2's at the end and the three 2's at the beginning of the sequence may be represented as a string of six 2's:

254415552266666633444 (SEQ. A-3)

An additional representation of the shape may include particular features such as turns in the curve. For example, additional symbols of the alphabet may be used to represent turns of the shape between the various unit vectors of the equilateral triangle. For example, a turn from the "1" direction, represented by either a "1" or a "4", to the "2" direction, represented by either a "2" or a "5" may be represented by inserting the label "7" at the appropriate location in the sequence. The following table defines the labels for the various turns:

| Label: | Turn from: | To: |
| --- | --- | --- |
| 7 | "1" or "4" | "2" or "5" |
| 8 | "1" or "4" | "3" or "6" |
| 9 | "2" or "5" | "1" or "4" |
| 10 | "2" or "5" | "3" or "6" |
| 11 | "3" or "6" | "1" or "4" |
| 12 | "3" or "6" | "2" or "5" |

Thus, SEQ. A-3 may be represented as follows, with the turn components of the sequence shown in parenthesis:

25(9)441(7)55522(10)6666633(11)444(7) (SEQ. A-4)

Additional new members of the alphabet may be universally assigned to the appropriate features. For example, a new symbol "13" may be assigned to a recurring feature, such as a "212" turn occurring after a "313" turn and four other symbols. The combination of "313", four wildcards, and "212" may be represented by a 13, for example.

SEQ's A-1, A-3 and A-4 represent different representations of the shape. Each of these sequences may now be converted base, such as base 7, for hierarchical input into Numgram. SEQ. 1 contains the least information and is, therefore, the lowest in the hierarchy, while SEQ. 4 is the highest. Of course, other features may be embodied in the sequences, thereby creating additional levels in the hierarchy. The resulting sequences in base 7 for SEQ's A-1, A-3 and A-4, respectively, are:
(SEQ. 1:
2221111111111122222222222222222233333333333333 3333333333 33333333331111111111111222 (SEQ. A-5)
(SEQ. 3:
25441555226666633444 (SEQ. A-6)
(SEQ. 4:
25(12)441(10)55522(13)6666633(14)(444(10) (SEQ. A-7)
Looking first at SEQ. A-5, a frequency distribution of the symbols in the sequence is first generated:

| Base 7 Symbol | Number of base 7 symbols | Conversion of Number to base 7 |
|---|---|---|
| 0 | 0 | 0 |
| 1 | 26 | 35 |
| 2 | 23 | 32 |
| 3 | 32 | 44 |
| 4 | 0 | 0 |
| 5 | 0 | 0 |
| 6 | 0 | 0 |

A Numgram table, as described above with reference to the DNA example, may now be generated:

| 0 | 1 | 2 | 3 | 4 | 5 | 6 | Row Number |
|---|---|---|---|---|---|---|---|
| 0 | 35 | 32 | 44 | 0 | 0 | 0 | 1 |
| 4 | 0 | 1 | 2 | 2 | 1 | 0 | 2 |
| 2 | 2 | 2 | 0 | 1 | 0 | 0 | 3 |
| 3 | 1 | 3 | 0 | 0 | 0 | 0 | 4 |
| 4 | 1 | 0 | 2 | 0 | 0 | 0 | 5 |
| 4 | 1 | 1 | 0 | 1 | 0 | 0 | 6 |
| 3 | 3 | 0 | 0 | 1 | 0 | 0 | 7 |
| 4 | 1 | 0 | 2 | 0 | 0 | 0 | 8 |

From the above table, it can be seen that row 8 is identical to row 5. Therefore, the result is an oscillating behavior. For consistency with the DNA example only, the behavior may be assigned a token value of 0. One can now build the multisets of the inverted pyramids as per Table 7 of the DNA example. Further, one can take the symbols two at a time or three at a time, for example, and obtain further token values. Still further, the symbol strings at each level of the inverted pyramid may be taken two-at-a-time or three-at-a-time, for example, to obtain additional multisets. Each such multiset results in a token value assigned from the attractor behavior. Thus, using the multisets, a token string that is characteristic of the shape is obtained.

Alternatively, rather than building an inverted pyramid as with the DNA example, a string of token values may be generated using the hierarchical sequences SEQ.'s A-6 and A-7. In one embodiment, each level of the hierarchy may represent a ring, with the shape being characterized by a concatenation of the rings: (SEQ. A-5)(SEQ. A-6)(SEQ. A-7). An inverted pyramid be built by chopping off one ring at a time, for example. As noted above, other levels of hierarchy may be added. For example, a smaller polytope size may be used for greater resolution. Further, other polytopes with a greater number of unit vectors and unit hypotenuses may be used to obtain symbol strings with greater directional resolution. The symbol strings obtained at different resolutions may be concatenated as additional rings.

The above-described example provides an illustration of multisets related to shapes in which the frequency of occurrence of each label is determined. Other multisets may also be applicable. For example, in other embodiments, the direction of curvature of a one-dimensional shape may be analyzed to determine the existence of convex and concave portions. As an illustration, reference is made to the shape 702 in FIG. 7A, in which a convex region can be seen around each of points A, B and C. An additional convex region can be seen above and to the right of point C. Between each of the convex regions exists a concave region, most prominent of which are seen between points A and B, and between points B and C. Depending on the size of the addressing polytope and, therefore, the resolution of the addressing scheme, certain regions may not be distinguishable. For example, using a large addressing polytope may result in the less prominent concave regions between points A and C not being characterized. A transition point may be identified between each convex region and an adjacent concave region. For example, an inflection point may be determined between the convex region around point B and the concave region between points B and A. At the location of this inflection point, a symbol associated with such a transition may be inserted into the symbol sequence for the shape, for example.

Although the above attractor example uses numbers to represent frequency, other symbols may be used for this purpose as well. For example, as noted above with reference to the DNA example, the frequency may be represented by the English word for the integer. For example, "1" may be represented as "ONE". Then the frequency of occurrence of "O", "N" and "E", as well as other members of the English alphabet, may be counted in the next row. In this regard, a base-26 system is used.

Further, although the base-7 example described above yields two possible states (one stable and one oscillating), attractors with a greater number of states may be used as well. For example, an attractor with two distinct stable points and three distinct oscillation points may be used. It can be shown that, for example, an attractor using the base-26 system described above yields more than two distinct states.

It is noted that the orientation of the shape relative to the addressing scheme may be irrelevant for closed hulls. For example, since the above-described attractor evaluates the count of each symbol, the number of 3's in one orientation may simply be the number of 1's in another orientation. This is true since the Numgram process counts the frequency of occurrences regardless of the symbols contributing to the frequency. For example, in the table above, after the first row, the source of the frequency is lost and is, therefore, irrelevant. Thus, in the attractor space, the obtained sequence of tile addresses represents not only the given shape, but also any rotation of that shape. This is especially useful if a polytope with a large number of faces is used.

According to another aspect of the invention, a two-dimensional shape or surface patch in any n-dimensional space may be characterized as the concatenation of unit direction vectors radiating from a single starting point. A two-dimensional shape may exist in an infinite number of different n-dimensional domain spaces. A two-dimensional shape in such an n-dimensional space may be approximated by a series of unit vectors or unit hypotenuse vectors radiating from a starting point.

The two-dimensional shape may be expressed using the tile addresses. From a start address on the periphery of the two-dimensional shape, each first-adjacent tile address is evaluated to determine which direction it is from the first, and the result is expressed using the facial direction labels of the polytope. The resulting direction vectors are recorded in a list. Each of the first-adjacent tiles iterates the process from the right-periphery adjacent tile to the left-periphery adjacent tile. This may continue until all of the tiles in the two dimensional shape have been described as a sequence of direction vectors in a list. The lists are concatenated into a single sequence, or the shape sequence.

Figure 9A:
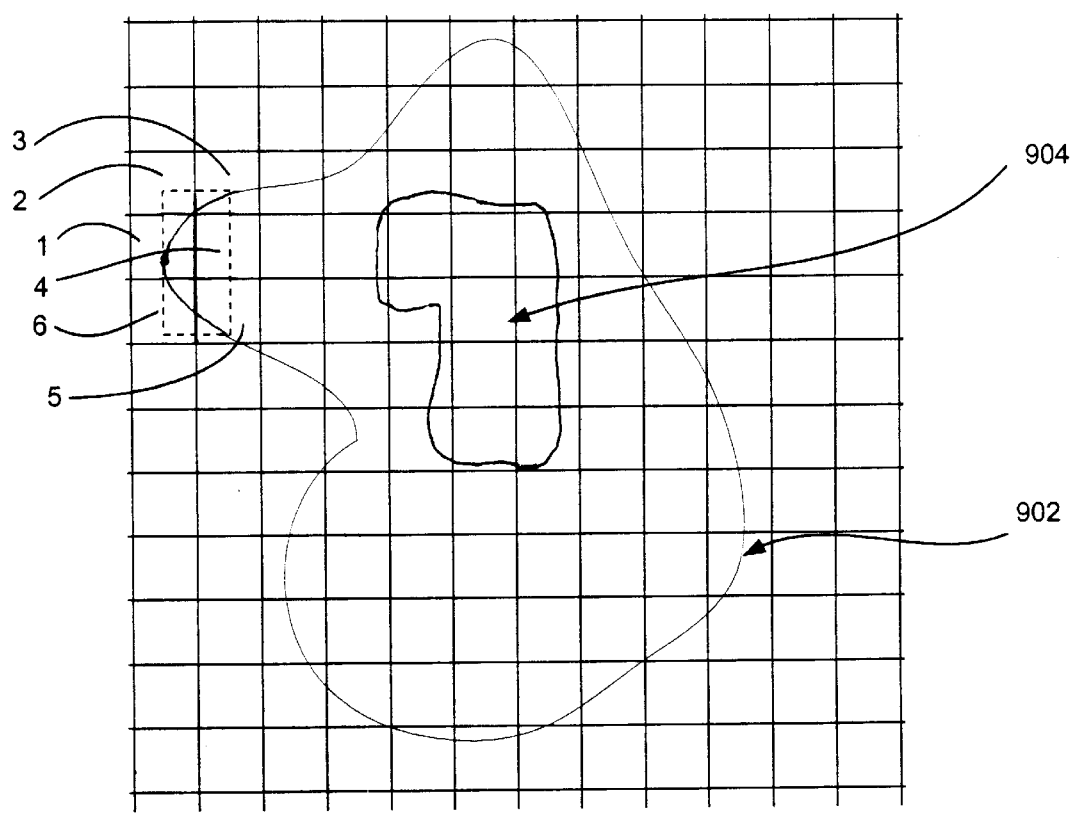
FIGS. 9A–H illustrate an example of a two-dimensional surface shape recognition method according to an embodiment of the present invention.

FIGS. 9A–H provide an example of an implementation of this method. FIG. 9A illustrates a two-dimensional surface 902 having an outer boundary that is similar to that described above with reference to FIGS. 7A–D. The two-dimensional surface is a continuous surface with a central hollow region 904. A grid of tiles is overlaid onto the two-dimensional surface, the grid being shown, as way of example and not as a limitation, as a grid of squares. It will be understood by those skilled in the art that other grids, such as a hexagonal grid, may be used as well.

As described above with reference to the one-dimensional shape, a scaling and an orientation normalization may be applied to the shape prior to the overlaying of the tiles, or grid. In this respect, the orientation of the tiles relative to the shape and the size of the squares on the grid may be determined according to the normalization. Thus, the shape of the two-dimensional surface can be, for example, compared against similarly normalized shapes.

The squares also represent the addressing scheme. In this regard, for illustrative purposes, the addressing scheme illustrated in FIG. 8A is used for the grid squares in FIG. 9A. Thus, the addressing scheme provides labels for the four unit vectors of the square, one for each face.

Referring again to FIG. 9A, a starting square may be selected from which the shape will be mapped. The starting point may be normalized as well. For example, a left-most square on the grid with at least a portion of the surface area therein may be selected. In the event two or more squares meet this criteria, an uppermost, lowermost or central one of those squares may be selected as the starting square. In the illustrated example, a central square on a left-most column of squares is selected. From the starting square, labeled as square (1) in FIG. 9A, an initial direction may be selected. This initial direction may be predetermined or normalized as well. For example, a syntactic rule may be implemented requiring the initial direction to be upward. Thus, from the first square (1), an adjacent square (2) in the upward direction is observed to determine whether any part of the two-dimensional surface exists thereon. If so, the first label in the sequence is assigned to correspond to the direction of that adjacent square (2) relative to the starting square (1). In the case illustrated in FIG. 9A, the first label in the sequence is determined to be "1".

Next, an adjacent square to the present square (2) which has not been previously counted is observed to determine whether it contains any portion of the two-dimensional surface. The determination of which adjacent square to observe may be made according to one or more syntactic rules. For example, an order may be dictated by the rules such as right-straight-left. In other words, the rules may dictate that, relative to the direction from the previous square (1), the next square to observe after the present square (2) is first the right square, in this case, square (3), resulting in a label in the sequence of "2". This process is continued until the path returns to the starting square. As illustrated in FIG. 9A, the resulting sequence for the first ring is "123341". The path is illustrated in FIG. 9A by a dotted line through squares (1-6). The set of syntactic rules may be defined a priori to maintain consistency. For example, as described above, one may adopt the rule that the observation of the adjacent squares begins at the right-most square measured from the direction of the path, going counterclockwise to the left-most square. During the determination of the path for a subsequent ring, as described below with reference to FIGS. 9B–H, if the rightmost square either does not contain a portion of the shape or has already been counted, the square in the straight direction is observed. Similarly, if the straight square either does not contain a portion of the shape or has already been counted, the square in the leftmost direction is observed. Other rules may be used to determine the return of the path to the starting square when no uncounted adjacent squares exist.

Figure 9B:
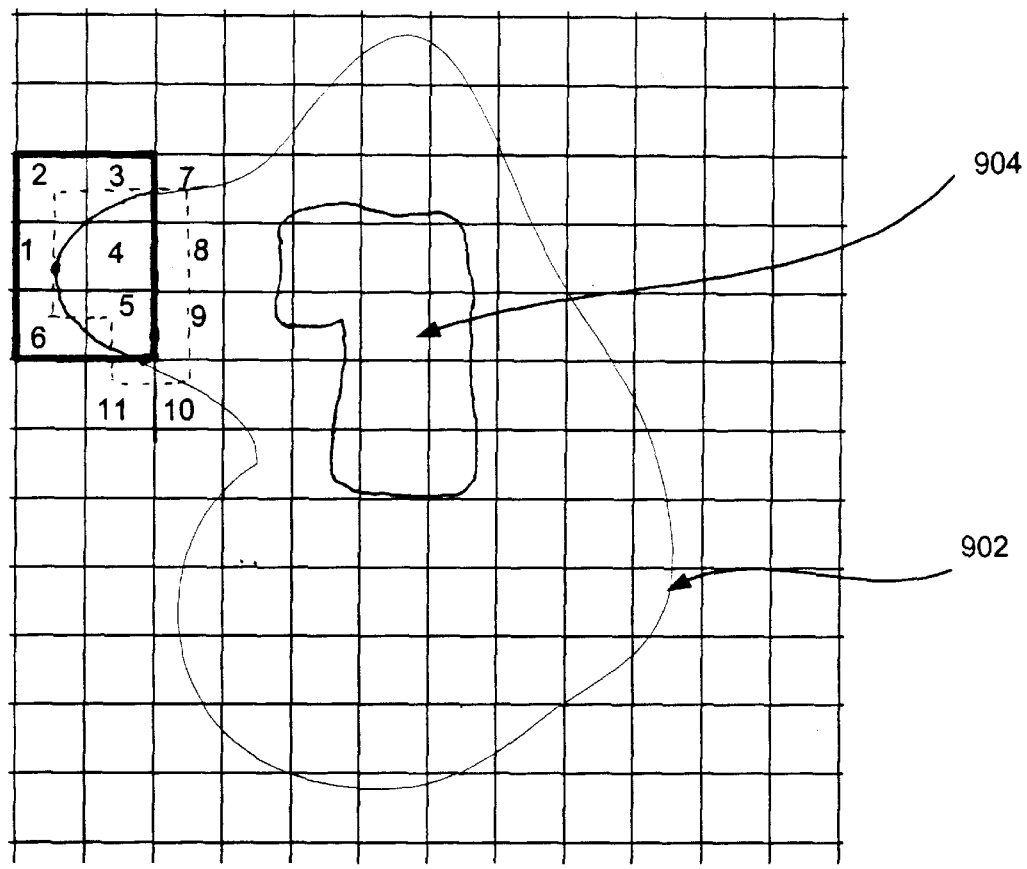

Next, from the starting point (1), a second ring is counted to determine a second sequence ring, as illustrated in FIG. 9B. The method first determines whether any of the squares adjacent to the starting point (1) containing a portion of the two-dimensional surface have not yet been counted. If all adjacent squares have been counted, the method simply follows the previous path, as in this case, to the square (2) above the starting square (1) for a label in the sequence of "1". A similar determination is made at each subsequent square.

If an uncounted square adjacent to an already counted square has a portion of the two-dimensional surface therein, the path diverges from the previous path to include the uncounted adjacent square, as illustrated at square (3) on the dotted path of FIG. 9B. At square (3), first the right most square (4) is observed and noted as already counted. Next, the square in the straight direction, square (7), is observed and determined to contain a portion of the shape. Thus, a "2" is added to the sequence label, and the path continues from square (7) according to the set of rules.

Figure 9C:
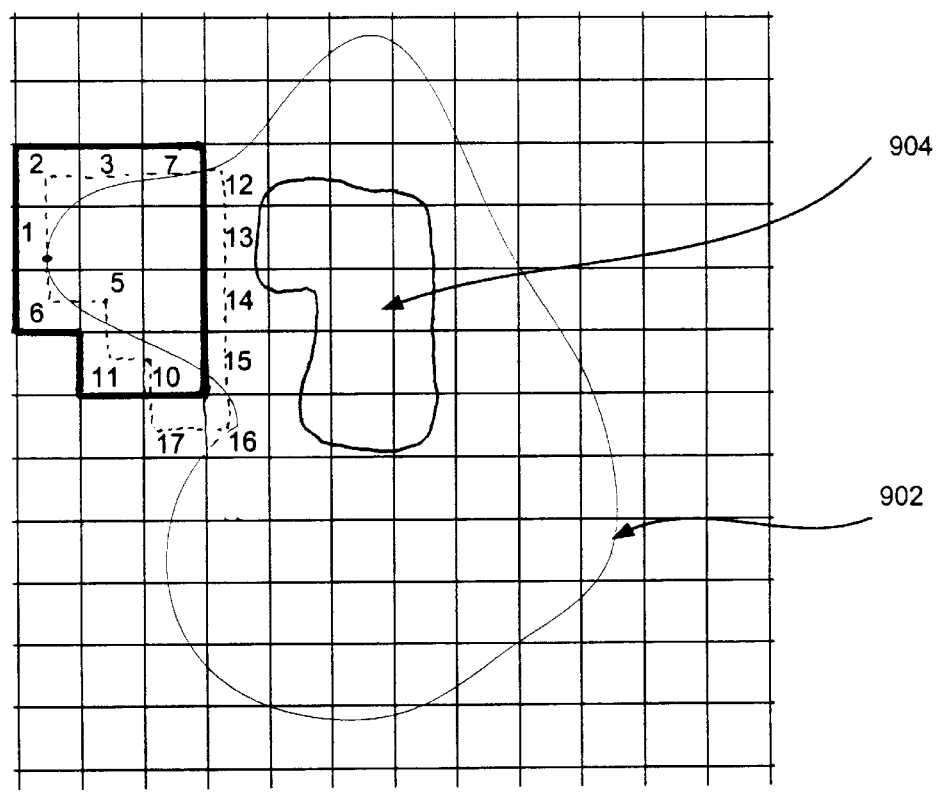
Figure 9D:
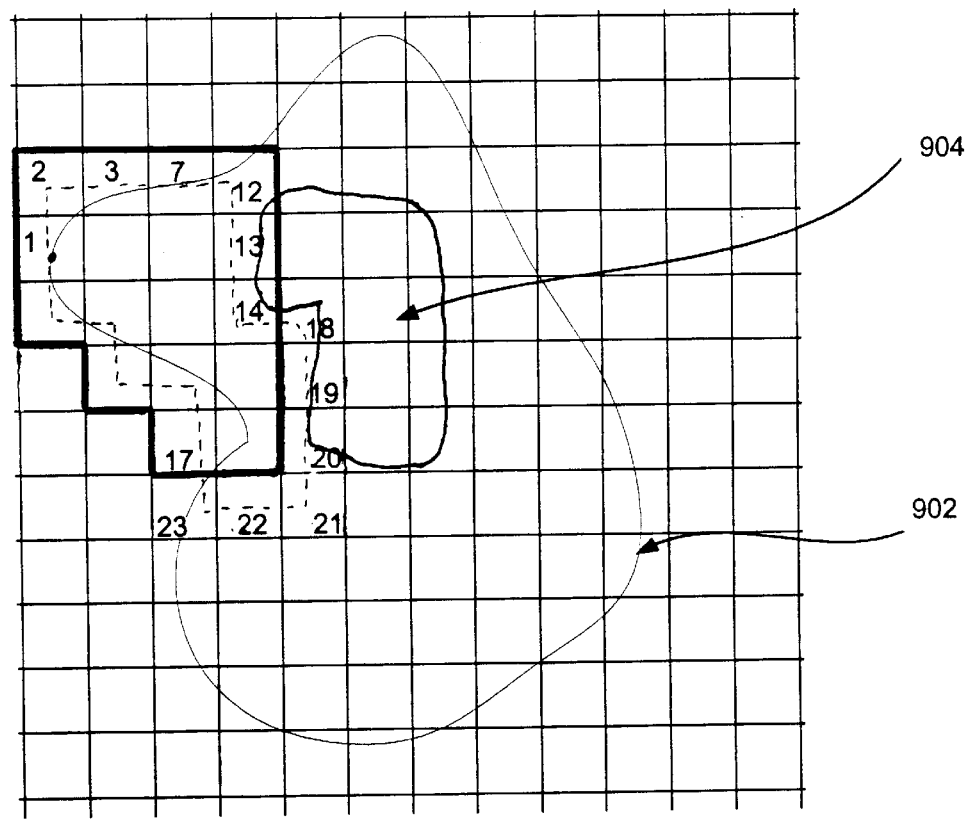

The solid line of FIG. 9B corresponds to the squares already mapped to the sequence, in this case in FIG. 9A. The diverged path continues as described above to subsequent adjacent squares that have not been counted. When no such uncounted squares exist adjacent to a square, the path merges with the original path in order to return to the starting square, as illustrated at square (11) in FIG. 9B. A third and a fourth ring are similarly generated, as illustrated in FIGS. 9C and 9D, respectively.

Figure 9E:
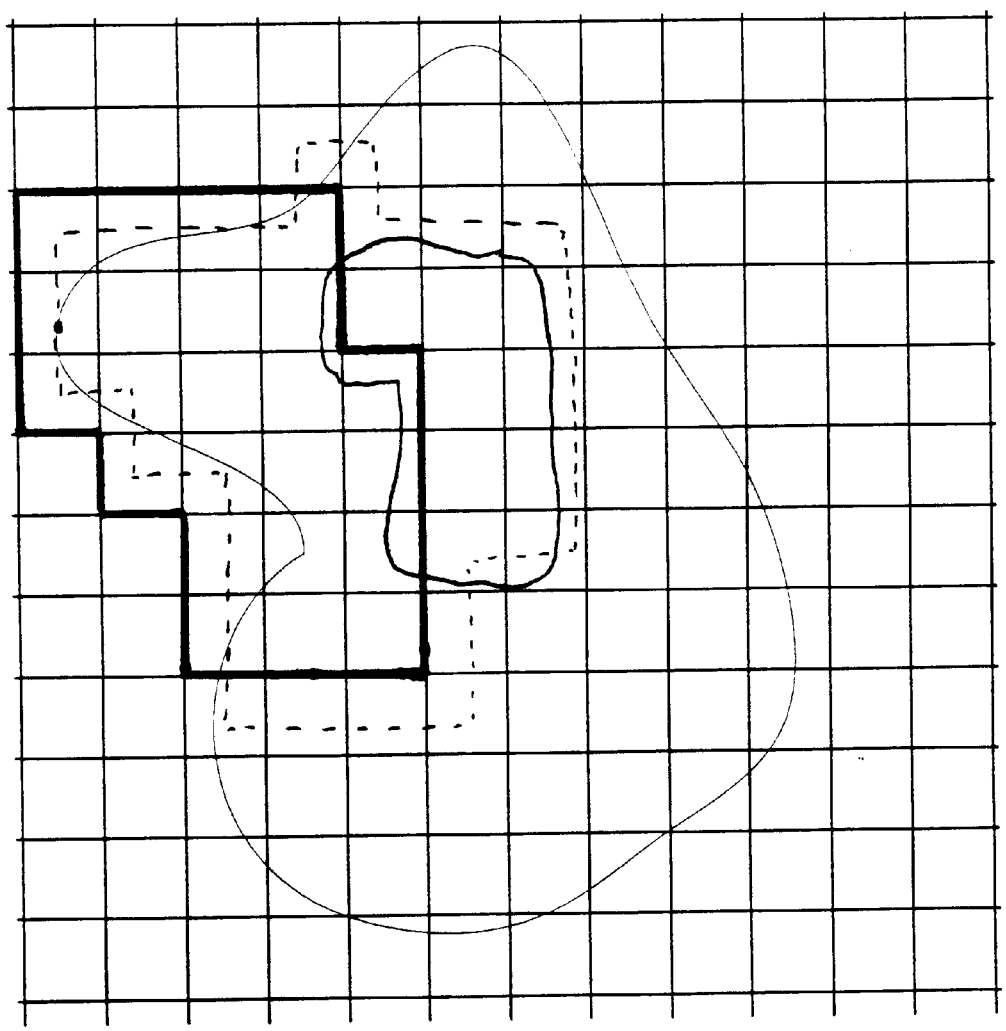
Figure 9F:
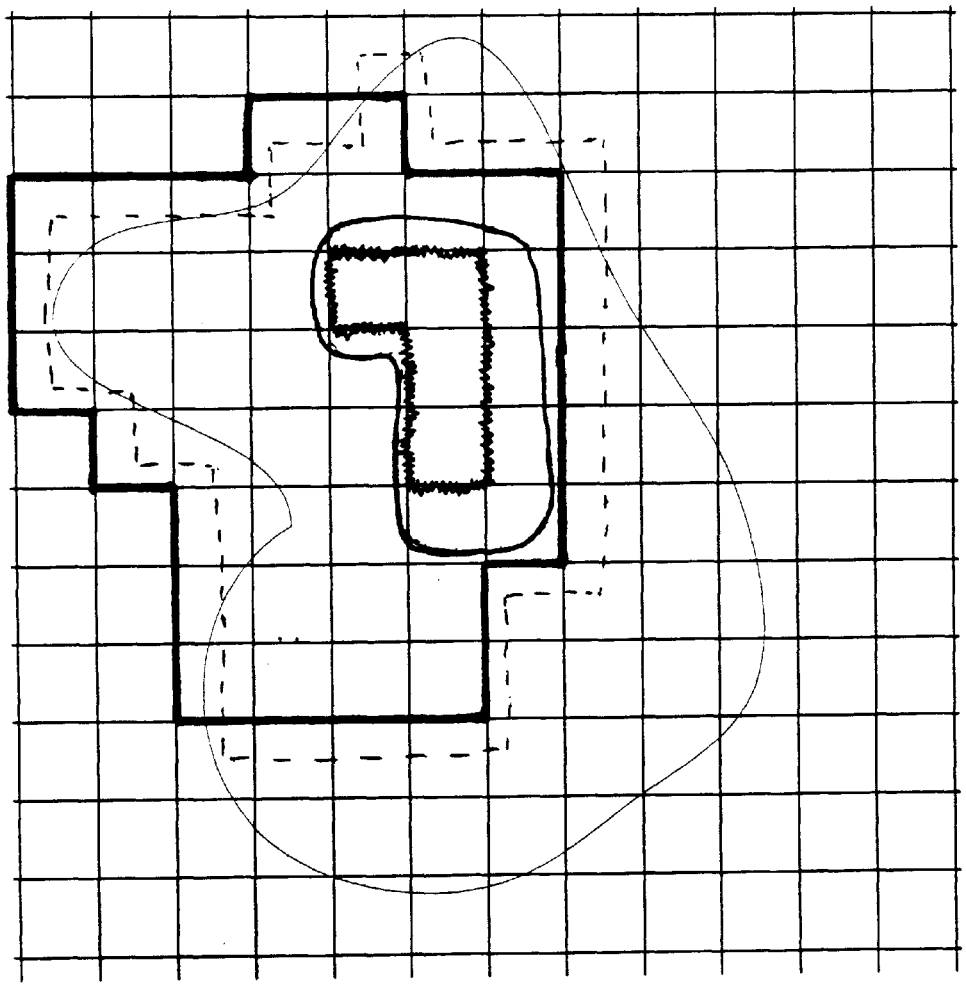
Figure 9G:
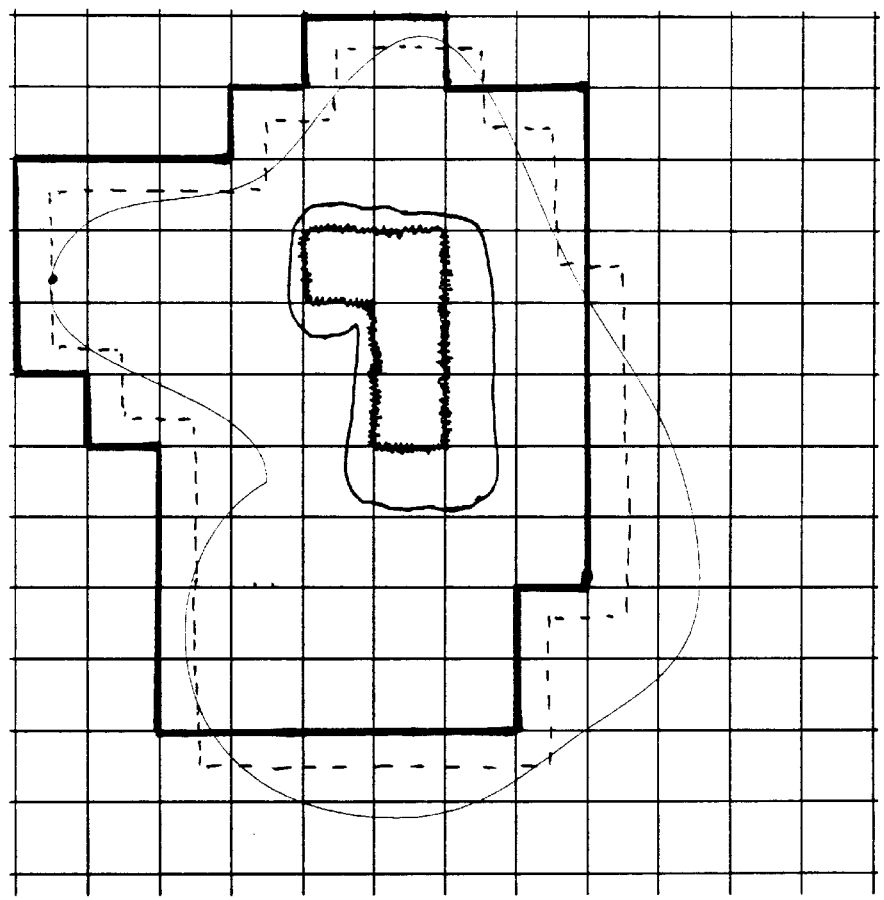
Figure 9H:
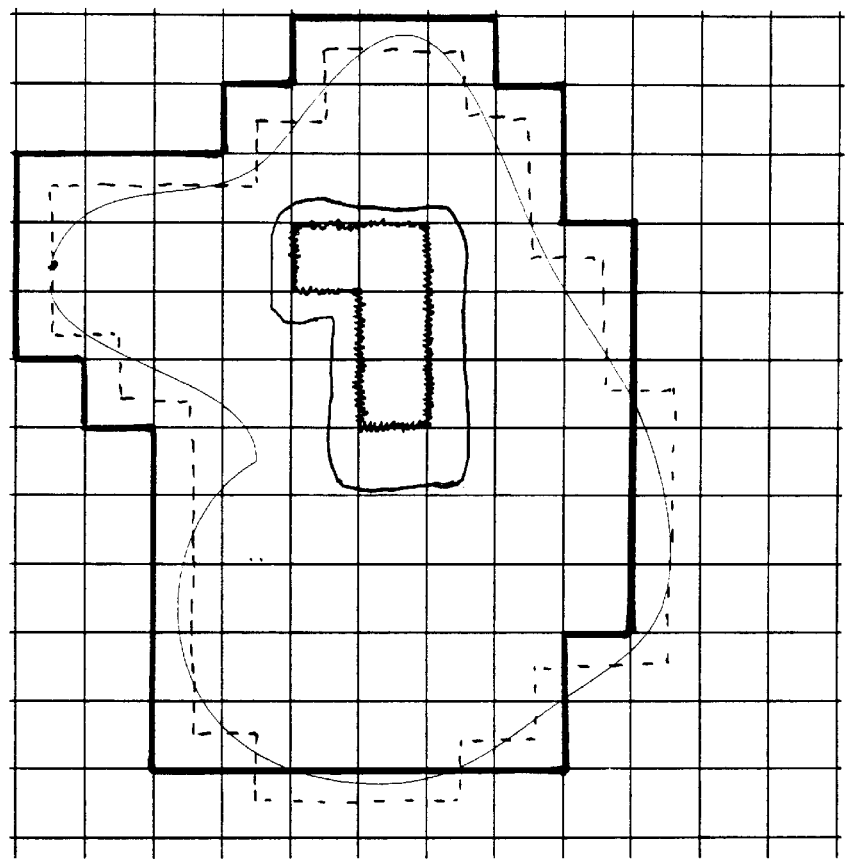

FIG. 9E illustrates the generation of another ring of the sequence with the path going around the hollowed central region. The path avoids squares that contain no portion of the two-dimensional surface. Subsequent rings are illustrated in FIGS. 9F–H with the squares containing no portion of the surface outlined with a hashed line.

In other embodiments, this process may be applied using an interior point, such as the centroid, as the starting point. In this instance, it must be insured that the starting square has a portion of the surface therein. For example, in the; example illustrated above, the centroid may be located in one of the squares of the hollowed central region.

The set of syntactic rules described above may be selected or determined by a user as appropriate for a particular use. For example, one use may be best satisfied using a raster scan to generate a symbol string. The primary requirement for these rules is consistency. The rules must be consistently applied within each shape and across all shapes to be compared or analyzed, for example.

Once the various sequence rings have been obtained, the shape may be represented as a statement comprising the alphabet elements representing the unit vectors and/or unit hypotenuses. In one embodiment, the statement is the concatenation of the sequences of each ring. In the illustrated example, the statement may be expressed as follows:

(1 2 3 3 4 1)(1 2 2 3 3 3 4 1 4 1)(1 2 2 2 3 3 3 3 4 1 4 1 4 1)
(1 2 2 2 3 3 2 3 3 3 4 4 1 1 4 1 4 1)(1 2 2 2 1 2 3 2 2 3 3 3
3 4 3 3 4 4 4 1 1 1 4 1 4 1)
(1 2 2 2 1 2 1 2 3 2 2 3 3 3 3 3 3 4 3 3 4 4 4 4 1 1 1 1 4 1 4 1)
(1 2 2 2 1 2 1 2 2 3 2 3 3 2 3 3 3 3 4 3 4 4 4 4 4 1 1 1 1 1 4 1)
(1 2 2 2 1 2 1 2 2 3 2 3 3 2 3 3 3 3 4 4 3 4 3 4 4 4 1 4 1 1 1 1 1 4 1 4 1)
(SEQ. A-8)

As with the example described above with reference to FIGS. 7A–D, the statement may now be converted to a selected base, such as base 7, and may be inputted into Numgram to obtain a token value for the entire statement. As with the DNA example and the one-dimensional shape described above, an inverted pyramid may be generated by chopping off the left-most and right-most rings and/or chopping off the left-most and right-most symbols. Further, the symbols may be taken two at a time or three at a time, for example. Further, as described above with reference to FIGS. 7A–D, the symbol sequence at each level of the pyramid may be taken two at a time or three at a time, for example, and determining a sequence of token values for the shape. Thus, a two-dimensional shape in any n-dimensional shape may be evaluated.

According to another aspect of the invention, an m-dimensional shape in any n-dimensional space may be characterized as the concatenation of unit direction vectors, where n is greater than or equal to m. An m-dimensional shape may exist in an infinite number of different n-dimensional domain spaces. An m-dimensional shape in such an n-dimensional space may be approximated by a series of unit vectors or unit hypotenuse vectors. For example, a two-dimensional shape, as described above, in a three- or greater dimensional space may be characterized as a sequence of unit vectors.

According to another aspect of the invention, a one- to m-dimensional shape in any n-dimensional space, where 0≦n≦m, may be characterized as a subspace dimensional mapping using a concatenation of subspace unit direction vectors. A one- to m-dimensional shape may exist in an infinite number of different n-dimensional domain spaces. An m-dimensional shape in an n-dimensional space may be approximated by a series of unit vectors or unit hypotenuse vectors in the n-dimensional subspace.

According to another aspect of the invention, a one-dimensional shape in any n-dimensional space may be characterized as the concatenation of angle-type descriptions. The angle-type geometry may be defined by creating a polytope with enough faces so that all of the unit vectors or unit vector hypotenuses in the n-dimensional space can be mapped to a face. Once a label is chosen for each facial direction, the direction of every possible second vector is mapped to an angle type.

The shape may be expressed using the tile addresses in place of coordinates. From a start address, each pair of tile addresses may be evaluated to determine which direction the second is from the first, and the result is expressed using facial direction labels of the polytope. Then, the direction to a third address may be determined and the result may be evaluated for an appropriate angle class. After doing this three-wise for the entire shape, the shape may be expressed as a sequence of discrete angle-type sequences.

In one embodiment, as illustrated in FIGS. 1A–B, a starting point 1104 of a one-dimensional closed-hull shape 1102 may be determined as described above, and a scaling and orientation normalization may be performed. From the starting point 1104, a first direction may be determined according to the facial directions of a hexagon addressing scheme, such as that illustrated in FIG. 8C, yielding a second point 1106 at which a face of a first hexagon 1108 intersects the shape 1102. A second hexagon 1110 is centered at the second point 1106, and a third point 1112 is determined at which a face of the second hexagon 1110 intersects the shape 1102. Following the example of FIGS. 7A–D, the tile orientation may be kept constant during the contour tiling process. Alternatively, the tile orientation may change as one traverses the contour 1102 as long as the rules (syntactic rules) are established to define an unambiguous process for tiling the contour. In the example of FIGS. 1A–B, a non-constant tile orientation is chosen. Thus, the second hexagon 1110 is oriented such that a reference point is positioned on the shape at or adjacent the previous point 1104. In the illustrated embodiment, the reference point is the vertex between the faces labeled "1" and "6", with the face having the "6" label shown with a double line. Now, an angle type may be determined at the second point 1106 as being a function of the angle between the line from the first point 1104 to the second point 1106 and the line from the second point 1106 to the third point 1112. In the illustrated example, the angle type is "4" since the shape intersects the second hexagon 1110 at the face labeled "4". Similarly, an angle type may be determined at the third point 1112 with a third hexagon 1114 being centered on the third point 1112 with the vertex at or adjacent the previous intersection point.

Figure 11A:
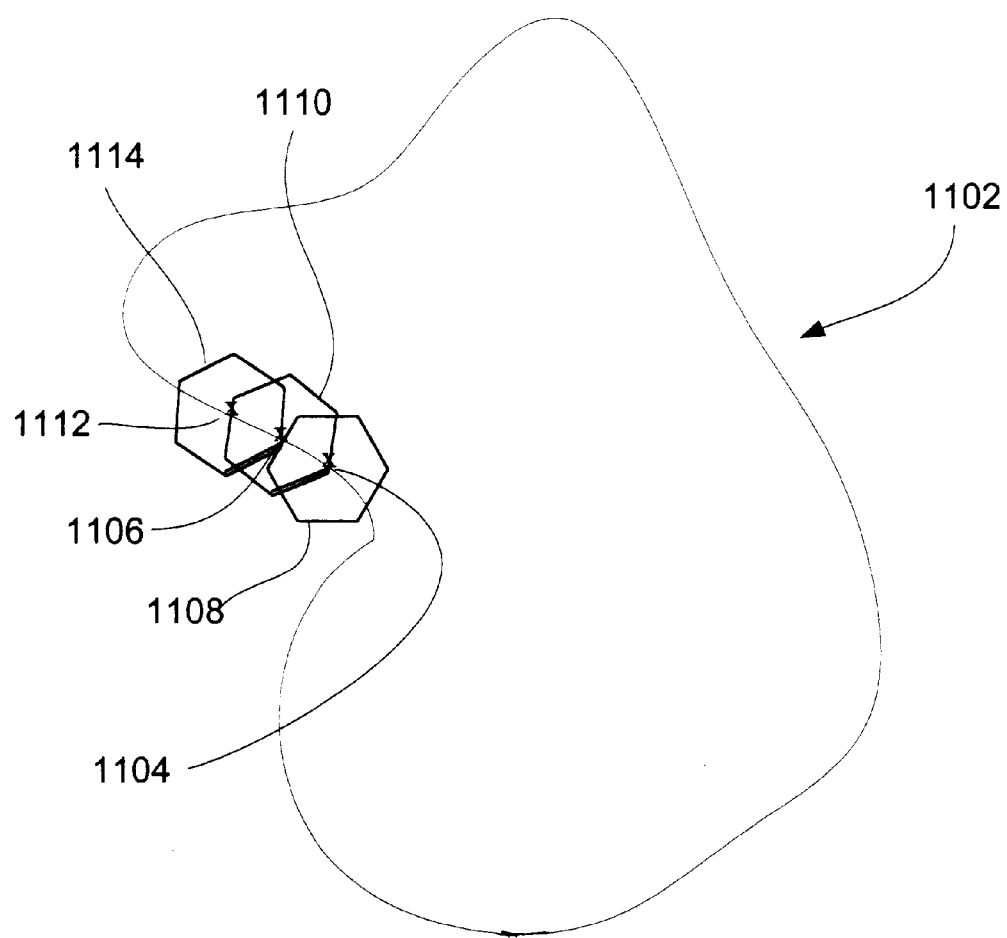
FIGS. 11A–B illustrate an example of a shape recognition method according to an embodiment of the present invention using angle-type address labels.
Figure 11B:
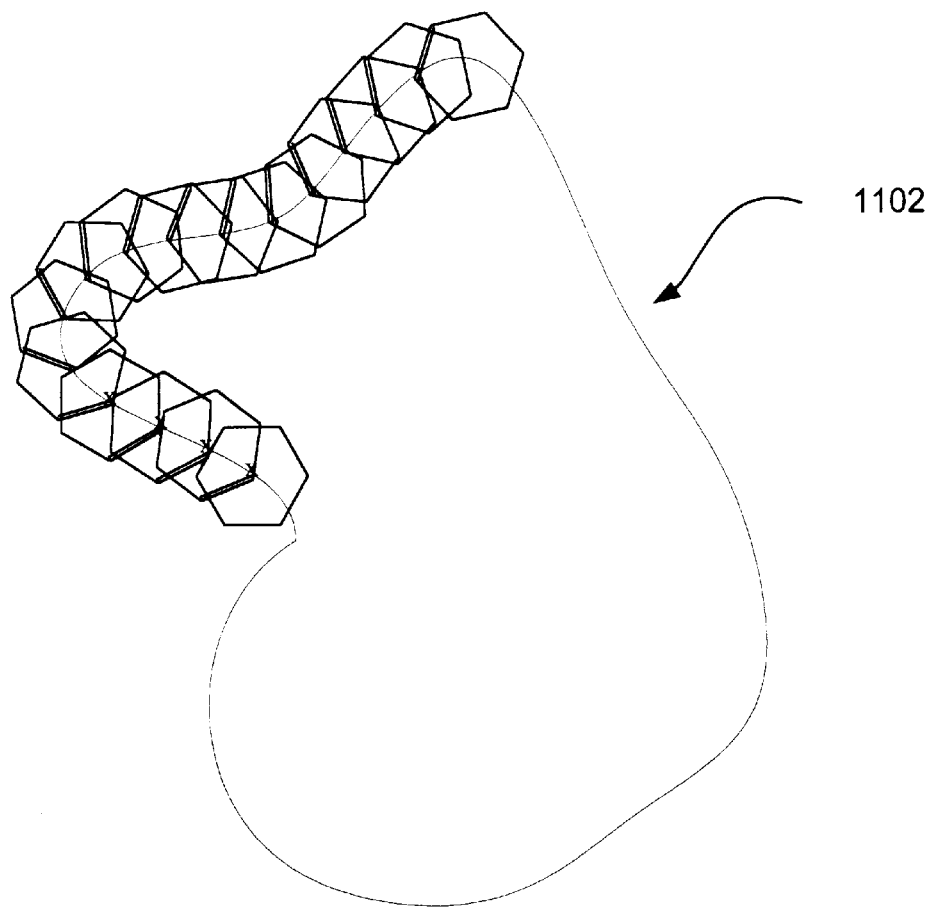
Figure 12:
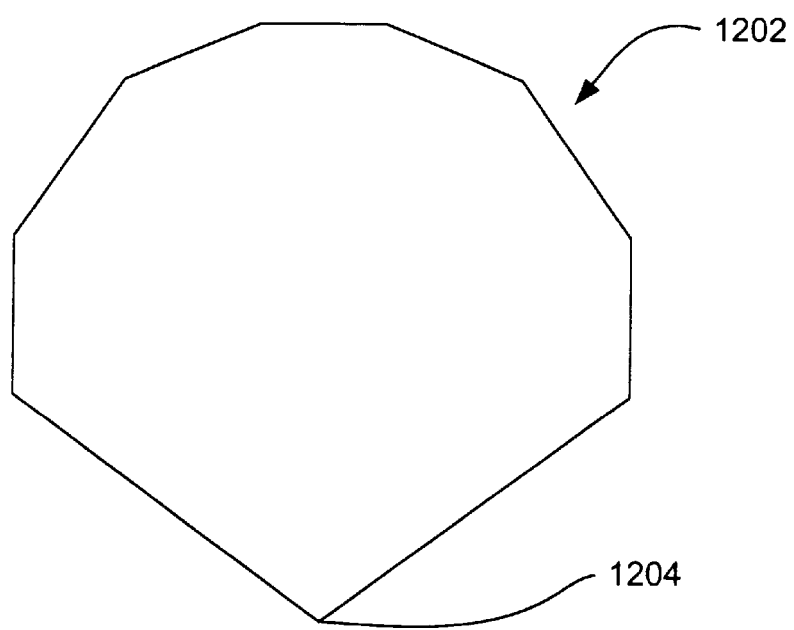
FIG. 12 illustrates another example of a polytope for use with angle-type address labeling according to an embodiment of the present invention.

Although FIGS. 11A–B illustrate the use of a regular hexagon as the addressing polytope, other shapes may be useful as well. For example, FIG. 12 illustrates an irregular polygon for use with an angle-type addressing scheme. The irregular polygon 1202 is provided with a primary vertex 1204 that is used as the reference point aligned with the shape at or near a previous point. Opposite the primary vertex 1204, the polygon 1202 is provided with a relatively large number of faces. This allows the polygon 1202 to more finely characterize the small turns of most shapes.

The angle types may be selected based on several addressing schemes. For example, in one embodiment, the angle types may include acute and obtuse angle types. In the example illustrated in FIGS. 11A–B, six different angle types are possible. The angle types correspond to the six directional vectors corresponding to the six faces of the hexagon. It is noted that the orientation of the hexagonal polytope changes as the perimeter of the shape is characterized. Thus, the angle type at each point is characterized relative to the angle between adjacent points. The result of this characterization is a sequence of angle types that may be converted to a desired base and may be input into Numgram. The angle-type characterization has the additional benefit, with a normalized starting point, of completely eliminating any need for normalization of the orientation since the angle types are self-normalizing in orientation.

While the shapes in FIGS. 7A–7D and in FIGS. 11A–11B may generally be understood to be one dimensional, these shapes (contours or lines) actually have a dimensionality, in particular a fractal dimensionality, that is between one and two. Fractal dimensions may be understood by comparing, for example, a Cantor set, a set of straight lines and a set of Koch curves. In the Cantor set, the first three iterations of which are shown in FIG. 13A, the middle third of each line is removed to form the next members of the set. The process continues ad infinitum. Thus, the second member of the set consists of two copies of the first member(and the third consists of two copies of the second, etc.), but each copy is one-third the size of the first set. This same relationship holds for each member when compared with the preceding member. For the straight line, shown in FIG. 13B, dividing the line into three segments can be done such that each segment is ⅓ the size of the starting line. Thus, for the straight line example, there are three copies of the original set, instead of two as in the Cantor set. For the Koch curve, shown in FIG. 13C, each iteration contains four copies of its predecessor and each is one-third the size of the predecessor iteration. In a similar fashion, a two dimensional square (not shown) may be seen to be made up of nine copies of itself, each being one-third the original size. From these examples, the Cantor set may be seen to have a smaller dimensionality than the straight line, and the Koch curve may be understood to have a greater dimensionality than the straight line but less than that of the square. Mathematically speaking, the Cantor set is defined as having a dimension of log 2/log 3=0.63(since it contains two ⅓ size copies of itself) and the Koch curve is defined to have a fractal dimension of log 4/log 3=1.26. Generally, the more curves and crevices in the line, the higher its dimensionality. Thus curves of dimensionality k may be understood as including dimensions where k takes not only integral values, but also non-integral values.

According to another aspect of the invention, an m-dimensional shape in any n-dimensional space, where n is greater than or equal to m, may be segmented into partial shapes by significant features such as unit vector combinations, angle sequence combinations or any other vector comparison feature. An example of this aspect may be the segmentation of a ship's silhouette into sub-silhouette segments based upon the recognition and use of a hierarchy of significant features. The various segments may then be described as a collage of partial shapes.

Examples of the hardware device for carrying out the embodiments of the invention comprise, inter alia, a digital computer or signal processor. The digital computer is programmed to carry out the various algorithms described above in connection with the FIGS. 1–13. More generally, the system or device may comprise any one or more of hardware, firmware and software configured to carry out the described algorithms and processes. For example, a shape source (e.g., video detector, imaging system, document scanner) provides an analog output. This output is digitized (fed through an analog to digital computer) and then input to the computer for analysis to apply the address labels for a chosen tiling (e.g., the tiling chosen among tiles shown in FIGS. 8A–8F as non-limiting examples). Syntactical rules are applied to define how one normalizes and procedurally tiles each successive tile. Such syntactical rules include for example the normalization rules described in connection with FIG. 7A and the procedure for placing the center of a successor tile at the cut point of the shape profile with edge of the current tile as explained in connection with FIG. 7c. In practice, a database (or table or list) will be built up of previously analyzed shapes or areas (a database of their token strings) and the analysis of the currently observed shape or area will be compared with the database. It is important to recognize that the comparing and sorting operations are very simple operations and may be preformed with simple combinatorial logic or FPLA (field programmable logic arrays) and need not be implemented on a CPU. Thus, token strings may be compared and sorted in real time, and in many applications, such operations may be performed in-line in the communication's fiber system itself.

Figure 14:
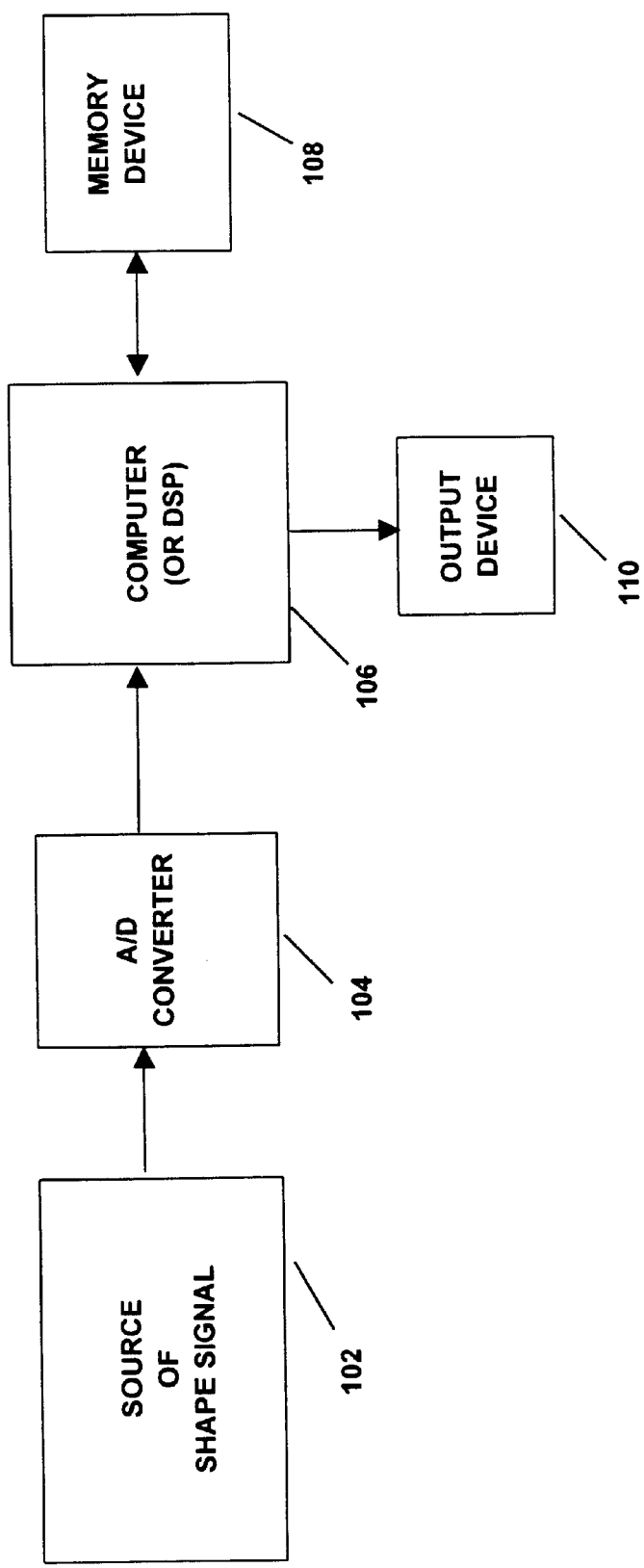
FIG. 14 shows a block diagram of a hardware implementation of an embodiment of the invention.

The apparatus described above may be illustrated in reference to FIG. 14 which shows in block diagram form the elementary components of a hardware embodiment of the invention. A shape source 102 feeds an analog shape signal to an analog to digital (A/D) converter 104 which in turns feeds the digital representation of the shape into a computer or digital signal processor 106. The computer 106 is programmed to perform the algorithms described in connection with one or more of the various embodiments of the invention described above, and an overall flowchart of the program operation is illustrated in connection with FIG. 15 described below. While shape is being used in the example of FIGS. 14 and 15, the same procedure applies to the analysis of area. The computer 106 accesses a memory device 108 to store (and preferably also sort or order) the token stings derived from the Numgram attractor process. The computer may operate in a database building mode in which a large set of token strings (each string corresponding to different reference shape or area) may be stored in the memory device 108 to build a database. The computer 106 may also operate in a comparison mode in which the token string of an input shape (area) is compared to the token strings in the database of the memory device 106 to find a match or a region of closest match. An output device 110 such as, by way of example and not by way of limitation, a display, printer, memory unit or the like, is connected to the computer 106 to provide or store (or transmit for downstream output and/or storage) the results of the comparison. In the event the shape source 102 provides a digital output, the A/D converter is omitted.

Figure 15:
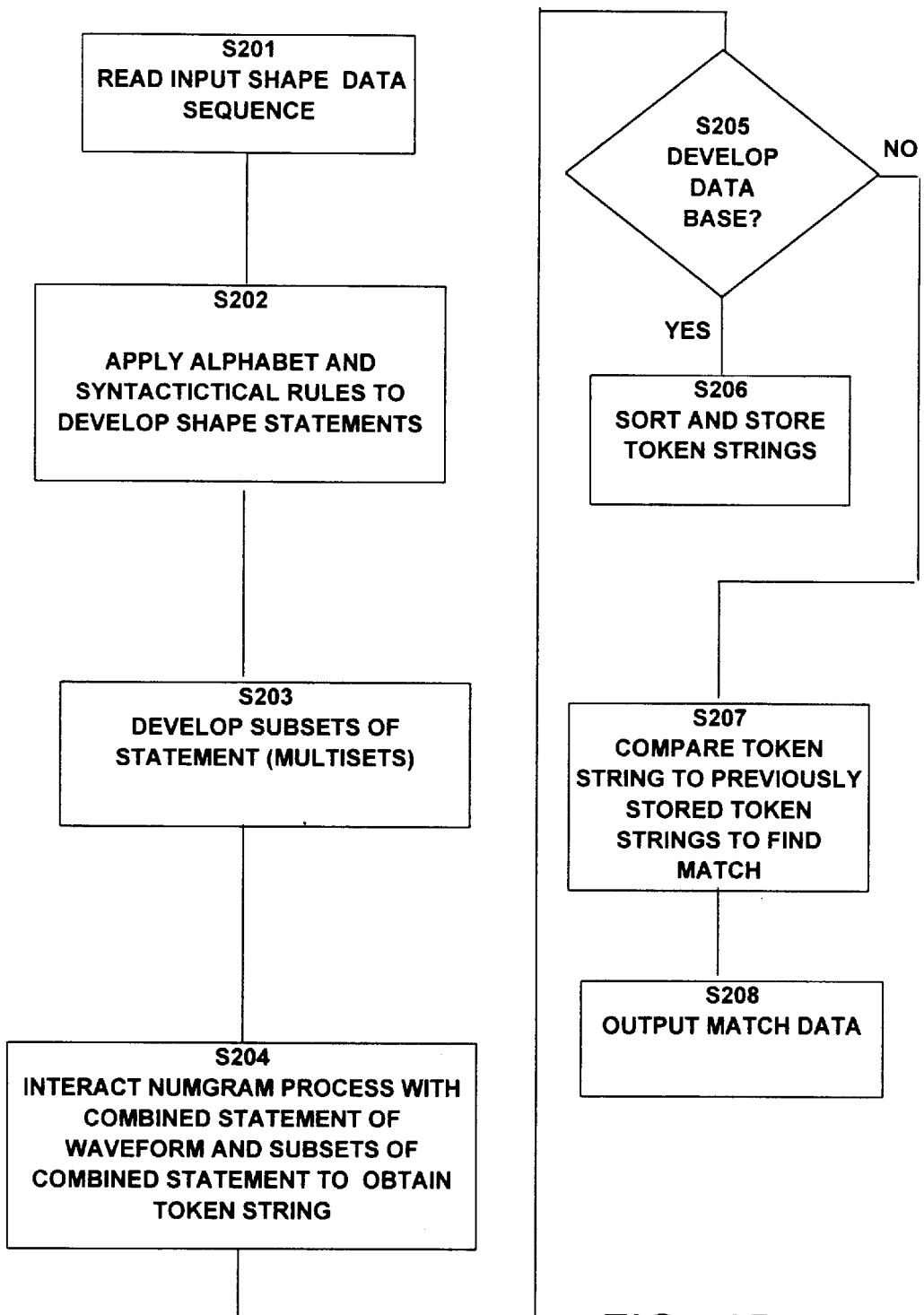
FIG. 15 shows a flowchart of an operation of the computer of FIG. 14 in accordance with an embodiment of the invention.

The flowchart of FIG. 15 shows the two modes of operation of the computer 106. In step S201, the computer 106 operates to read the input shape data sequence. This waveform data sequence is the digital data from the A/D converter 104 a is a digital representation of the shape such as shape 702 in FIG. 7B. In step S202, the program executed on the computer operates to apply a previously determined tiling and address assignment (e.g., FIGS. 8A–8F) and syntactical rules to the shape data sequence to obtain a statement or chain code of the shape data sequence.

In step S203 a multiset of statements (or sequences) is obtained by taking subsequences of the sequence defined by the statement. The program now goes to step S204 where the multiset is interacted with the Numgram attractor process to obtain a token string. At step S205 it is determined if the program is being operated in a database building mode, in which case the program branches to step S206, or if the program is not operating in a database building mode, in which case the program goes to step S207 corresponding to the comparison mode of operation. In the database building mode of step S206 the token string determined from step S204 is stored. Preferably, the token sting is also sorted (i.e., ordered in relation to the already stored tokens) so that the subsequent search operations in the comparison mode may be efficiently carried out. After the token string is stored, the program may return to process another input shape sequence. In the comparison step S207, the token string of interest of step S205 is compared with the stored (and preferably sorted) tokens in the database (memory device 108) to find a match or the find the stored token strings that come closest to the token string of interest. The output match results are provided in step S208. The program then returns to step S201 to read another input waveform data sequence.

The present invention has been described with respect to particular embodiments thereof, and numerous modifications can be made which are within the scope of the invention as set forth in the claims.

What is claimed is:

1. A method for characterizing an m-dimensional shape in an n-dimensional space, comprising the steps of:
   a) configuring a device in at least one of hardware, firmware and software to characterize said m-dimensional shape, said configuring comprising:
      defining labels for a plurality of facial directions of a polytope in said n-dimensional space, said polytope being of k dimensions;
      defining a unit vector for each of said facial directions; and
      defining a polytope tiling map for said n-dimensional space;
   b) tiling said m-dimensional shape with said k-dimensional polytope within said n-dimensional space;
   c) mapping a shape into a sequence of tile addresses;
   d) configuring said device to carry out an attractor process for mapping a source multiset to an attractor space, said attractor process being an iterative process which causes elements in said source multiset to converge on one of at least two different behaviors defined within said attractor space as a result of said iterative process, said configuring step including inputting a characterization of the source multiset to input to said device the number of distinct elements of said source multiset;
   e) using said device, executing said mapping of said sequence of tile addresses to one or more coordinates of said attractor space, each of said coordinates corresponding to a different behavior in the attractor space; and
   f) mapping said attractor space coordinates into a target space representation, said target space representation including at least the attractor space coordinates.

2. The method of claim 1 wherein said target space and said attractor space are collapsed onto a single space.

3. The method of claim 1 further comprising the step of:
   g) mapping said target space representation into a shape analytical space representation; and
   h) comparing said shape analytical space representation with one or more stored shape representations.

4. The method of claim 3 wherein two or more of said target space, said analytic space and said attractor space are collapsed onto a single space.

5. The method of claim 1 wherein said domain space is of two dimensions.

6. The method of claim 5 wherein polytope is a triangle.

7. The method of claim 5 wherein polytope is a hexagon.

8. The method of claim 5 wherein polytope is a square.

9. The method of claim 1 wherein said polytope has (2n−2) faces.

10. The method of claim 1 wherein m equals one, n is two or more, and k is two or more.

11. The method of claim 1 wherein m equals two, n is two or more, and k is two or more.

12. The method of claim 1 wherein m equals one or more, n is equal to or greater than m, and k is two or more.

13. The method of claim 1 wherein m equals one or more, n is equal to or less than m, and k is two or more.

14. A method for characterizing an m-dimensional shape in an n-dimensional space, comprising the steps of:
   a) configuring a device in at least one of hardware, firmware and software to characterize said m-dimensional shape, said configuring comprising:
      defining labels for a plurality of facial directions of a polytope in said n-dimensional space, said polytope being of k dimensions;
      defining a unit vector for each of said facial directions;
      defining a polytope tiling map for said n-dimensional space; and
      defining labels for a plurality of angle types between two or more combinations of said unit vectors;
   b) tiling said m-dimensional shape with said k-dimensional polytope within said n-dimensional space;
   c) mapping a shape into a sequence of angle types;
   d) configuring said device to carry out an attractor process for mapping a source multiset to an attractor space, said attractor process being an iterative process which causes elements in said source multiset to converge on one of at least two different behaviors defined within said attractor space as a result of said iterative process, said configuring step including inputting a characterization of the source multiset to input to said device the number of distinct elements of said source multiset;

e) using said device, executing said mapping of said sequence of tile addresses to one or more coordinates of said attractor space, each of said coordinates corresponding to a different behavior in the attractor space; and f) mapping said attractor space coordinates into a target space representation, said target space representation including at least the attractor space coordinates.

15. The method of claim 14 wherein said target space and said attractor space are collapsed onto a single space.

16. The method of claim 14 further comprising the step of:

g) mapping said target space representation into a shape analytical space representation; and h) comparing said shape analytical space representation with one or more stored shape representations.

17. The method of claim 16 wherein two or more of said target space, said analytic space and said attractor space are collapsed onto a single space.

18. The method of claim 14 wherein said domain space is of two dimensions.

19. The method of claim 18 wherein polytope is a triangle.

20. The method of claim 18 wherein polytope is a hexagon.

21. The method of claim 18 wherein polytope is a square.

22. The method of claim 14 wherein said polytope has (2n−2) faces.

23. A method for characterizing an m-dimensional shape in an n-dimensional space, comprising the steps of:

a) placing a k-dimensional polytope on a starting point of the m-dimensional shape, said shape being a contour, said polytope having a plurality of faces, each of said faces being associated with an address label;

b) determining an intersecting face of said polytope intersecting with said shape at an intersecting point;

c) adding a label corresponding to said intersecting face to a sequence of address labels;

d) centering said polytope at said intersecting point;

e) determining an intersecting face of said polytope intersecting with said shape at an intersecting point;

f) adding a label corresponding to said intersecting face to a sequence of address labels;

g) repeating steps d) to f) until the entire shape has been addressed, thereby providing a sequence of addresses; and h) processing said sequence of addresses through an attractor process to obtain a string of one or more tokens, said tokens being indicative of attractor process states resulting from interaction of said attractor process with said sequence.

24. The method of claim 23, further comprising the steps of:

i) repeating steps a) through h) for a second m-dimensional shape to obtain a second string of tokens; and j) comparing said string of tokens for first shape with said second string of tokens for said second shape.

25. The method of claim 23, wherein said attractor process is an iterative process which causes elements in a source multiset to converge on one of at least two different behaviors defined within an attractor space as a result of an iterative process.

26. The method of claim 23, wherein said processing said sequence of addresses through an attractor process includes taking said labels in said sequence one at a time.

27. The method of claim 23, wherein said processing said sequence of addresses through an attractor process includes taking said labels in said sequence more than one at a time.

28. The method of claim 23, wherein said processing said sequence of addresses through an attractor process includes inserting new labels for one or more predetermined features in said sequence.

29. The method of claim 28, wherein said predetermined features include concave regions and convex regions.

30. The method of claim 28, wherein said predetermined features include turns from each of said faces of said polytope to all other faces of said polytope.

31. The method according to claim 23, further comprising the step of:

generating one or more additional sequences by defining one or more additional labels, each of said additional labels corresponding to a predetermined feature of said shape.

32. The method according to claim 31, wherein said feature includes a shape segment, said segment having a plurality of identical labels.

33. The method according to claim 31, wherein said feature includes a turn from one address label to another address label.

34. The method according to claim 23, further comprising the step of:

normalizing a scalar size of said polytope.

35. The method according to claim 23, further comprising the step of:

normalizing an orientation of said polytope.

36. A method for analyzing an m-dimensional shape in an n-dimensional space, comprising the steps of:

a) placing a k-dimensional polytope on a starting point of the m-dimensional shape, said shape being a contour, said polytope having a plurality of faces, each of said faces being associated with an address label;

b) determining an intersecting face of said polytope intersecting with said shape at an intersecting point;

c) adding a label corresponding to said intersecting face to a sequence of address labels;

d) centering said polytope at said intersecting point;

e) determining an intersecting face of said polytope intersecting with said shape at an intersecting point;

f) adding a label corresponding to said intersecting face to a sequence of address labels;

g) repeating steps d) to f) until the entire shape has been addressed, thereby providing a sequence of addresses; and h) processing said sequence of addresses through an attractor process to obtain one or more tokens, said tokens being indicative of attractor process states resulting from interaction of said attractor process with said sequence; and i) analyzing said tokens to recognize or compare said shape with a set of predetermined shapes.

37. A method for characterizing an m-dimensional shape in an n-dimensional space, comprising the steps of:

a) placing a pre-determined point of a k-dimensional polytope on a starting point at an edge of the m-dimensional shape, said polytope having a plurality of faces (k) and a reference point, each of said faces being associated with an address label;

b) orienting said polytope to place said reference point of said polytope on said edge of said shape c) determining an intersecting face of said polytope intersecting with said edge of said shape at an intersecting point;

d) adding a label corresponding to said intersecting face to a sequence of address labels;

e) centering said polytope at said intersecting point;

f) repeating steps b) to e) until the entire shape has been addressed, thereby providing a sequence of addresses; and g) processing said sequence of addresses through an attractor to obtain a string of one or more tokens, said tokens being indicative of attractor states resulting from said sequence.

38. The method of claim 37, further comprising the steps of:

h) repeating steps a) through g) for a second m-dimensional shape to obtain a second string of tokens; and i) comparing said string of tokens for first shape with said second string of tokens for said second shape.

39. The method of claim 37, wherein said attractor process is an iterative process which causes elements in a source multiset to converge on one of at least two different behaviors defined within an attractor space as a result of an iterative process.

40. The method of claim 37, wherein said processing said sequence of addresses through an attractor process includes taking said labels in said sequence one at a time.

41. The method of claim 37, wherein said processing said sequence of addresses through an attractor process includes taking said labels in said sequence more than one at a time.

42. The method of claim 37, wherein said processing said sequence of addresses through an attractor process includes inserting new labels for one or more predetermined features in said sequence.

43. The method of claim 42, wherein said predetermined features include concave regions and convex regions.

44. The method of claim 42, wherein said predetermined features include turns from each of said faces of said polytope to all other faces of said polytope.

45. The method according to claim 37, further comprising the step of:

generating one or more additional sequences by defining one or more additional labels, each of said additional labels corresponding to a predetermined feature of said shape.

46. The method according to claim 45, wherein said feature includes a shape segment, said segment having a plurality of identical labels.

47. The method according to claim 45, wherein said feature includes a turn from one address label to another address label.

48. The method according to claim 37, further comprising the step of:

normalizing a scalar size of said polytope.

49. The method according to claim 37, further comprising the step of:

normalizing an orientation of said polytope.

50. A method for analyzing an m-dimensional shape in an n-dimensional space, comprising the steps of:

a) placing a pre-determined point of a k-dimensional polytope on a starting point at an edge of the m-dimensional shape, said polytope having a plurality of faces (k) and a reference point, each of said faces being associated with an address label;

b) orienting said polytope to place said reference point of said polytope on said edge of said shape c) determining an intersecting face of said polytope intersecting with said edge of said shape at an intersecting point;

d) adding a label corresponding to said intersecting face to a sequence of address labels;

e) centering said polytope at said intersecting point;

f) repeating steps b) to e) until the entire shape has been addressed, thereby providing a sequence of addresses;

g) processing said sequence of addresses through an attractor to obtain one or more tokens, said tokens being indicative of attractor states resulting from said sequence; and h) analyzing said tokens to recognize or compare said shape with a set of predetermined shapes.

51. A device for analyzing an m-dimensional shape in an n-dimensional space, comprising:

a) means for placing a pre-determined point of a k-dimensional polytope on a starting point at an edge of the m-dimensional shape, said polytope having a plurality of faces (k) and a reference point, each of said faces being associated with an address label;

b) means for orienting said polytope to place said reference point of said polytope on said edge of said shape c) means for determining an intersecting face of said polytope intersecting with said edge of said shape at an intersecting point;

d) means for adding a label corresponding to said intersecting face to a sequence of address labels;

e) means for centering said polytope at said intersecting point;

f) means for repeating steps b) to e) until the entire shape has been addressed, thereby providing a sequence of addresses;

g) means for processing said sequence of addresses through an attractor to obtain one or more tokens, said tokens being indicative of attractor states resulting from said sequence; and h) means for analyzing said tokens to recognize or compare said shape with a set of predetermined shapes.

52. A device for analyzing an m-dimensional shape in an n-dimensional space, comprising a programmed digital computer programmed to perform the steps of:

a) placing a pre-determined point of a k-dimensional polytope on a starting point at an edge of the m-dimensional shape, said polytope having a plurality of faces (k) and a reference point, each of said faces being associated with an address label;

b) orienting said polytope to place said reference point of said polytope on said edge of said shape c) determining an intersecting face of said polytope intersecting with said edge of said shape at an intersecting point;

d) adding a label corresponding to said intersecting face to a sequence of address labels;

e) centering said polytope at said intersecting point;

f) repeating steps b) to e) until the entire shape has been addressed, thereby providing a sequence of addresses;

g) processing said sequence of addresses through an attractor to obtain one or more tokens, said tokens being indicative of attractor states resulting from said sequence; and h) analyzing said tokens to recognize or compare said shape with a set of predetermined shapes.

* * * * *

SEQUENCE LISTING

<160> NUMBER OF SEQ ID NOS: 2

<210> SEQ ID NO 1
<211> LENGTH: 19
<212> TYPE: DNA
<213> ORGANISM: Artificial Sequence
<220> FEATURE:
<223> OTHER INFORMATION: Description of Artificial Sequence: Synthetic
      DNA fragment

<400> SEQUENCE: 1
ggatacgtcg tataacgta                                                19

<210> SEQ ID NO 2
<211> LENGTH: 19
<212> TYPE: DNA
<213> ORGANISM: Artificial Sequence
<220> FEATURE:
<223> OTHER INFORMATION: Description of Artificial Sequence: Synthetic
      DNA fragment

<400> SEQUENCE: 2
tataacgtat tagacacgg                                                19